US010662347B2

(12) United States Patent
Holguin et al.

(10) Patent No.: US 10,662,347 B2
(45) Date of Patent: May 26, 2020

(54) HYDROPHILIC/HYDROPHOBIC AQUEOUS POLYMER EMULSIONS AND PRODUCTS AND METHODS RELATING THERETO

(71) Applicant: ALLEGIANCE CORPORATION, Waukegan, IL (US)

(72) Inventors: Daniel L. Holguin, Fullerton, CA (US); Andre Mayer, Bois le Roi (FR); Suo Phong Lee, Arcadia, CA (US); Michael Meyers, Lock Haven, PA (US); Dennis Kopp, Glendale, CA (US); Wei Cheong Wong, Kedah (MY); Chii Yih Low, Penang (MY); Shiping Wang, Libertyville, IL (US); Xiaochuan Hu, State College, PA (US); Chuang Sim Chong, Kedah (MY)

(73) Assignee: ALLEGIANCE CORPORTATION, Waukegan, IL (US)

( * ) Notice: Subject to any disclaimer, the term of this patent is extended or adjusted under 35 U.S.C. 154(b) by 0 days.

(21) Appl. No.: 14/527,665

(22) Filed: Oct. 29, 2014

(65) Prior Publication Data

US 2015/0284584 A1 Oct. 8, 2015

Related U.S. Application Data

(60) Provisional application No. 61/896,733, filed on Oct. 29, 2013.

(51) Int. Cl.
    *C09D 133/10* (2006.01)
    *C08F 220/20* (2006.01)
    (Continued)

(52) U.S. Cl.
    CPC .............. *C09D 133/10* (2013.01); *C08F 2/22* (2013.01); *C08F 220/20* (2013.01); *C08K 5/41* (2013.01); *C09D 133/066* (2013.01)

(58) Field of Classification Search
    CPC .................. C08F 220/20; C08F 220/06; C08F 2220/1858; C08F 220/14; C08F 2/22; C09D 133/066; C09D 133/10
    See application file for complete search history.

(56) References Cited

U.S. PATENT DOCUMENTS

| 3,998,772 A | 12/1976 | Beerbower et al. |
| 4,482,577 A | 11/1984 | Goldstein et al. |

(Continued)

FOREIGN PATENT DOCUMENTS

| CN | 1179745 A | 4/1998 |
| CN | 1284106 A | 2/2001 |

(Continued)

OTHER PUBLICATIONS

Disponil FES 77 Technical Bulletin. No Author, no date. Obtained from http://worldaccount.basf.com/wa/NAFTA~en_US/Catalog/ChemicalsNAFTA/doc4/BASF/PRD/30529410/.pdf?urn=urn:documentum:eCommerce_sol_EU:09007bb2800945bd.pdf on Dec. 9, 2015.*

(Continued)

Primary Examiner — Michael A Salvitti
(74) Attorney, Agent, or Firm — Arent Fox LLP

(57) ABSTRACT

Methods for preparing copolymeric emulsions from at least one water soluble monomer and at least one water insoluble monomer are disclosed herein. In some embodiments, one or more surfactants and stabilizers may be used. In some embodiments, the monomers used in the process include, by total monomer weight, at least 50% water soluble monomers and at least 10% water insoluble monomers. Copolymer emulsions formed from the reaction product of at least one water soluble monomer and at least one water insoluble monomer are also disclosed along with articles coated with such emulsions and coating formulations made from such (Continued)

emulsions as well as methods for the manufacture and coating of such articles.

68 Claims, 16 Drawing Sheets

(51) Int. Cl.
  *C08F 2/22* (2006.01)
  *C09D 133/06* (2006.01)
  *C08K 5/41* (2006.01)

(56) References Cited

U.S. PATENT DOCUMENTS

| | | | |
|---|---|---|---|
| 4,499,154 | A | 2/1985 | James et al. |
| 4,548,844 | A | 10/1985 | Podell et al. |
| 4,575,476 | A | 3/1986 | Podell et al. |
| 5,993,923 | A * | 11/1999 | Lee .................. 428/36.8 |
| 6,013,722 | A | 1/2000 | Yang et al. |
| 6,242,042 | B1 | 6/2001 | Goldstein et al. |
| 6,284,856 | B1 | 9/2001 | Lee |
| 6,465,591 | B1 | 10/2002 | Lee |
| 6,653,427 | B2 | 11/2003 | Holguin |
| 6,673,404 | B1 | 1/2004 | Yeh et al. |
| 6,683,129 | B1 | 1/2004 | Eknoian |
| 6,706,313 | B1 | 3/2004 | Goldstein et al. |
| 6,706,836 | B1 * | 3/2004 | Holguin et al. .......... 526/320 |
| 6,743,880 | B2 | 6/2004 | Holguin |
| 6,759,473 | B1 | 7/2004 | Nakamura et al. |
| 6,772,443 | B2 | 8/2004 | Soerens et al. |
| 6,828,387 | B2 | 12/2004 | Wang et al. |
| 6,828,399 | B2 | 12/2004 | Lee |
| 7,019,067 | B2 | 3/2006 | Holguin et al. |
| 7,032,251 | B2 | 4/2006 | Janssen |
| 7,179,415 | B2 | 2/2007 | Teoh et al. |
| 7,309,731 | B2 * | 12/2007 | Shih et al. ............... 524/513 |
| 8,110,266 | B2 | 2/2012 | Chen et al. |
| 2003/0087204 | A1 | 5/2003 | Oyamada et al. |
| 2003/0144446 | A1 | 7/2003 | Lee |
| 2006/0141186 | A1 | 6/2006 | Janssen et al. |
| 2006/0235131 | A1 * | 10/2006 | Hughes et al. ........... 524/460 |
| 2007/0173594 | A1 | 7/2007 | Farwaha et al. |
| 2010/0051200 | A1 * | 3/2010 | Mueller et al. ........... 156/344 |
| 2015/0113704 | A1 * | 4/2015 | Wong et al. ................ 2/167 |
| 2015/0284584 | A1 * | 10/2015 | Holguin et al. .......... 524/458 |

FOREIGN PATENT DOCUMENTS

| | | |
|---|---|---|
| CN | 1430630 A | 7/2003 |
| CN | 1884324 A | 12/2006 |
| EP | 0113526 A1 | 7/1984 |
| JP | S59501500 A | 8/1984 |
| JP | S60500060 A | 1/1985 |
| JP | H03215504 A | 9/1991 |
| JP | H051161 A | 1/1993 |
| JP | H05310857 A | 11/1993 |
| JP | H07228786 A | 8/1995 |
| JP | H09255894 A | 9/1997 |
| JP | 200355602 A | 12/2000 |
| JP | 2002503138 A | 1/2002 |
| JP | 2003531268 A | 10/2003 |
| JP | 2004511361 A | 4/2004 |
| JP | 2004292512 A | 10/2004 |
| JP | 2006342221 A | 12/2006 |
| JP | 2008525655 A | 7/2008 |
| WO | 8400908 A1 | 3/1984 |
| WO | 0015353 A1 | 3/2000 |
| WO | 0136553 A1 | 5/2001 |
| WO | 0174941 A1 | 10/2001 |
| WO | 0181486 A2 | 11/2001 |
| WO | 2006071308 A1 | 7/2006 |
| WO | 2013095993 A2 | 6/2013 |
| WO | 2015066218 A1 | 5/2015 |

OTHER PUBLICATIONS

International Preliminary Report on Patentability for Application No. PCT/US2014/062984, dated May 3, 2015, 10 pages.
International Search Report and Written Opinion for Application No. PCT/US2014/062984, dated Jan. 22, 2015, 13 pages.
Invitation to Respond to Written Opinion of corresponding Singapore Patent Application No. 11201603374P dated Mar. 21, 2017.
Office Action for Chinese Application No. 201480062335.4 dated Mar. 3, 2017 (With English Translation).
Examination Report for Australian Application No. AU2014342368 dated Aug. 22, 2018, 3 pages.
Office Action for Japanese Application No. 2016-526231 dated Aug. 28, 2018, 6 pages.
Examination Report for Malaysian Application No. PI2016000716 dated Jan. 28, 2019, 2 pages.

* cited by examiner

HYDROPHILIC/HYDROPHOBIC AQUEOUS POLYMER EMULSIONS AND PRODUCTS AND METHODS RELATING THERETO

CROSS-REFERENCE TO RELATED APPLICATION

The present application claims the benefit of U.S. Provisional Application No. 61/896,733 filed Oct. 29, 2013, which is incorporated herein by reference in its entirety.

FIELD

A coating formulation made from a copolymer emulsion used to coat articles and a method for the manufacture and coating of such articles.

BACKGROUND

Medical articles, such as gloves and other elastomeric articles, often come in contact with liquids and fluids during their use. Such articles form a barrier between the user's skin and the external environment. Medical gloves, such as examination gloves and surgical gloves, are examples of articles used in the healthcare setting, and they play a key role in minimizing the spread of infectious diseases. Such articles are used frequently by health care professionals. Therefore, it is important for medical articles such as gloves to provide an effective barrier, while providing an adequate level of comfort to the user. Coated articles in particular are ideally smooth and non-tacky, and they preferably have a coating that does not flake off. There is a need in the art for such articles, and methods of making such articles.

Coatings have been used in products, such as for enhancing the desirable features of rubber gloves. Previous coatings have been developed, such as those disclosed in U.S. Pat. Nos. 4,548,844; 4,575,476; 6,242,042; 6,706,313; 7,179415; 6,772,443; 7,032,251; 6,706,836; 6,743,880; 7,019,067; 6,653,427; 6,828,399; 6,284,856; and 5,993,923, each of which is incorporated in its entirety as if set forth fully herein. All references cited herein are incorporated by reference in their entirety.

SUMMARY

A novel and useful preparation of a copolymer emulsion is provided. In one embodiment, a method for forming a copolymer emulsion is provided by combining and copolymerizing at least one water soluble monomer and at least one water insoluble monomer, wherein the monomers used in the process are comprised of at least 50% by weight water soluble monomer and at least 10% by weight water insoluble monomer as measured by the total monomer weight.

In another embodiment, the method for the preparation of a copolymer emulsion is provided that includes concurrently combining a monomer feed and a pre-emulsion feed to form an emulsion, wherein the monomer feed comprises at least 50% by weight water soluble monomer based on the total monomer weight of the monomer feed and the pre-emulsion feed, and the pre-emulsion feed comprises at least 10% by weight water insoluble monomer based on the total monomer weight of the monomer feed and the pre-emulsion feed.

In still another embodiment, the method for the preparation of a copolymer emulsion is provided by concurrently combining a monomer feed and a pre-emulsion feed to form a monomer mixture, wherein the monomer feed comprises at least 50% by weight water soluble monomer and wherein the pre-emulsion feed comprises at least 10% water insoluble monomer, with such percentages based on the total monomer weight of the monomer feed and the pre-emulsion feed. The method further requires introducing into a reactor and agitating an initial charge that includes a stabilizer, a surfactant, an initiator, and deionized water and maintaining the reactor contents at about 55° C. and at a pH above about 6.0. The method also includes introducing about 6% of the monomer feed and about 6% of the pre-emulsion feed into the reactor and maintaining the temperature and pH for about ten minutes, followed by introducing an activator feed into the reactor. The activator feed, which includes deionized water and sodium hydroxymethanesulfinate, is introduced at a rate such that the contents of the activator feed will be exhausted concurrently with or after the exhaustion of the monomer feed and the pre-emulsion feed. The remaining monomer feed and pre-emulsion feed are introduced into the reactor at a constant rate to fully feed the remaining contents over a span of about 4.5 hours. Then, after the monomer feed, pre-emulsion feed, and activator feed have been fully introduced into the reactor, a post feed, including a second initiator, is introduced into the reactor and the temperature and pH is maintained for about one hour to complete polymerization.

In still another embodiment, articles are provided comprising a coating comprising at least one water soluble monomer and at least one water-insoluble monomer, and methods of making the same. Methods of making such articles are also provided.

The accompanying drawings, which are incorporated in and constitute a part of this specification, illustrate one or more embodiments and, together with the description, serve to explain the principles of the copolymer emulsion and related processes of making and of using.

BRIEF DESCRIPTION OF THE DRAWINGS

A full and enabling disclosure, including the best mode thereof directed to one of ordinary skill in the art, is set forth in the specification, which makes reference to the appended drawings, in which.

Figure 1A:
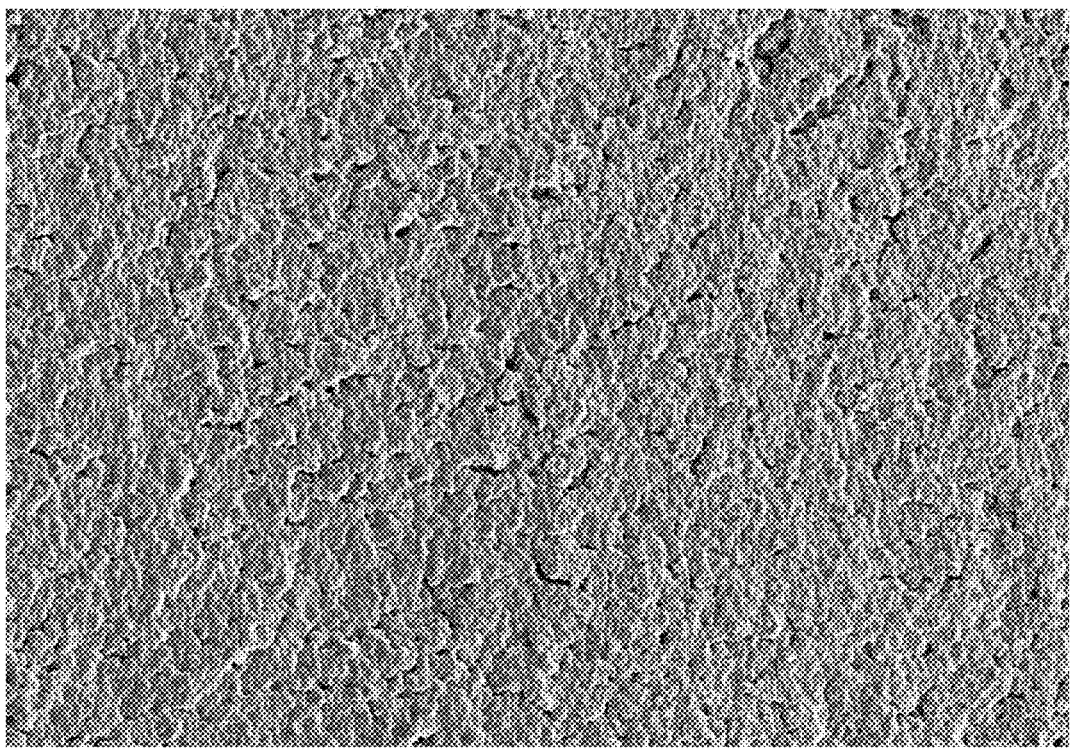
FIG. 1A is a scanning electron microscope image, at 500 times magnification, of a surgical glove coated with a comparative water-soluble coating without a crosslinker.
Figure 1B:
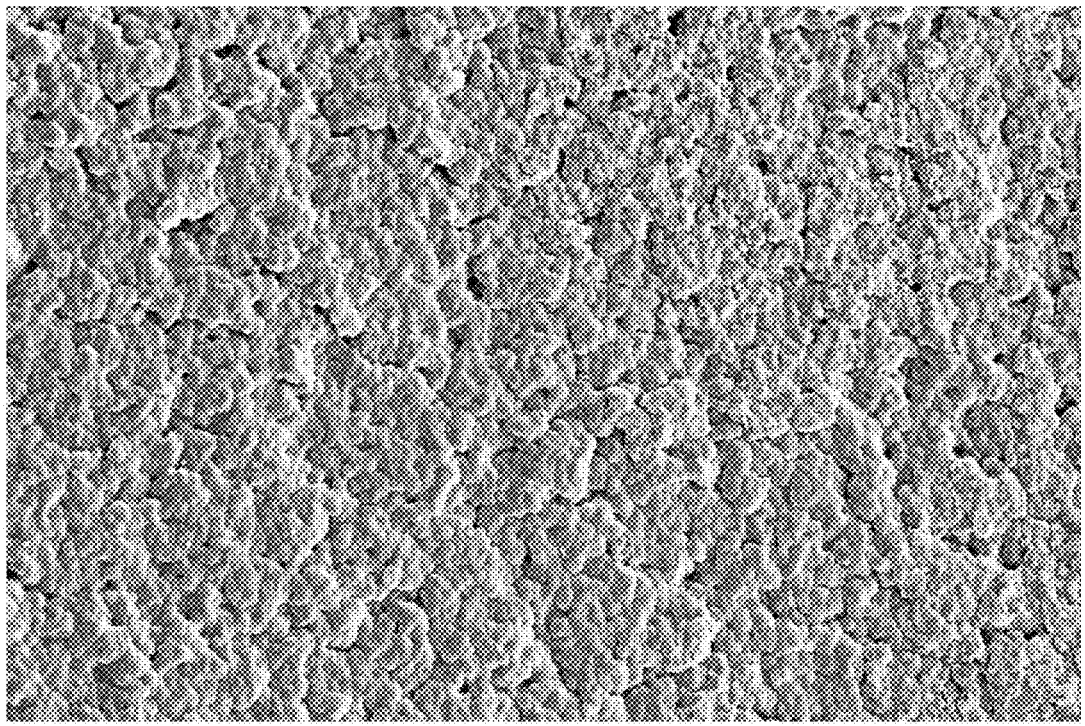
FIG. 1B is a scanning electron microscope image of the glove in FIG. 1A at 1000 times magnification.
Figure 2A:
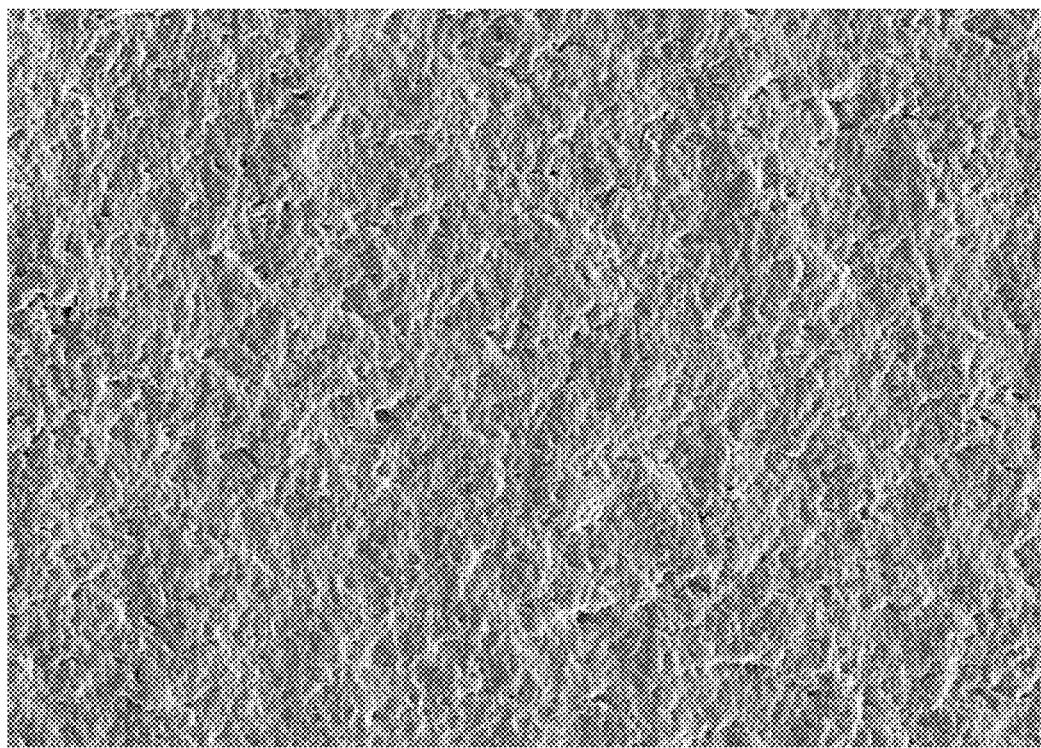
FIG. 2A is a scanning electron microscope image, at 500 times magnification, of a second surgical glove coated with a comparative water-soluble coating and applied with a crosslinker.
Figure 2B:
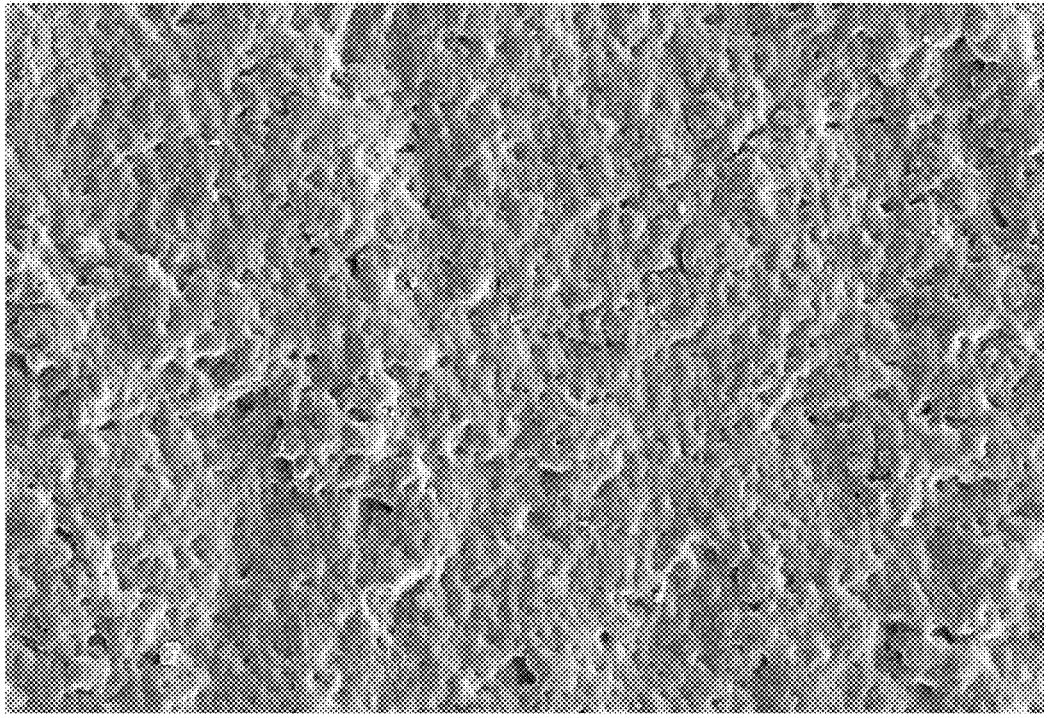
FIG. 2B is a scanning electron microscope image of the glove in FIG. 2A at 1000 times magnification.

Repeat use of reference characters in the present specification and drawings is intended to represent same or analogous features or elements.

DETAILED DESCRIPTION

Reference will now be made in detail to presently preferred embodiments, one or more examples of which are illustrated in the accompanying drawings. Each example is provided by way of explanation of the copolymer emulsion and methods of making and using, not limitation thereof. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the disclosure herein covers such modifications and variations as come within the scope of the appended claims and their equivalents.

The polymer emulsions provided herein are acrylic emulsion copolymers that are the reaction product of a mixture of monomers. As used herein, the term "monomer" is meant in a broad sense to encompass monomers and oligomers as would be used in building a desired copolymer. The polymer emulsions are prepared by copolymerizing at least one hydrophilic water soluble monomer together with at least one hydrophobic water insoluble monomer. As used herein, monomer percentages are based on the weight percent of the total (soluble and insoluble) monomer weights.

The emulsions may be prepared by copolymerizing a water soluble monomer mixture, which is referenced as the "monomer feed," and a water insoluble monomer mixture, which is referenced as the "pre-emulsion feed." As described in detail herein, these feeds may be combined, optionally with other components such as surfactants and stabilizers, to create a polymeric emulsion.

The monomer feed used to form an emulsion may include 2-hydroxyethyl methacrylate, 4-hydroxybutyl acrylate, 2-hydroxybutyl acrylate, or mixtures thereof. These particular monomers are water soluble monomers that form water insoluble polymers. 2-hydroxyethyl methacrylate may be obtained from Mitsubishi Rayon, of Tokyo, Japan, and, in some embodiments, the 2-hydroxyethyl methacrylate may have a purity of about 97% or greater. In some embodiments, an emulsion may be prepared by copolymerizing monomers that include at least about 40% water soluble monomers. In other embodiments, an emulsion may be prepared by copolymerizing monomers that include at least about 50% water soluble monomers. In some embodiments, about 50% to about 90% water soluble monomers may be used, including each intermittent value therein, including 75%. In some embodiments, about 60% to about 80% water soluble monomer may be used, and in other embodiments about 72% to about 80% water soluble monomer may be used. In still further embodiments, about 30% to about 90% water soluble monomer may be used. Specific exemplary embodiments are provided in the examples below. The monomer feed may also include deionized water.

In still further embodiments, the monomer feed may include other water soluble monomers, including, without limitation, quaternary amine (meth)acrylate monomers, other hydroxy-alkyl (meth)acrylate monomers, N-vinyl lactam monomers, ethylenically unsaturated carboxylic acid monomers, and mixtures thereof. In some embodiments, additional water soluble monomers that result in water soluble polymers may be added to the monomer feed to impart flexibility, polarity, crosslinking, solubility, adhesion, or other desired properties. In some embodiments, such water soluble monomers may include 2-hydroxyethyl acrylate, hydroxypropyl acrylate, hydroxypropyl methacrylate (which has limited water solubility), acrylic acid, methacrylic acid, itaconic acid, N-vinyl pyrrolidone, N-vinyl caprolactam, 1-vinyl-2-piperidone, 1-vinyl-5-methyl-2-pyrrolidone, acrylamide, methacrylamide, N-isobutoxymethyl acrylamide. Ethoxylated (meth)acrylate monomers with an average of 10 ethylene oxide units, such as ethoxylatedhydroxyethylmethacrylate, are available from Nippon Nyukazai Co., Ltd. of Chuo-ku, Tokyo under the product designation MA-100A. Quaternary amine (meth)acrylates, such as dimethylaminoethyl acrylate methyl chloride quaternary, are available from CPS Chemical Co. of Old Bridge, N.J. under the product designation Agelfex FA1Q80MC. By way of example, these other monomers may be present in the monomer feed in some embodiments up to about 25% by weight of the water soluble monomers in the monomer feed. In some other embodiments, these other monomers may be present in amounts up to about 25% by weight of the entire emulsion (including the monomer feed and pre-emulsion feed).

A pre-emulsion feed may include at least one water insoluble monomer. By way of example, and without limitation, the water insoluble monomers that may used in the pre-emulsion feed include methyl acrylate, ethyl acrylate, butyl acrylate, propyl acrylate, 2-ethylhexyl acrylate, butyl methacrylate, methyl methacrylate, lauryl methacrylate, stearyl methacrylate, 2-ethylhexyl methacrylate, trifluoroethyl methacrylate, isooctyl acrylate, isodecyl acrylate, isobornyl acrylate, dimethylaminoethyl methacrylate, styrene, vinyl esters (such as vinyl acetate, vinyl butyrate, vinyl propionate, vinyl isobutyrate, vinyl valerate, and vinyl versitate), diesters of dicarboxylic acid (such as di-2-ethylhexyl maleate, di-octyl maleate, di-ethylhexylfumarate, di-ethyl fumarate, and di-butyl fumarate), isobornyl acrylate, cyclohexyl acrylate, and similar monomers. By way of example, one water insoluble monomer that may be used in embodiments, namely 2-methacryloylxyethyl phthalic acid, is available from Mitsubishi Rayon Co., Ltd. under the product designation Acryester PA. In some embodiments, an emulsion may be prepared by copolymerizing monomers that include at least about 10% to about 50% water insoluble monomers. In other embodiments, an emulsion may be prepared by copolymerizing monomers that include at least about 10% to about 60% or about 70% water insoluble monomers.

In addition, the pre-emulsion feed may include more than one water insoluble monomer, such as mixtures of the foregoing insoluble monomers. For example, in one embodiment, both 2-ethylhexyl acrylate and methyl methacrylate may be included in the pre-emulsion feed at about 11% each. In other embodiments, these amounts may be varied.

In some embodiments, the pre-emulsion feed may also include methacrylic acid as a monomer, wherein methacrylic acid is a water soluble monomer. In some embodiments, water soluble monomers may be added to the pre-emulsion feed, such as 2-hydroxyethyl acrylate, hydroxypropyl acrylate, hydroxypropyl methacrylate (limited water solubility), acrylic acid, methacrylic acid, itaconic acid, N-vinyl pyrrolidone, N-vinyl caprolactam, 1-vinyl-2-Piperidone, 1-vinyl-5-methyl-2-pyrrolidone, acrylamide, Methacrylamide, N-isobutoxymethyl acrylamide. As indicated above, ethoxylated (meth)acrylate with an average of 10 ethylene oxide units, such as ethoxylatedhydroxyethylmethacrylate, may be obtained from Nippon Nyukazai Co., Ltd. of Chuo-ku, Tokyo under the product designation MA-100A. In addition, quaternary amine (meth)acrylates, such as dimethylaminoethyl acrylate methyl chloride quaternary, are available from CPS Chemical Co. of Old Bridge, N.J. under the product designation Agelfex FA1Q80MC.

Although the amount of methacrylic acid, or other water soluble monomers, may vary for each emulsion and each application, exemplary amounts (as based on the weight percent of the total (soluble and insoluble) monomer weights) may include about 0% to about 25%, including each interval therein, and in other embodiments the amount may be about 0% to about 15%, including each interval therein. In some embodiments, this amount may be about 0% to about 10% or about 1% to about 10%, including each interval therein. In other embodiments, this amount may be about 10% of the total monomer weight. In yet other embodiments, this amount may be about 1 to 5%, including each intermittent value therein.

The pre-emulsion feed may also include an internal crosslinker, which may increase the gel content of the resulting polymer. In some embodiments, the internal crosslinker may include at least one multifunctional acrylate monomer. Such multifunctional acrylate monomer may include, by way of example, polyethylene glycol diacrylate, hexanedioldiacrylate, trimethylolpropanetriacrylate, pentaerythritoltriacrylate, and propylene glycol diacrylate. The internal crosslinker may be added at about 0.1 to about 1.0 parts by weight of the pre-emulsion feed.

By way of example, emulsions may be prepared by combining a monomer feed and a pre-emulsion feed in a reactor. In some embodiments, sequential polymerization may be employed in which the first monomer mixture may be added to a reactor and at least partially reacted and then the second monomer mixture is slowly introduced and reacted. In some embodiments, sequential polymerization may result in a polymer having a core made of the first monomer feed and a shell made of subsequent monomer feeds. Examples and further disclosure of sequential polymerization may be found in U.S. Pat. No. 6,706,836 (including examples 26 and 27), U.S. Pat. Nos. 6,465,591, and 6,828,399 and U.S. Published Patent Application No. 2003/0144446, each of which is incorporated in its entirety as if set forth fully herein.

In other embodiments, concurrent feeds may be used in which a first monomer mixture and a second monomer mixture are concurrently introduced into a reactor and reacted. In some embodiments employing a concurrent feed, a portion of a first monomer mixture and a portion of a second monomer mixture may be initially provided in the reactor. However, when such starting material is identical to the monomer feeds that are subsequently and concurrently introduced into the reactor, then the resulting polymeric emulsion is not believed to have a core and shell but instead has a consistent formulation. The examples provided herein provide parameters that may be used in certain embodiments using concurrent feeds. Although the foregoing processes have been described using only two monomer mixtures, one of ordinary skill in the art would readily appreciate that additional mixtures and feeds may be used in some embodiments.

An initiator, such as a dissociative initiator, a redox initiator, or an oil soluble initiator may also be added during the process. By way of example, such initiators may include, but are not limited to, persulfates such as ammonium persulfate, potassium persulfate and sodium persulfate, hydrogen peroxide, tert-butyl hydroperoxide, and azo compounds such as 4,4'-azobis(4-cyanovaleric acid). Redox initiators include, but are not limited to, persulfates with bisulfate, such as sodium persulfate with sodium metabisulfite, hydrogen peroxide with ferrous ion, sulfite ion, bisulfite ion or ascorbic acid, and hydroperoxides with sulfoxylates, such as tert-butyl hydroperoxide with sodium formaldehyde sulfoxylate. By way of example, such oil soluble initiators may include, but are not limited to, 2,2'-azobis (isobutyronitrile), 2,2'-azobis(2-methylbutyronitrile), benzoyl peroxide, and lauryl peroxide. Based on the disclosure herein, other initiators are known to those of skill in the art that would be suitable for use herein.

In preparing a polymeric emulsion, a surfactant may also be utilized in the method disclosed herein. In some embodiments, the surfactant may be sodium lauryl ether sulfate, such as Disponil FES 77 (32%) available from Cognis (a part of the BASF Group), of Cincinnati, Ohio. The surfactant may be included in an initial charge mixture as indicated in the examples herein. In some embodiments, surfactant may be added in an amount of from about 0.5% to about 5% as based on the dry weight of surfactant to weight of the monomers. In other embodiments, surfactant may be added in an amount of about 0.1% to about 10% based on the dry weight of surfactant to the weight of the monomers. In still other embodiments, this surfactant amount may be about 0.2% to about 5%, and in other embodiments the surfactant amount may be about 0.5% to about 2%. Based upon the disclosure herein, other surfactants are known to those of skill in the art that would be suitable for use herein.

By way of further example, and without limitation, other anionic surfactants that may be suitable for use in embodiments disclosed herein include sodium dioctylsulfosuccinate, lauryl sulfates, octyl sulfates, 2-ethylhexyl sulfates, lauramine oxide, decyl sulfates, tridecyl sulfates, cocoates, lauroylsarcosinates, lauryl sulfosuccinates, linear Ciodiphenyl oxide disulfonates, lauryl sulfosuccinates, lauryl ether sulfates (1 and 2 moles ethylene oxide), mystristyl sulfates, oleates, stearates, tallates, ricinoleates, cetyl sulfates.

In some embodiments, nonionic surfactants may be used along with anionic surfactants. By way of example, and without limitation, nonionic surfactants that may be used in embodiments disclosed herein include, methyl gluceth-10, PEG-20 methyl glucose distearate, PEG-20 methyl glucose sesquistearate, $C_{11-15}$ pareth-20, ceteth-12, dodoxynol-12, laureth-15, PEG-20 castor oil, polysorbate 20, steareth-20, polyoxyethylene-10 cetyl ether, polyoxyethyl-ene-10 stearyl ether, polyoxyethylene-20 cetyl ether, polyoxyethylene-oleyl ether, polyoxyethylene-20 oleyl ether, ethoxylatednonylphenol, ethoxylatedoctylphenol, ethoxylateddodecylphenol, or ethoxylated fatty ($C_6$-$C_{22}$) alcohol, including 3 to 20 ethylene oxide moieties, polyoxyethylene-20 isohexadecyl ether, polyoxyethylene-23 glycerol laurate, polyoxy-ethylene-20 glyceryl stearate, PPG-10 methyl glucose ether, PPG-20 methyl glucose ether, polyoxyethylene-20 sorbitan monoesters, polyoxyethylene-80 castor oil, polyoxyethyl-ene-15 tridecyl ether, polyoxyethylene-6 tridecyl ether, laureth-2, laureth-3, laureth-4, PEG-3 castor oil, PEG 600 dioleate, PEG 400 dioleate, oxyethanol, 2,6,8-trimethyl-4-nonyloxypolyethylene, oxyethanol: octylphenoxypolyethoxy ethanol, nonylphenoxypolyethoxy ethanol, and 2,6,8-trimethyl-4-nonyloxypolyethylene alkyleneoxypolyethyeneoxyethanol.

In addition, a stabilizer may also be used in the process to form an emulsion. In some embodiments, a suitable stabilizer includes polyvinyl alcohol, such as BP-04 (15%) grade from Chang Chun Pertochemical Co., Ltd. of Taipei, Taiwan or Mowiol 4-88 from Kuraray America, Inc. of Houston, Tex. In some embodiments, Elvanol 51-03 from Dupont Chemical of Wilmington, Del. and/or Selvol 203 from Sekisui Specialty Chemical Co., Ltd. of Osaka, Japan may be used stabilizers. The stabilizer may be included in an initial charge mixture and/or a pre-emulsion mixture. In some embodiments, a stabilizer may be added in an amount from about 1% to about 10% as based on the dry weight of stabilizer to the weight of the monomers. Based upon the disclosure herein, other stabilizers are known to those of skill in the art that would be suitable for use herein.

Finally, a crosslinker may be optionally used in preparing emulsions. In some embodiments, a crosslinker may be added to the copolymer in an amount of from about 0 to about 15%, including each intermittent value therein, as based on the dry weight of crosslinker to the dry weight of the copolymer. In some embodiments, a crosslinker may be added in an amount of from about 0 to about 10% based upon the dry weight of the copolymer. In other embodiments, the about 1, 2, 3, 4, 5, 6, 7, 8, 9, or 10% based on the dry weight of the copolymer. Suitable crosslinkers include, but are not limited to, formaldehydes, melamine formaldehydes, metal salts, aziridines, isocyanates, dichromates, and similar crosslinkers. Additional crosslinkers may include polyfunctionalaziridine, polyamide-epichlorohydrin-type resin, or carbodiimide compounds. Exemplary metal salts that may be used as crosslinkers in some embodiments include, without limitation, zirconium ammonium carbonate, zinc ammonium carbonate, aluminum acetate, calcium acetate, chromium acetate, zinc acetate, zirconium acetate. In other embodiments, no crosslinker is used in preparing an emulsion. Unless otherwise noted herein, percentages used to reference crosslinkers indicate dry weight of crosslinker to the dry weight of the copolymer. In some embodiments, the crosslinker comprises melamine formaldehyde or mixtures comprising melamine formaldehyde. In some embodiments, the crosslinker may be present in a percent weight amount of preferably about 1% to about 10%, more preferably 2% to 5%, and most preferably 3% to 4%.

As indicated above, the emulsions may be prepared by copolymerizing the water soluble monomer or monomers in the monomer feed and the water insoluble monomer or monomers in the pre-emulsion feed. In one exemplary embodiment, the preparation process may be conducted by also introducing an initial charge (also referenced as a "reactor charge"), a catalyst feed, an activator feed, and a post add feed into the reactor during the manufacturing process.

An exemplary process for preparing emulsions may commence by introducing an initial charge into a reactor. In some embodiments, the initial charge may include deionized water and one or more surfactants. The surfactants may be selected to improve the miscibility of the monomers or groups of monomers that will be copolymerized. In some embodiments, sodium lauryl ether sulfate may be used as a surfactant in the initial charge.

The initial charge may also include a stabilizer, such as polyvinyl alcohol, a surfactant, such as sodium lauryl ether sulfate, an initiator, such as tertiary-butyl hydroperoxide, an activator, such as sodium hydroxymethanesulfinate (available under the name Bruggolite E01 from Bruggemann Chemical of Newton Square, Pa.), and an oxygen scavenger, such as sodium iron ethylenediaminetetraacetate ("NaFe EDTA") (available from Supreme Resources, Inc. of Suwanee, Ga.). This initial charge may be added to a reactor and agitation may be initiated at an appropriate rate, such as at 80 revolutions per minute, to begin the preparation process. The reactor contents may also be heated to a temperature in the range of about 50° C. to about 60° C. In some embodiments, the reactor contents may be heated in the range of about 53° C. to about 55° C. In other embodiments, the reactor contents may be heated to about 55° C.

After the contents of the reactor are heated to the desired temperature, a portion of the monomer feed and a portion of the pre-emulsion feed may be added to the reactor. In some embodiments, the ratio of monomer feed to the pre-emulsion feed added to the reactor at this stage may be between about 2.5:1 and about 3.5:1, and in some embodiments the ratio may be about 3:1. In addition, an initial amount of feed may be added that is approximately 5-7% of the weight percentage of each of the monomer feed and the pre-emulsion feed.

Following the addition of these initial monomer mixtures to the reactor, the addition of the activator feed to the reactor may be initiated. The activator feed may include sodium hydroxylmethanesulfinate, such as Bruggolite E01 available from Bruggemann Chemical of Newton Square, Pa. In some embodiments, the activator feed may be supplied at a constant rate such that the contents will be exhausted contemporaneously with, or after, the subsequently-initiated monomer and pre-emulsion feeds become exhausted. In some embodiments, the activator feed may be exhausted within about thirty minutes of the monomer feed and pre-emulsion feed being exhausted, such as twenty minutes thereafter.

After initiating the activator feed, agitation of the reactor contents may be continued without additional content being added for a short period, such as ten minutes. Then, after a suitable lapse, the monomer feed and the pre-emulsion feed may be fed into the reactor. These feeds may be added at respective addition rates such that their contents are completely added to the reactor at the end of a predetermined time. For instance, in some embodiments, the contents of these feeds may be constantly added over the course of about 4.5 hours. As indicated above, the activator feed is also fed at a rate to deplete at the same time as the monomer and pre-emulsion feeds are depleted.

After the contents of the monomer feed and the pre-emulsion feed have been entirely added to the reactor, the reactor may be maintained at the desired temperature discussed above. The reactor environment may be maintained for approximately 30 minutes, and then a post add feed may be added to the reactor. The post add feed may include an initiator, such as tertiary-butyl hydroperoxide or a biocide, such as Acticide GA, available from Thor Specialties, Inc. of Trumbull, Conn. (which is an aqueous blend of chlorinated and non-chlorinated isothiazolinones and 2-bromo-2-nitro-1, 3-propanediol). After the post add feed has been introduced, the reaction environment may be maintained for approximately one hour.

By way of example and without intending to limit the scope, an example of one emulsion may be formed using the components set forth in Table 1 by performing the following steps, which in some embodiments may be performed in the recited order:

1. add the initial charge to the reactor and set agitation to 80 RPM;
2. heat and maintain the reactor contents at 55° C.;
3. prepare the monomer, catalyst and activator feeds;
4. add the following contents to the reactor when the existing reactor contents reach 55° C.:
   Monomer Feed: 13.7 lbs
   Pre-Emulsion Feed: 4.7 lbs;
5. start the activator feed (t=0);
6. after 10 minutes (t=10), begin introducing the pre-emulsion, monomer, and catalyst feeds over 270 minutes;
7. maintain the reactor contents at 55° C.;
8. after the pre-emulsion supply is exhausted from the feed, flush the tank and lines with rinse deionized water;
9. after the activator feed has been completely added (~t=300); maintain the environment with agitation for 30 minutes; and
10. after the aforementioned 30-minute period (~t=330), add post add feed and maintain the reactor contents at about 55° C. for 1 hour (until ~t=390).

TABLE 1

|  | Parts | % total | Batch Size 600 lbs Batch |
|---|---|---|---|
| Initial Charge |  |  |  |
| BP-04 (15%) polyvinyl alcohol | 8.12 | 0.0203 | 12.2 |
| Disponil FES 77 (32%) | 0.08 | 0.0002 | 0.12 |
| NaFe EDTA | 0.01 | 0.0000 | 0.01 |
| t-Butyl Hydroperoxide | 0.10 | 0.0002 | 0.14 |
| DI Water | 56.16 | 0.1402 | 84.1 |
| Reactor Charge Total | 64.46 |  | 96.55 |
| Monomer Feed |  |  |  |
| DI Water | 140.09 | 0.3497 | 209.8 |
| 2-Hydroxyethyl Methacrylate | 75.00 | 0.1872 | 112.3 |
| Feed Total | 215.09 |  | 322.2 |
| Pre Emulsion (Initial Tank) |  |  |  |
| DI Water | 7.92 | 0.0198 | 11.9 |
| Disponil FES 77 (32%) | 3.56 | 0.0089 | 5.3 |
| Polyvinyl alcohol (BP-04 (15%)) | 8.12 | 0.0203 | 12.2 |
| 2-Ethylhexyl Acrylate | 11.00 | 0.0275 | 16.5 |
| Methyl Methacrylate | 11.00 | 0.0275 | 16.5 |
| Methacrylic Acid | 3.00 | 0.0075 | 4.5 |
| Ammonium Hydroxide (19%) | 2.25 | 0.0056 | 3.37 |
| Pre-Emulsion Total | 46.84 |  | 70.2 |
| Catalyst Feed |  |  |  |
| DI Water | 16.28 | 0.0406 | 24.4 |
| t-Butyl Hydroperoxide | 0.38 | 0.0009 | 0.57 |
| Catalyst Total | 16.66 |  | 25.0 |
| Activator Feed |  |  |  |
| DI Water | 14.05 | 0.0351 | 21.0 |
| Bruggolite E01 | 0.28 | 0.0007 | 0.42 |
| Activator Total | 14.32 |  | 21.5 |
| Post Add Feed |  |  |  |
| t-Butyl Hydroperoxide | 0.20 | 0.0005 | 0.30 |
| Biocide (Acticide GA) | 0.11 | 0.0003 | 0.17 |
| DI Water | 1.98 | 0.0049 | 2.97 |
| Rinse Water |  |  |  |
| DI Water | 4.21 | 0.0105 | 6.3 |
| Dilution |  |  |  |
| DI Water | 36.69 | 0.0916 | 55.0 |
| Total | 400.56 | 1.000 | 600.0 |

TABLE 1-continued

Based on the foregoing procedures using the components in Table 1, the feed rate information may be summarized as follows:

| Monomer | Rate 1 | Rate 2 | Catalyst | Rate 1 |
|---|---|---|---|---|
| Weight (lbs) | 13.7 | 308.5 | Weight (lbs) | 25.0 |
| Time (min) |  | 270 | Time (min) | 270 |
| Rate (lbs/min) |  | 1.14 | Rate (lbs/min) | 0.09 |

| PreEmulsion | Rate1 | Rate 2 | Activator | Rate 1 |
|---|---|---|---|---|
| Weight (lbs) | 4.7 | 65.5 | Weight (lbs) | 21.5 |
| Time (min) |  | 270 | Time (min) | 300 |
| Rate (lbs/min) |  | 0.24 | Rate (lbs/min) | 0.07 |

By way of a second example, an emulsion was also prepared by performing the following steps using the components set forth in Table 2 below:

1. adding reactor charge to the reactor; agitating and heating the reactor contents to 53-55° C. with a 55° C. bath;
2. adding 35.2 g monomer feed and 11.1 g pre-emulsion feed to the reactor;
3. initiating the activator feed at a rate to exhaust in 300 minutes, i.e., at 0.17 g/min (51.0 g);
4. maintaining the system for 10 minutes and then initiating the monomer feed and the pre-emulsion feed to exhaust in 270 mins, i.e., at 1.90 g/min (512.8 g) and 0.57 g/min (154.7 g), respectively;
5. maintaining the reaction environment in the system for 30 minutes;
6. adding the post add feed after the contents of the activator feed have been completely added; and
7. maintaining the reaction environment for about 1 hour and then cooling.

TABLE 2

|  | Wt (grams) |
|---|---|
| Reactor Charge |  |
| Mowiol 4-88 (15%) | 28.9 |
| Disponyl FES 77 (32%) | 0.28 |
| NaFe EDTA | 0.02 |
| TBHP 70 | 0.28 |
| DI Water | 197.3 |
| Reactor Charge Total | 226.8 |
| #1 Monomer Feed |  |
| DI Water | 279.6 |
| 2-Hydroxyethyl Methacrylate | 267.0 |
| TBHP 70 | 1.41 |
| Monomer Feed Total | 548.0 |
| #2 Pre-Emulsion Feed |  |
| DI Water | 28.2 |
| Disponyl FES 77 (32%) | 12.7 |
| Mowiol 4/88 (15%) | 28.9 |
| $NH_3$ (30%) | 7.0 |
| 2-Ethyhexyl Acrylate | 78.3 |
| Methacrylic Acid | 10.7 |
| Emulsion Feed Total | 165.8 |
| #3 Activator Feed |  |
| DI Water | 50.0 |
| Buggolite E01 | 0.99 |
| Activator Feed Total | 51.0 |
| Post Add Feed |  |
| TBHP 70 | 0.71 |
| Acticide GA | 0.40 |
| DI Water Dilution | 7.05 |
| DI Water | 425.00 |
| Total | 1424.8 |

As evidenced by the foregoing description and examples, aqueous emulsions prepared with total monomer amounts including over 50% water soluble monomers and at least 10% water insoluble monomers may be provided. In some embodiments, water soluble monomers may account for between about 50% and about 90% of the total monomers used in the process, including each intermittent value therein. In other embodiments, water soluble monomers may account for about 75% of the total monomer content. In addition, the emulsion may be formed using about 10% or more water insoluble monomers. In some embodiments, one or more water soluble monomers may account for about 10% to about 50%, including each intermittent value therein, of the total monomers used in the process. In some embodiments, multiple different soluble and/or insoluble monomers may be used as part of the monomer contents. In embodiments in which the emulsions are used as coatings, the water soluble monomer(s) may impart a hydrogel nature to the coating, which may provide desirable donning characteristics, and the water insoluble monomer(s) may provide other desirable properties and performances characteristics to the coating. Therefore, the water soluble and water insoluble monomer proportions may be varied to result in the desired characteristics for a particular application.

Testing was performed on samples of water-soluble copolymer coatings, solvent-based copolymer coatings, and copolymer emulsion coatings, wherein the polymer emulsions were prepared in accordance with the procedures disclosed herein. The samples were prepared using the indicated monomer ratios. The emulsion samples were prepared using the procedures set forth above for the Table 2 components except as modified by the components for each sample as identified below.

TABLE 3

| Sample Reference | Polymer Base | HEMA/EHA/MAA |
|---|---|---|
| 1 | Water | 60/30(HBA)/10 |
| 2 | Water | 60/30(HBA)/10 |
| 3 | Water | 90/0/10 |
| 4 | Water | 90/0/10 |
| 5 | Water | 97/0/3 |
| 6 (90% Sample 3 - 10% Sample 2) | Water | 87/3(HBA)/10 |
| 7 (90% Sample 3 - 10% Sample 2) | Water | 87/3(HBA)/10 |
| 8 | Solvent | 68/23/9 |
| 9 | Solvent | 93/5/2 |
| 10 | Solvent | 95/5/0 |
| 11 | Solvent | 75/25/0 |
| 12 | Emulsion | 75/22/3 |

TABLE 3-continued

| Sample Reference | Polymer Base | HEMA/EHA/MAA |
|---|---|---|
| 13 | Emulsion | 75/22/3 |
| 14 | Emulsion | 75/22/3 |
| 15 | Emulsion | 75/22(EHMA)/3 |
| 16 | Emulsion | 75/22(EHMA)/3 |
| 17 | Emulsion | 75/22(LM)/3 |
| 18 | Emulsion | 75/22(LM)/3, with Silica |
| 19 | Emulsion | (HEMA/EHA/MMA/MAA: 75/11/11/3) |
| 20 | Emulsion | (HEMA/EHA/MMA/MAA: 75/14/8/3) |
| 21 | Emulsion | (HEMA/EHA/MMA/MAA: 75/17/6/3) |
| 22 | Emulsion | (HEMA/EHA/MMA/MAA: 75/19/3/3) |
| 23 | Emulsion | (HEMA/EHA/MMA/MAA: 75:11.8:11.8:1.5) |
| 24 | Emulsion | (HEMA/EHA/MMA/MAA: 75/10.3/10.3/4.5) |
| 25 | Emulsion | (HEMA/EHA/MMA/MAA: 75/9.5/9.5/6.0) |

As used above and herein, the term HEMA references 2-hydroxyethyl methacrylate, EHA references 2-ethylhexyl acrylate, HBA represents 4-hydroxybutyl acrylate, MAA references methacrylic acid, EHMA references 2-ethylhexyl methacrylate, LM references lauryl methacrylate, and MMA references methyl methacrylate. In addition, the crosslinkers referenced above are 2% XC113 (available from Shanghai Zealchen Co. Ltd. of Shanghai, China) which is a polyfunctionalaziridine, 0.5% Tyzor AA (available form DuPont of Wilmington, Del.), which is titanium acetylacetonate, 2% Polycup 172 (available from Ashland of Columbus, Ohio), which is a water soluble, polyamide-epichlorohydrin-type resin, and 2% Carbodilite E-02 (available from Nissinbo Chemical Inc. of Chiba, Japan), which is a carbodimide compound. The amount of crosslinker is based on dry weight of crosslinker to dry weight of copolymer.

The comparative samples evaluated were prepared in accordance with the following general procedures and using the approximate parameters indicated below:

TABLE 4

Samples 1 and 2

| | grams | Procedures |
|---|---|---|
| Reactor Charge | | 1. Add Reactor Charge and heat to |
| Deionized water | 485.0 | about 74-75° C. with a N$_2$ purge. |
| Initial Initiator | | Wait approximately 15 to 30 minutes. |
| Denonized Water | 15.0 | 2. Add Initial Initiator to heated |
| Sodium Persulfate | 3.0 | Reactor Charge. |
| (1.0% BOM) | | 3. After ten minutes, start Monomer |
| Monomer Feed | | Feed at 3.33 g/min (3 hours). |
| 2-Hydroxymethyl methacrylate | 180.0 | 4. After Monomer Feed, wait thirty minutes and then start Cook-off #1 at |
| 4-Hydroxybutyl acrylate | 90.0 | 0.84 g/min (1 hour). |
| Methacrylic acid | 30.0 | 5. After about thirty minutes after |
| Deionized water | 285.0 | Cook-off #1 added, start Cook-off #2 |
| Ammonium hydroxide | 14.0 | at 0.84 g/min (1 hour). |
| Cook-off #1 | | 6. Add dilution water as needed. |
| Deionized water | 50.0 | 7. After Cook-off #2 completely |
| Sodium Persulfate | 0.30 | added, wait about thirty minutes and then dilute to 4% and start cooling |
| Cook-off #2 | | and |
| Deionized water | 50.0 | discharge. |
| Sodium Metabisulfite | 0.30 | |
| Total | 1202.6 | |

TABLE 5

Samples 3 and 4

| | grams | Procedures |
|---|---|---|
| Reactor Charge | | 1. Add Reactor Charge and heat to |
| Deionized water | 727.5 | 74-75° C. with a N$_2$ purge. Wait |
| Initial Initiator | | approximately 15 to 30 minutes. |
| Denonized Water | 22.5 | 2. Add Initial Initiator to heated Reactor |
| Sodium Persulfate | 2.25 | Charge. |
| (0.5% BOM) | | 3. After ten minutes, start Monomer |
| Monomer Feed | | Feed at 5.27 g/min (3 hours). |
| 2-Hydroxymethyl methacrylate | 405 | 4. After Monomer Feed, wait thirty minutes and then add Cook-off #1. |
| Methacrylic acid | 45.0 | 5. After one hour, add Cook-off #2. |
| Deionized water | 477.5 | 6. After one hour, dilute to 4% and start |
| Ammonium hydroxide | 21.0 | cooling and discharge. |
| Cook-off #1 | | |
| Deionized water | 50.0 | |
| Sodium Persulfate | 0.5 | |
| Cook-off #2 | | |
| Deionized water | 50.0 | |
| Sodium Metabisulfite | 0.5 | |
| Total | 1801.7 | |

TABLE 6

Sample 5

| | grams | Procedures |
|---|---|---|
| Reactor Charge | | 1. Add Reactor Charge and heat to |
| Deionized Water | 565.0 | 74-75° C. with a N$_2$ purge. Wait |
| Initial Initiator | | approximately 15 to 30 minutes. |
| Denonized Water | 15.0 | 2. Add Initial Initiator to heated reactor. |
| Sodium Persulfate | 3.0 | 3. Wait ten minutes after Initial Initiator |
| Monomer Feed | | added and then start Monomer Feed at |
| 2-HEMA (San Esters) | 291.0 | 3.29 g/min (592 g) (3 hrs.) and turn N$_2$ |
| Methacrylic acid | 9.0 | off. |
| Deionized water | 283.0 | 4. After monomer feed added, wait one |
| Ammonium hydroxide (19%) | 12.0 | hour and then add Cook-off #1. |
| Cook-off #1 | | 5. After Cook-off #1 added, wait one hour and then add cook-off #2. |
| Deionized Water | 10.00 | 6. One hour after Cook-off #2 added, |
| Sodium Persulfate | 0.30 | dilute to 4%, and start cooling and |
| Cook-off #2 | | discharge. |
| Deionized Water | 10.00 | |
| Sodium Metabisulfite | .30 | |
| Acticide GA | 1.40 | |
| Total | 1200.0 | |

TABLE 7

Sample 8

| | grams | Procedures |
|---|---|---|
| Monomer Mix | | 1. Add Reactor Charge and heat to |
| 2-Hydroxyethyl Methacrylate (San Esters) | 204.0 | 74-75° C. with a N$_2$ purge. (For sample 8, the reaction temperature fluctuated from about 70° C. to about 76° C. but |

TABLE 7-continued

Sample 8

| | grams | Procedures |
|---|---|---|
| 2-Ethylhexyl Acrylate | 69.0 | was primarily maintained within the |
| Methacrylic Acid | 27.0 | indicated 74-75° C. range.) Wait |
| Ethanol | 204.0 | approximately 15 to 30 minutes. |
| Ethyl Acetate | 69.0 | 2. Add Initial Initiator to heated Reactor |
| Methanol | 27.0 | Charge. Remove $N_2$ after the addition. |
| Reactor Charge | | 3. After "kick off," wait ten minutes and |
| | | |
| Monomer Mix | 150.0 | start Monomer Feed at 3.33 g/min |
| Initial Initiator | | (599 g) (3 hours). For Sample 8, |
| | | |
| Vazo 64 (0.1% BOM) | 0.08 | Monomer Feed was started about thirty |
| Ethanol | 10.00 | minutes after adding Initial Initiator. |
| Monomer Feed | | 4. Start Solvent Feed as needed: (2 hr) = |
| | | |
| Monomer Mix | 450.0 | 2.28 g/min (273 g). For Sample 8, |
| Vazo 64 (0.1% BOM) | 0.23 | Solvent Feed was started about 2.5 |
| Solvent Feed | | hours after Monomer Feed started and |
| | | |
| Ethanol | 204 | continued for about 45 minutes, and |
| Ethyl Acetate | 69 | then restarted after about 15 minutes. |
| Cook-off Feed | | 5. After Monomer Feed, wait about |
| | | |
| Vazo 64 | 1.0 | 15-30 minutes and then start Cook-off |
| Ethanol | 40.00 | Feed at 0.34 g/min (41 g). Wait one |
| Final Dilution | | hour, then dilute to 4% and start cooling |
| | | |
| Isopropyl Alcohol | 75.70 | and discharge. |
| | | |
| Total | 1000.0 | As used herein, "kick off" indicates when reaction or polymerization begins and is noted with an increase in reaction temperature or bubbles in the reactor as the reaction begins to boil or increase in viscosity and trap air. |

Note:
Vazo 64 is 2,2'-Azobis(2-methylpropionitrile), available from DuPont of Wilmington, Delaware.

TABLE 8

Sample 9

| | grams | Procedures |
|---|---|---|
| Monomer Mix | | 1. Add Reactor Charge and heat to |
| 2-Hydroxyethyl Methacrylate (San Esters) | 279.0 | 74-75° C., with a $N_2$ purge. Wait approximately 15 to 30 minutes. |
| 2-Ethylhexyl Acrylate | 15.0 | 2. Add Initial Initiator to heated Reactor Charge. |
| Methacrylic Acid | 6.0 | 3. After kick-off bubbling noticed, wait |
| Methanol | 231.0 | ten minutes and start Monomer Feed at |
| Ethyl Acetate | 69.0 | 2.50 g/min (450.2 g) (3 hours). For |
| Reactor Charge | | Sample 9, Monomer Feed started at |
| | | |
| Monomer Mix | 150.0 | about thirty minutes after Initial Initiator |
| Initial Initiator | | added. |
| | | |
| Vazo 64 (0.1% BOM) | 0.08 | 4. Start Solvent Feed as needed at 2.28 |
| Ethyl Acetate | 10.0 | g/min (273 g) (2 hr). For Sample 9, |
| Monomer Feed | | Solvent Feed started at about 2.5 hours |
| | | |
| Monomer Mix | 450.0 | after Monomer Feed started and run |
| Vazo 64 (0.1% BOM) | 0.23 | for about 1.5 hours and then restarted |
| Solvent Feed | | after about 1.5 hours to add the |
| | | |
| Ethanol | 204 | remainder of Solvent Feed after |
| Ethyl Acetate | 69 | Cook-off started. |
| Cook-off Feed | | 5. After Monomer Feed, wait 30 |
| | | |
| Vazo 64 | 1.0 | minutes (for Sample 9 the wait was |
| Ethyl Acetate | 20.0 | about one hour) and then start Cook-off |
| Ethanol | 20.0 | Feed at 0.34 g/min (41 g) (2 hours). |

TABLE 8-continued

Sample 9

| | grams | Procedures |
|---|---|---|
| Final Dilution | | Wait one hour (about 30 minutes for |
| Isopropyl Alcohol | 75.70 | Sample 9) after the Cook-Off Feed |
| Ethanol | 200.0 | added, then dilute to 4% and start |
| Total | 1200 | cooling and discharge. |

TABLE 9

Sample 10

| Monomer Mix | grams | Procedures |
|---|---|---|
| 2-Hydroxyethyl Methacrylate | 285.0 | 1. Add Reactor Charge and heat to 68-70° C., with |
| 2-Ethylhexyl Acrylate EHA | 15.0 | a $N_2$ purge. Wait approximately 15 to 30 minutes. |
| Methanol | 240.0 | 2. Add Initial Initiator to |
| Ethanol | 270.0 | heated Reactor Charge. |
| Ethyl Acetate | 140.0 | 3. After Kick-off, wait ten |
| Reactor Charge | | minutes and then start |
| | | |
| Monomer Mix (75g monomer) | 240.0 | Monomer Feed (w/$N_2$) at 3.96 g/min (713.2 g) |
| Initial Initiator | | (3 hours). |
| | | |
| Vazo 64 (0.1% BOM) | 0.08 | 4. After Monomer Feed added, |
| Ethyl Acetate | 10.00 | wait 30 minutes and then |
| Monomer Feed | | start Cook-off Feed |
| | | |
| Monomer Mix | 710.0 | at 0.34 g/min (41 g) |
| Vazo 64 (0.1% BOM) | 0.22 | (2 hours). |
| Cook-off Feed | | 5. Hold 1 Hour after |
| | | |
| Vazo 64 | 1.0 | Cook-off Feed added, then |
| Ethyl Acetate | 20.0 | dilute to 4% and start |
| Ethanol | 20.0 | cooling and discharge. |
| | | |
| Total | 1001.3 | |

TABLE 10

Sample 11

| Monomer Mix | grams | Procedures |
|---|---|---|
| 2-Hydroxyethyl Methacrylate | 225.0 | 1. Add Reactor Charge and heat to 68-70° C., with |
| 2 Ethylhexyl Acrylate | 75.0 | a $N_2$ purge. Wait approximately |
| Methanol | 240.0 | 15 to 30 minutes. |
| Ethanol | 270.0 | 2. Add Initial Initiator |
| Ethyl Acetate | 140.0 | to heated Reactor Charge. |
| Reactor Charge | | 3. After Kick-off, wait 10 |
| | | |
| Monomer Mix (75g monomer) | 240.0 | minutes and then start Monomer Feed |
| Initial Initiator | | (w/$N_2$) at 3.96 g/min (713.2 g) |
| | | |
| Vazo 64 (0.1% BOM) | 0.08 | (3 hours). |
| Ethyl Acetate | 10.00 | 4. After Monomer Feed |
| Monomer Feed | 710.0 | added, wait 30 minutes |
| Monomer Mix | 0.22 | and then start Cook-off Feed at 0.34 g/min (41 g) |
| | | |
| Vazo 64 (0.1% BOM) | | (2 hours). |
| Cook-off Feed | | 5. Dilute to 4% and start cooling and discharge. |
| | | |
| Vazo 64 | 1.0 | |
| Ethyl Acetate | 20.0 | |

TABLE 10-continued

Sample 11

| Monomer Mix | grams | Procedures |
|---|---|---|
| Ethanol | 20.0 | |
| Total | 1001.3 | |

TABLE 11

Samples 12, 13, and 14

| Reactor Charge | grams | Procedures |
|---|---|---|
| Mowiol 4/88 (15%) | 28.9 | 1. Add Reactor Charge |
| Disponyl FES 77(32%) | 0.28 | and heat to 53-55° C., with |
| NaFe EDTA | 0.02 | a 55° C. bath. Wait |
| TBHP 70 | 0.28 | approximately 15 to 30 |
| Deionized Water | 197.3 | minutes. |
| Monomer Feed | | 2. Add 35.2 g Monomer |
| Deionized Water | 279.6 | Feed and 11.1 g Pre- |
| HEMA | 267.0 | Emulsion. Wait |
| TBHP 70 | 1.41 | approximately 15 to 30 minutes. |
| Pre-Emulsion | | 3. Start Activator Feed. At 0.17 g/min |
| DI Water | 28.2 | (51.0 g) (300 min). |
| Disponyl FES 77 (32%) | 12.7 | 4. After fifteen minutes, |
| Mowiol 4/88 (15%) | 28.9 | start Monomer Feed and |
| NH₃ (30%) | 7.0 | Pre-Emulsion. Monomer |
| Ethyhexyl Acrylate | 78.3 | Feed at 1.90 g/min |
| Methacrylic Acid | 10.7 | (512.89 g) (270 minutes) |
| Activator Feed | | and Pre-Emulsion at 0.57 |
| Deionized Water | 50.0 | g/min (154.7 g) (270 minutes). |
| Buggolite E01 | 0.99 | 5. Wait 30 minutes after |
| Post Add | | Activation Feed added, |
| TBHP 70 | 0.71 | and then add Post Add. |
| Acticide GA | 2 drops | Then, dilute to 4% and start cooling and discharge. |
| Deionized Water | 7.05 | |
| Deionized Water | 425 | |
| Total | 1425 | |

TABLE 12

Samples 15 and 16

| Reactor Charge | grams | Procedures |
|---|---|---|
| Mowiol 4/88 (15%) | 28.9 | 1. Add Reactor Charge and |
| Disponyl FES 77(32%) | 0.28 | heat to 53-55° C., with |
| NaFe EDTA | 0.02 | a 55° C. bath. Wait |
| TBHP 70 | 0.28 | approximately 15 to 30 |
| Deionized Water | 197.3 | minutes. |
| Monomer Feed | | 2. Add 35.2 g Monomer |
| Deionized Water | 559.2 | Feed and 11.1 g Pre- |
| 2-Hydroxyethyl Methacrylate | 267.0 | Emulsion. 3. Start Activator Feed at |
| TBHP 70 | 1.4 | 0.17 g/min (51.0 g) |
| Pre-Emulsion | | (300 min) |
| Deionized Water | 28.2 | 4. After 10 minutes, start |
| Disponyl FES 77 (32%) | 12.7 | Monomer Feed and Pre- |
| Mowiol 4/88 (15%) | 28.9 | Emulsion. Monomer Feed at |
| NH₃ (19%) | 7.0 | 2.93 g/min (792.4 g) |
| 2-Ethylhexyl methacrylate | 78.3 | (270 min) and Pre-Emulsion |
| Methacrylic Acid | 10.7 | at 0.57 g/min |
| Activator Feed | | (154.7 g) (270 min). |

TABLE 12-continued

Samples 15 and 16

| Reactor Charge | grams | Procedures |
|---|---|---|
| Deionized Water | 50.0 | After Monomer Feed and Pre- |
| Buggolite E01 | 1.0 | Emulsion added, add 10 g of |
| Post Add | | deionized water from |
| TBHP 70 | 0.71 | Dilution. |
| Acticide GA | 0.40 | 5. Wait 30 minutes after |
| DI Water Dilution | 7.05 | Activation Feed added, then add Post Add. Wait one hour |
| Deionized Water | 135.6 | after Post Add |
| Total | 1425.0 | added, then dilute to 4% and start cooling and discharge. |

TABLE 13

Samples 17 and 18

| Reactor Charge | grams | Procedures |
|---|---|---|
| Mowiol 4/88 (15%) | 28.9 | 1. Add Reactor Charge and |
| Disponyl FES 77 (32%) | 0.28 | heat to 53-55° C., with |
| NaFe EDTA | 0.02 | a 55° C. bath. Wait approximately |
| TBHP 70 | 0.28 | 15 to 30 |
| Deionized Water | 197.3 | minutes. |
| Monomer Feed | | 2. Add 35.2 g Monomer |
| Deionized Water | 559.2 | Feed and 11.1 g Pre- |
| 2-Hydroxyethyl Methacrylate | 267.0 | Emulsion. 3. Start Activator Feed |
| TBHP 70 | 1.41 | at 0.17 g/min (51.0 g) |
| Pre-Emulsion | | (300min). |
| Deionized Water | 28.2 | 4. After 10 minutes, start |
| Disponyl FES 77 (32%) | 12.7 | Monomer Feed and Pre - |
| Mowiol 4/88 (15%) | 28.9 | Emulsion. Monomer Feed |
| NH₃ (19%) | 7.0 | at 2.93 g/min (792.4 g) |
| Lauryl Methacrylate (LM) | 78.3 | (270 min) and Pre-Emulsion |
| Methacrylic Acid | 10.7 | at 0.57 g/min |
| Activator Feed | | (154.7 g) (270min). |
| Deionized Water | 50.0 | 5. Wait 30 minutes after |
| Buggolite E01 | 0.99 | Activation Feed added, |
| Post Add | | then add Post Add. |
| TBHP 70 | 0.71 | Wait one hour after Post Add |
| Acticide GA | 0.40 | added, then dilute to 4% |
| DI Water Dilution | 7.05 | and start cooling and discharge. |
| Deionized Water | 135.6 | |
| Total | 1425.0 | |

TABLE 14

Sample 19

| Reactor Charge | grams | Procedures |
|---|---|---|
| Mowiol 4/88 (15%) | 28.9 | 1. Add Reactor Charge and |
| Disponyl FES 77(32%) | 0.28 | heat to 53-55° C., with |
| NaFe EDTA | 0.02 | a 55° C. bath. Wait |
| TBHP 70 | 0.28 | approximately 15 to 30 |
| Deionized Water | 197.3 | minutes. |
| Monomer Feed | | 2. Add 35.2 g Monomer Feed |
| Deionized Water | 559.2 | and 11.1 g Pre- |
| 2-Hydroxyethyl Methcrylate | 267.0 | Emulsion. |

TABLE 14-continued

Sample 19

| Reactor Charge | grams | Procedures |
|---|---|---|
| TBHP 70 | 1.41 | 3. Start Activator Feed |
| Pre-Emulsion | | at 0.17 g/min (51.0 g) (300 |
| Deionized Water | 28.2 | minutes). |
| Disponyl FES 77 (32%) | 12.7 | 4. After 10 minutes start |
| Mowiol 4/88 (15%) | 28.9 | Monomer Feed and Pre- |
| NH$_3$ (19%) | 7.0 | Emulsion with Monomer |
| 2-EHA | 39.2 | Feed at 2.90 g/min |
| Methyl Methacrylate | 39.2 | (792.4g) (270min) |
| Methacrylic Acid | 10.7 | and Pre-Emulsion at 0.57 |
| Activator Feed | | g/min (154.7g) (270min). |
| Deionized Water | 50.0 | 5. Wait thirty minutes after |
| Buggolite E01 | 0.99 | Activator Feed added |
| Post Add | | and then add Post Add. |
| TBHP 70 | 0.71 | Wait one hour and then |
| Acticide GA | 0.40 | dilute to 4% and start |
| Deionized Water | 7.05 | cooling and discharge. |
| Rinse Water | | |
| Deionized Water | 15.00 | |
| Dilution | | |
| Deionized Water | 130.60 | |
| Total | 1425.0 | |

The emulsion samples 20, 21 and 22 evaluated were prepared in accordance with the following general procedures and using the approximate parameters indicated in Table 15 below:

1. Add the Reactor Initial Charge and heat the batch to 55° C.;
2. Add 1.1 gram of Pre-emulsion and 68.8 gram of Monomer Feed to the reactor;
3. Hold the batch to allow the batch temperature to equilibrate to 55° C.;
4. Start the Activator Feed at 0.17 g/min for 15 minutes;
5. Co-feed the Monomer Feed and the Pre-emulsion feed for 270 minutes;
6. After the Activator Feed, cook the batch for 30 minutes;
7. Add Post-Add and hold for another 60 minutes;
8. Cool down the batch and add biocides, rinse and dilution.

TABLE 15

| Reactor Initial Charge | Sample 20 Charge (gram) | Sample 21 Charge (gram) | Sample 22 Charge (gram) |
|---|---|---|---|
| BP-04 (15%) | 34.3 | 34.3 | 34.3 |
| NaFe EDTA | 0.02 | 0.02 | 0.02 |
| t-BHP, 70% | 0.20 | 0.20 | 0.20 |
| Deionized Water | 190.5 | 190.5 | 190.5 |
| Monomer Feed | | | |
| Deionized Water | 547.0 | 547.0 | 547.0 |
| 2-Hydroxyethyl Methacrylate | 262.0 | 262.0 | 262.0 |
| t-BHP, 70% | 0.83 | 0.83 | 0.83 |
| Pre-Emulsion | | | |
| Deionized Water | 21.5 | 21.5 | 21.5 |
| Disponil FES 77 (32%) | 15.2 | 15.2 | 15.2 |
| BP-04 (15%) | 34.3 | 34.3 | 34.3 |
| Ammonia, 19% | 16.0 | 16.0 | 16.0 |
| 2-Ethylhexyl Acrylate | 48.1 | 57.8 | 67.4 |
| Methyl Methacrylate | 28.9 | 19.3 | 9.6 |
| Methacrylic Acid | 10.5 | 10.5 | 10.5 |
| Activator Feed, solids | | | |
| Deionized Water | 49.6 | 49.6 | 49.6 |
| Bruggolite E01 | 1.00 | 1.00 | 1.00 |
| Post Add | | | |
| t-BHP, 70% | 0.20 | 0.20 | 0.20 |
| Deionized Water | 2.00 | 2.00 | 2.00 |
| Bruggolite E01 | 0.19 | 0.19 | 0.19 |
| NaFe EDTA | 0.01 | 0.01 | 0.01 |
| Deionized Water | 5.00 | 5.00 | 5.00 |
| Biocides | | | |
| Acticide GA | 0.40 | 0.40 | 0.40 |
| Deionized Water | 6.90 | 6.90 | 6.90 |
| Rinse Water | | | |
| Deionized Water Dilution | 14.70 | 14.70 | 14.70 |
| Deionized Water | 110.70 | 110.70 | 110.70 |
| Grand Total | 1400.1 | 1400.2 | 1400.1 |

In addition, in some embodiments, the dry donning performance of a coating can be further improved by the acid monomer, such as methacrylic acid, in the monomer feed and/or the pre-emulsion feed. By way of example, the emulsion samples 23, 24 and 25 evaluated were prepared based upon the Table 16 below in accordance with the following general procedures and using the approximate parameters indicated below:

1. Add the Reactor Initial Charge and heat the batch to 55° C.;
2. Add 1.1 gram of Pre-emulsion and 68.8 gram of Monomer Feed to the reactor;
3. Hold the batch to allow the batch temperature to equilibrate to 55° C.;
4. Start the Activator Feed at 0.17 g/min for 15 minutes;
5. Co-feed the Monomer Feed and the Pre-emulsion feed for 270 minutes;
6. After the Activator Feed, cook the batch for 30 minutes;
7. Add Post-Add and hold the batch for another 60 minutes;
8. Cool down the batch and add biocides, rinse and dilution.

TABLE 16

| Reactor Initial Charge | Sample 23 Charge (gram) | Sample 24 Charge (gram) | Sample 25 Charge (gram) |
|---|---|---|---|
| BP-04 (15%) | 33.7 | 33.7 | 33.7 |
| NaFe EDTA | 0.02 | 0.02 | 0.02 |
| t-BHP, 70% | 0.20 | 0.20 | 0.20 |
| Deionized Water | 191.1 | 191.1 | 191.1 |
| Monomer Feed | | | |
| Deionized Water | 547.0 | 547.0 | 547.0 |
| 2-Hydroxyethyl Methacrylate | 262.0 | 262.0 | 262.0 |
| t-BHP, 70% | 0.83 | 0.83 | 0.83 |
| Pre-Emulsion | | | |
| Deionized Water | 34.1 | 18.0 | 10.0 |
| Disponil FES 77 (32%) | 15.2 | 15.2 | 15.2 |
| BP-04 (15%) | 33.7 | 33.7 | 33.7 |
| Ammonia, 19% | 8.0 | 24.0 | 32.0 |

TABLE 16-continued

| Reactor Initial Charge | Sample 23 Charge (gram) | Sample 24 Charge (gram) | Sample 25 Charge (gram) |
|---|---|---|---|
| 2-Ethylhexyl Acrylate | 41.1 | 35.9 | 33.3 |
| Methyl Methacrylate | 41.1 | 35.9 | 33.3 |
| Methacrylic Acid | 5.3 | 15.8 | 21.0 |
| Activator Feed | | | |
| Deionized Water | 49.6 | 49.6 | 49.6 |
| Bruggolite E01 | 1.00 | 1.00 | 1.00 |
| Post Add | | | |
| t-BHP, 70% | 0.40 | 0.40 | 0.40 |
| Deionized Water | 1.80 | 1.80 | 1.80 |
| Bruggolite E01 | 0.19 | 0.19 | 0.19 |
| NaFe EDTA | 0.01 | 0.01 | 0.01 |
| Deionized Water | 5.00 | 5.00 | 5.00 |
| Biocides | | | |
| Acticide GA | 0.40 | 0.40 | 0.40 |
| Deionized Water | 6.90 | 6.90 | 6.90 |
| Rinse Water | | | |
| Deionized Water | 10.60 | 10.60 | 10.60 |
| Dilution | | | |
| Deionized Water | 180.70 | 180.70 | 180.70 |
| Grand Total | 1470.0 | 1470.0 | 1400.1 |

In embodiments for rubber or latex gloves, the gloves may require the ability of donning, i.e, the ability to slide a glove on and off the surface of the skin, with minimal friction. As such, a flexible, non-tacky glove coating applied to the interior of a glove may be useful to allow donning, wet or dry, of the glove with minimal blocking and without undue friction or clinging. Thus, for these and/or other considerations, comparative testing of the foregoing coating samples above was performed by coating latex films with the sample coatings, wherein one sample coating was applied to each film. Prior to application to the film, solvent-based coating samples were diluted to approximately 4% total solid concentration using a mixture of methanol and ethyl acetate, and the emulsion and water soluble coatings were diluted with deionized water to approximately 4% total solid concentration. Then, for samples indicated as having a crosslinker, the indicated crosslinker was added to the copolymer. The polymer solution was then coated on latex film using a standard dipping procedure. Subsequently, the coated film was chlorinated with chlorine strength of about 100 parts per millions in order to remove any powder and reduce the surface tackiness.

The samples were tested to determine their dry static and kinetic coefficients of friction ("COF") and also to determine their levels of stickiness and smoothness. The results are reported below in Table 17 for solvent-based polymer coatings, Table 18 for water-soluble polymer coatings, and Table 19 for polymeric emulsions.

TABLE 17

| | Sample 8 Solvent | Sample 9 Solvent | Sample 10 Solvent | Sample 11 Solvent |
|---|---|---|---|---|
| 2-hydroxethyl methacrylate | 68 | 93 | 95 | 75 |
| 2-ethylhexyl acrylate | 23 | 5 | 5 | 25 |
| methacrylic acid | 9 | 2 | | |
| 4-hydroxybutyl acrylate | | | | |
| 2-ethylhexyl methacrylate | | | | |
| lauryl methacrylate | | | | |
| methyl methacrylate | | | | |
| total | 100 | 100 | 100 | 100 |
| Crosslinker added | 2% XC113 | 2% XC113 | 0.5% Tyzor AA | 0.5% Tyzor AA |
| Test Data | | | | |
| COF - Static | 0.09 | 0.10 | 0.03 | 0.08 |
| COF - Kinetic | 0.07 | 0.09 | 0.03 | 0.07 |
| Stickness—Formed | non tacky | non tacky | non tacky | non tacky |
| Stickness—Chlorinated | non tacky | non tacky | non tacky | non tacky |
| Smoothness—Formed | smooth | smooth | smooth | smooth |
| Smoothness—Chlorinated | smooth | smooth | smooth | smooth |

TABLE 18

| | Sample 1 Water Soluble | Sample 2 Water Soluble | Sample 3 Water Soluble | Sample 4 Water Soluble | Sample 5 Water Soluble | Sample 6 Water Soluble | Sample 7 Water Soluble |
|---|---|---|---|---|---|---|---|
| 2-hydroxyethyl methacrylate | 60 | 60 | 90 | 90 | 97 | 87 | 87 |
| 2-ethylhexyl acrylate | | | | | | | |
| methacrylic acid | 10 | 10 | 10 | 10 | 3 | 10 | 10 |
| 4-hydroxybutyl acrylate | 30 | 30 | | | | 3 | 3 |
| 2-ethylhexyl methacrylate | | | | | | | |
| methyl methacrylate | | | | | | | |
| total | 100 | 100 | 100 | 100 | 100 | 100 | 100 |
| Crosslinker added | N/A | 2% Polycup 172 | N/A | 2% Polycup 172 | 2% Polycup 172 | 2% Polycup 172 | 2% XC113 |

TABLE 18-continued

|  | Sample 1 Water Soluble | Sample 2 Water Soluble | Sample 3 Water Soluble | Sample 4 Water Soluble | Sample 5 Water Soluble | Sample 6 Water Soluble | Sample 7 Water Soluble |
|---|---|---|---|---|---|---|---|
| Test Data |  |  |  |  |  |  |  |
| COF—Static | 2.23 | N/R | 2.18 | N/R | 0.18 | N/R | 0.62 |
| COF—Kinetic | 0.69 | N/R | 0.6 | N/R | 0.48 | N/R | 0.46 |
| Stickiness—Formed | tacky | tacky | tacky | tacky | non tacky | tacky | non tacky |
| Stickiness—Chlorinated | tacky | tacky | tacky | tacky | non tacky | tacky | non tacky |
| Smoothness—Formed | draggy | draggy | draggy | draggy | less draggy | draggy | less draggy |
| Smoothness—Chlorinated | draggy | draggy | draggy | draggy | less draggy | draggy | less draggy |

TABLE 19

|  | Sample 12 Emulsion | Sample 13 Emulsion | Sample 14 Emulsion | Sample 15 Emulsion | Sample 16 Emulsion | Sample 17 Emulsion | Sample 19 Emulsion | Sample 18 Emulsion |
|---|---|---|---|---|---|---|---|---|
| 2-hydroxyethyl methacrylate | 75 | 75 | 75 | 75 | 75 | 75 | 75 | 75 |
| 2-ethylhexyl acrylate | 22 | 22 | 22 |  |  |  | 11 |  |
| methacrylic acid | 3 | 3 | 3 | 3 | 3 | 3 | 3 | 3 |
| 4-hydroxybutyl acrylate |  |  |  |  |  |  |  |  |
| 2-ethylhexyl methacrylate |  |  |  | 22 | 22 |  |  |  |
| lauryl methacrylate |  |  |  |  |  | 22 |  | 22 |
| methyl methacrylate |  |  |  |  |  |  | 11 |  |
| total | 100 | 100 | 100 | 100 | 100 | 100 | 100 | 100 |
| Crosslinker added | N/A | 2% Polycup 172 | 2% Carb. E-02 | 2% Polycup 172 | 2% Carb. E-02 | 2% Polycup 172 | 2% Carb. E-02 | 2% Polycup 172 |
| Test Data |  |  |  |  |  |  |  |  |
| COF—Static | 0.97 | 0.39 | 1.5 | 0.69 | 0.74 | Tacky at formed level | 0.05 | 0.74 |
| COF—Kinetic | 0.95 | 0.45 | 1.45 | 1.02 | 0.82 |  | 0.12 | 0.5 |
| Stickiness—Formed | non tacky | non tacky | non tacky | non tacky | non tacky | tacky | non tacky | non tacky |
| Stickiness—Chlorinated | non tacky | non tacky | non tacky | non tacky | non tacky | Not chlorinated | non tacky | non tacky |
| Smoothness—Formed | less draggy | less draggy | less draggy | less draggy | less draggy |  | less draggy | less draggy |
| Smoothness—Chlorinated | less draggy | less draggy | less draggy | less draggy | less draggy |  | less draggy | less draggy |

The following Tables 20-23 show the results of additional experiments testing the coefficients of friction ("COF") for Samples A-G, which are polymeric emulsions containing HEMA/EHA/MMA/MAA (75/11/11/3). The coating refers to % total solid content (TSC), and CYMEL® 373 refers to a methylated melamine-formaldehyde crosslinker available from Cytec Industries of Woodland Park, N.J.

TABLE 20

|  | SAMPLE | |
|---|---|---|
|  | A | B |
| Coating TSC (%) | 4.0 | 4.0 |
| CYMEL ® 373 (%) | 4.0 | 3.5 |
| Acid Priming (HCl %) | 0 | 0 |

TABLE 20-continued

| | SAMPLE | | | | | | | |
|---|---|---|---|---|---|---|---|---|
| | A | | | | B | | | |
| | Coefficient of Friction (COF) | | | | | | | |
| | Donning Palm | | Donning Finger | | Donning Palm | | Donning Finger | |
| Sample | Static | Kinetic | Static | Kinetic | Static | Kinetic | Static | Kinetic |
| Average | 0.04 | 0.04 | 0.08 | 0.09 | 0.04 | 0.06 | 0.08 | 0.09 |
| Std Dev | 0.01 | 0.01 | 0.07 | 0.09 | 0.01 | 0.01 | 0.00 | 0.01 |
| Physical Properties of Chlorinated Gloves (Unaged) | | | | | | | | |
| Tensile Strength (kg/cm$^2$) | 280 | | | | 281 | | | |
| Stress 300% (kg/cm$^2$) | 17 | | | | 15 | | | |
| Stress 500% (kg/cm$^2$) | 49 | | | | 38 | | | |
| Ultimate Elongation % | 845 | | | | 885 | | | |
| Powder Content | | | | | | | | |
| Powder Content (mg/glove) | Not tested | | | | 1.22 | | | |
| Observations | | | | | | | | |
| Coating Evenness | Fair | | | | Fair | | | |
| *Degree of Coating Flaking | 4 | | | | 4 | | | |

TABLE 21

| | SAMPLE | |
|---|---|---|
| | C | D |
| Coating TSC (%) | 4.0 | 4.0 |
| CYMEL ® 373 (%) | 3.5 | 3.5 |
| Acid Priming (HCl %) | 0.03 | 1.5 |

| | Coefficient of Friction (COF) | | | | | | | |
|---|---|---|---|---|---|---|---|---|
| | Donning Palm | | Donning Finger | | Donning Palm | | Donning Finger | |
| Sample | Static | Kinetic | Static | Kinetic | Static | Kinetic | Static | Kinetic |
| Average | 0.03 | 0.04 | 0.06 | 0.08 | 0.02 | 0.03 | 0.04 | 0.08 |
| Std Dev | 0.01 | 0.01 | 0.02 | 0.02 | 0.01 | 0.01 | 0.00 | 0.01 |
| Physical Properties of Chlorinated Gloves (Unaged) | | | | | | | | |
| Tensile Strength (kg/cm$^2$) | 254 | | | | 243 | | | |
| Stress 300% (kg/cm$^2$) | 14 | | | | 15 | | | |
| Stress 500% (kg/cm$^2$) | 32 | | | | 34 | | | |
| Ultimate Elongation % | 845 | | | | 924 | | | |
| Powder Content | | | | | | | | |
| Powder Content (mg/glove) | Not tested | | | | 0.86 | | | |
| Observations | | | | | | | | |
| Coating Evenness | Good | | | | Good | | | |
| *Degree of Coating Flaking | 3 | | | | 2 | | | |

TABLE 22

| | SAMPLE | | | |
|---|---|---|---|---|
| | E | | F | |
| Coating TSC (%) | 3.5 | | 3.5 | |
| CYMEL ® 373 (%) | 3.5 | | 3.5 | |
| Acid Priming (HCl %) | 0 | | 1.5 | |

| Coefficient of Friction (COF) | | | | | | | | |
|---|---|---|---|---|---|---|---|---|
| | Donning Palm | | Donning Finger | | Donning Palm | | Donning Finger | |
| Sample | Static | Kinetic | Static | Kinetic | Static | Kinetic | Static | Kinetic |
| Average | 0.08 | 0.08 | 0.04 | 0.05 | 0.03 | 0.04 | 0.07 | 0.07 |
| Std Dev | 0.08 | 0.07 | 0.04 | 0.04 | 0.02 | 0.02 | 0.03 | 0.03 |

| Physical Properties of Chlorinated Gloves (Unaged) | | | |
|---|---|---|---|
| Tensile Strength (kg/cm$^2$) | 273 | | 236 |
| Stress 300% (kg/cm$^2$) | 15 | | 11 |
| Stress 500% (kg/cm$^2$) | 37 | | 28 |
| Ultimate Elongation % | 845 | | 924 |

| Powder Content | | |
|---|---|---|
| Powder Content (mg/glove) | 1.56 | Not tested |

| Observations | | |
|---|---|---|
| Coating Evenness | Good | Excellent |
| *Degree of Coating Flaking | 3 | 2 |

TABLE 23

| SAMPLE | G | | | |
|---|---|---|---|---|
| Coating TSC (%) | 3.5 | | | |
| CYMEL ® 373 (%) | 3.5 | | | |
| Acid Priming (HCl%) | 1.0 | | | |
| Coefficient of Friction (COF) | Donning Palm | | Donning Finger | |
| Sample | Static | Kinetic | Static | Kinetic |
| Average | 0.05 | 0.05 | 0.04 | 0.05 |
| Std Dev | 0.02 | 0.00 | 0.00 | 0.00 |

| Physical Properties of Chlorinated Gloves (Unaged) | |
|---|---|
| Tensile Strength ( kg/cm$^2$) | 223 |
| Stress 300% ( kg/cm$^2$) | 11 |
| Stress 500% ( kg/cm$^2$) | 20 |
| Ultimate Elongation % | 963 |

| Powder Content | |
|---|---|
| Powder Content (mg/glove) | 0.78 |

| Observations | |
|---|---|
| Coating Evenness | Excellent |
| *Degree of Coating Flaking | 2 |

The stickiness and smoothness observed in the testing were recorded using a known solvent-based product having suitable performance on gloves as the reference. As shown by the results in Tables 17, 18, and 19, some exemplary emulsions generally provide comparable or lower coefficient of friction results. The exemplary emulsion coatings also provide improved stickiness and smoothness results as compared with water-based coatings. Sample 19 also provides comparable friction results as compared with solvent-based coatings. In addition, some emulsion samples provided comparable coefficient of friction results when compared with the solvent-based coatings. It is to be noted that some surface roughness of the coating may be desirable in certain embodiments, such as for coatings applied to gloves and other donning materials, because the roughness or morphology may provide for less contact between the material and the user's skin, which may provide desirable donning properties.

Figure 3A:
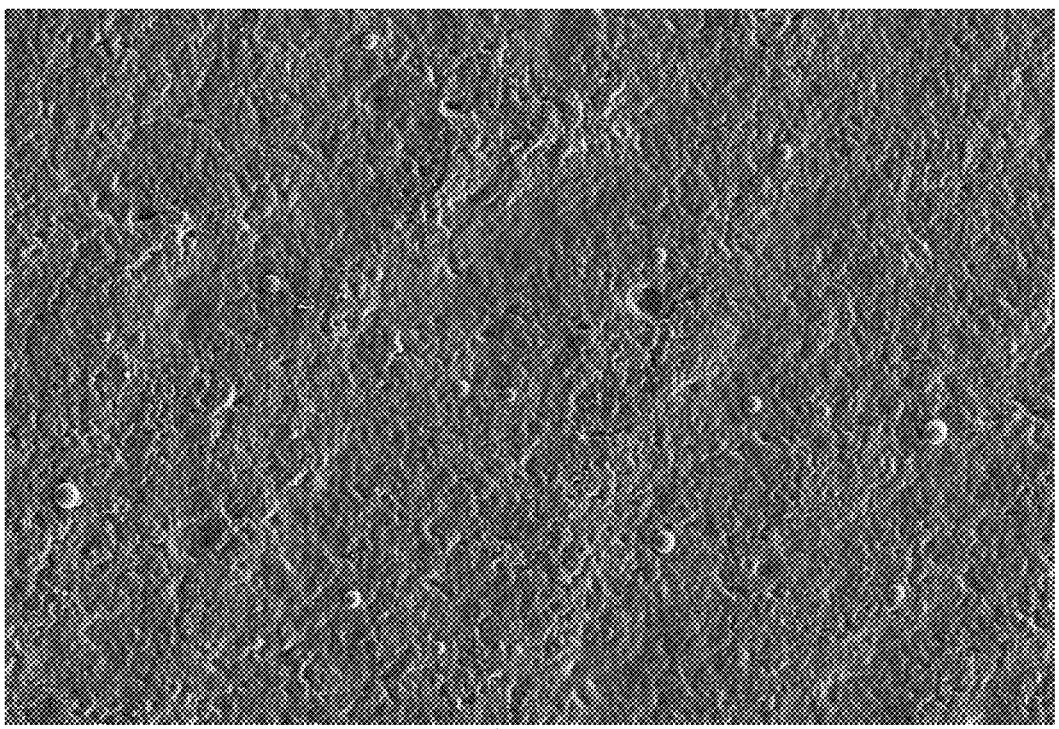
FIG. 3A is a scanning electron microscope image, at 500 times magnification, of a surgical glove coated with one embodiment of an emulsion coating as disclosed herein and applied with a crosslinker.
Figure 3B:
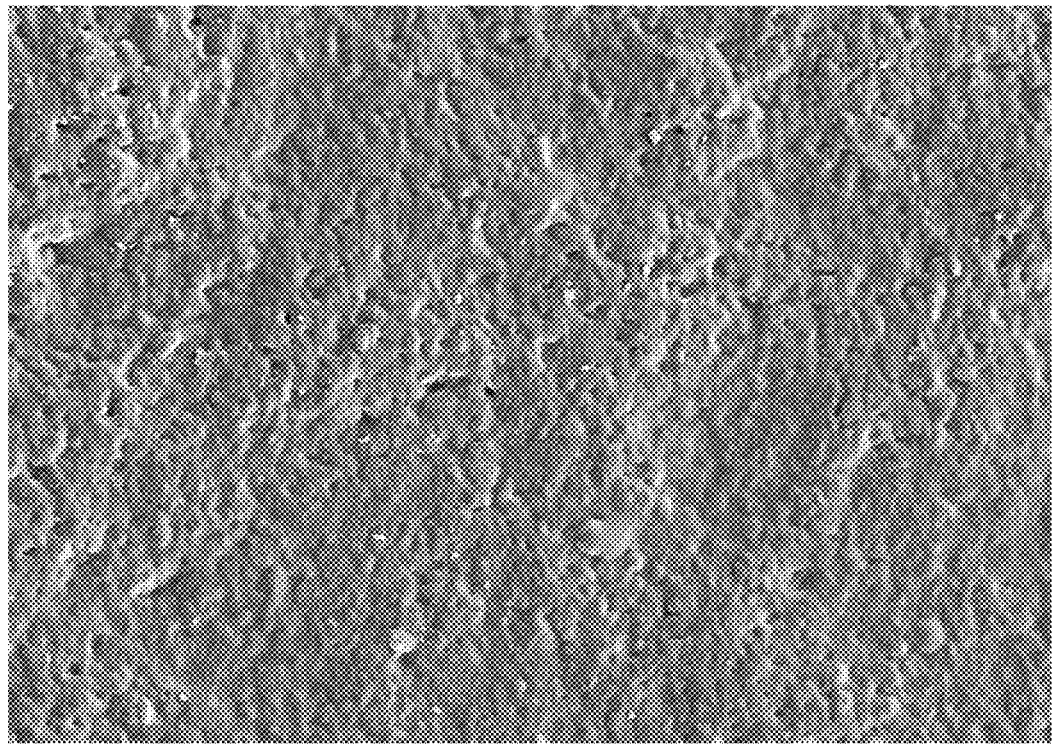
FIG. 3B is a scanning electron microscope image of the glove in FIG. 3A at 1000 times magnification.
Figure 6:
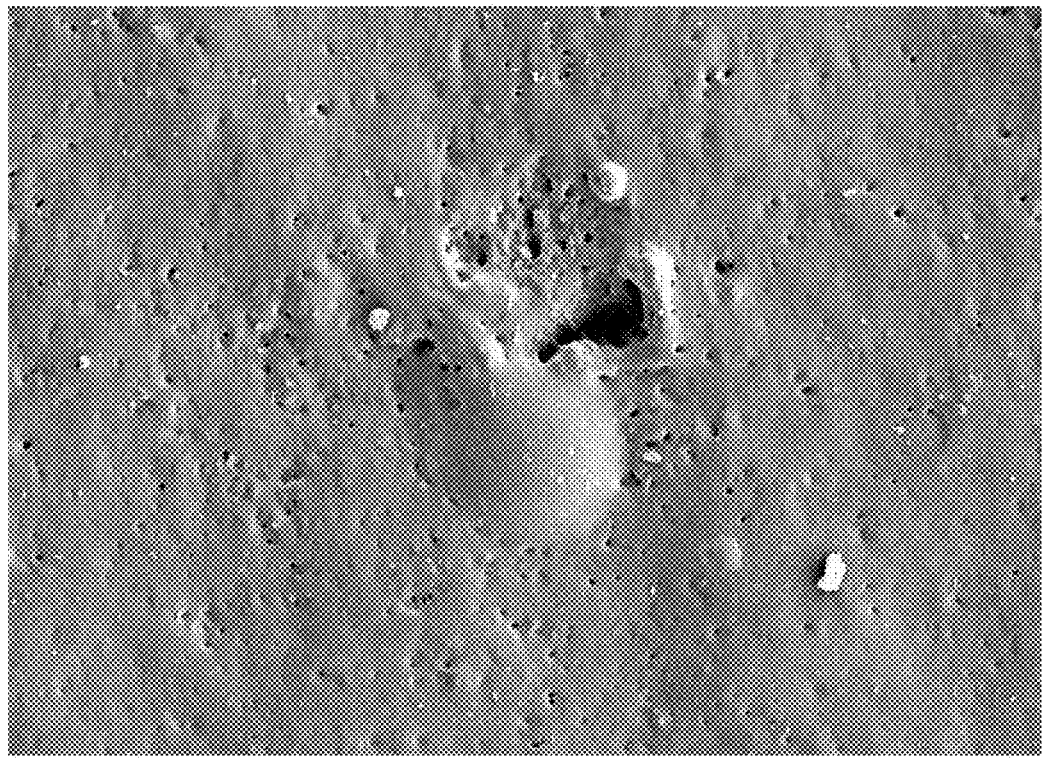
FIG. 6 is a scanning electron microscope image, at 1000 times magnification, of a second surgical glove coated with a second embodiment of an emulsion coating as disclosed herein and applied with a crosslinker.
Figure 7:
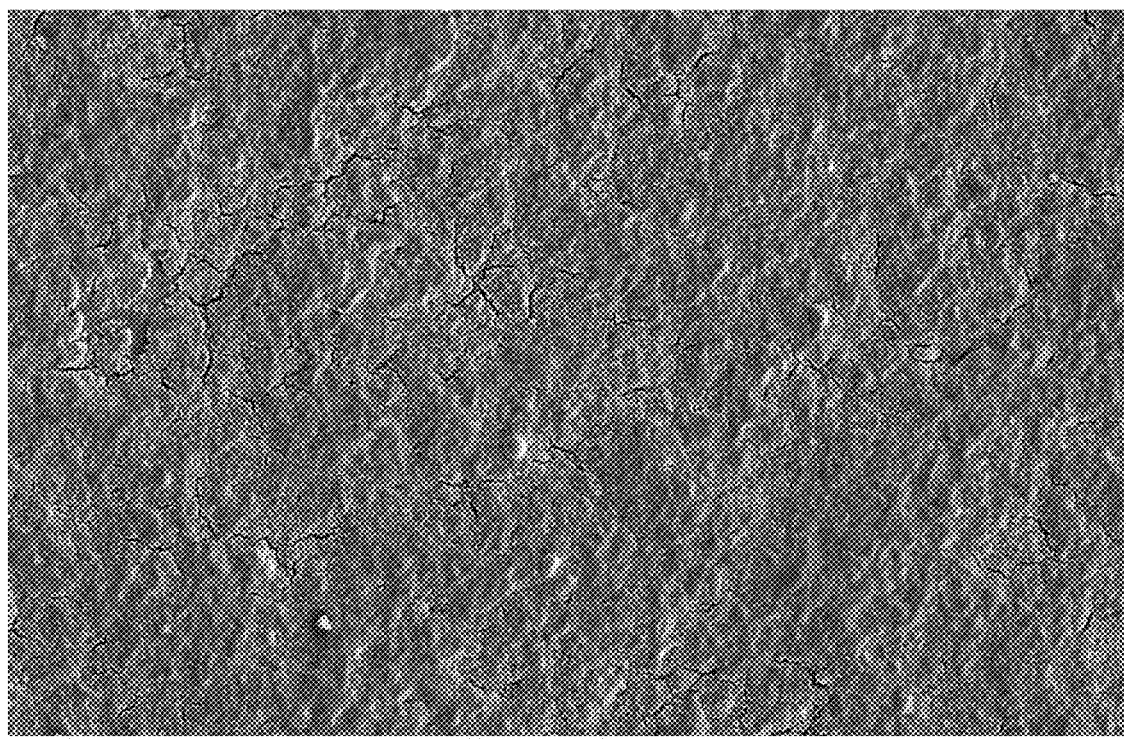
FIG. 7 is a scanning electron microscope image, at 1000 times magnification, of a third surgical glove coated with an emulsion coating as disclosed herein and applied with a crosslinker.

As shown in the accompanying figures, scanning electron microscopic images were obtained for some of the samples. FIGS. 3A and 3B are images of a film coated with an emulsion prepared using 75% 2-hydroxyethyl methacrylate, 22% 2-ethylhexyl acrylate, and 3% methacrylic acid. FIG. 6 is an image of a film coated with an emulsion prepared using 75% 2-hydroxyethyl methacrylate, 22% lauryl methacrylate, and 3% methacrylic acid, and FIG. 7 is an image of a film coated with an emulsion prepared using 75% 2-hydroxyethyl methacrylate, 22% lauryl methacrylate, and 3% methacrylic acid.

Figure 4A:
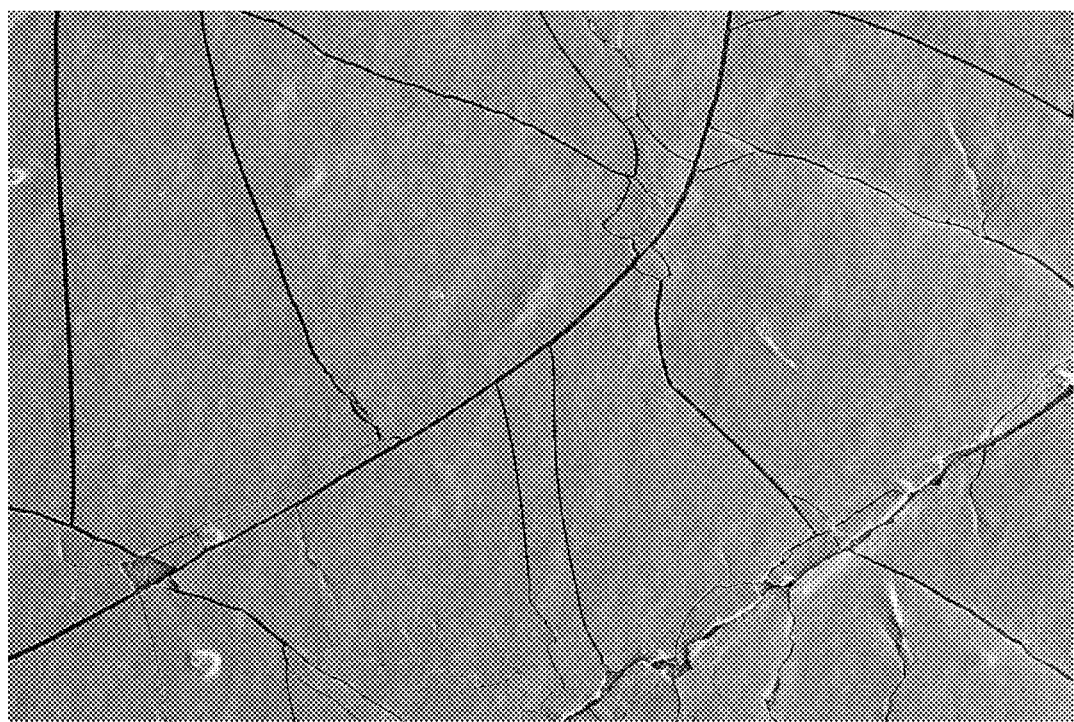
FIG. 4A is a scanning electron microscope image, at 200 times magnification, of a surgical glove coated with a comparative solvent-based coating and applied with a crosslinker.
Figure 4B:
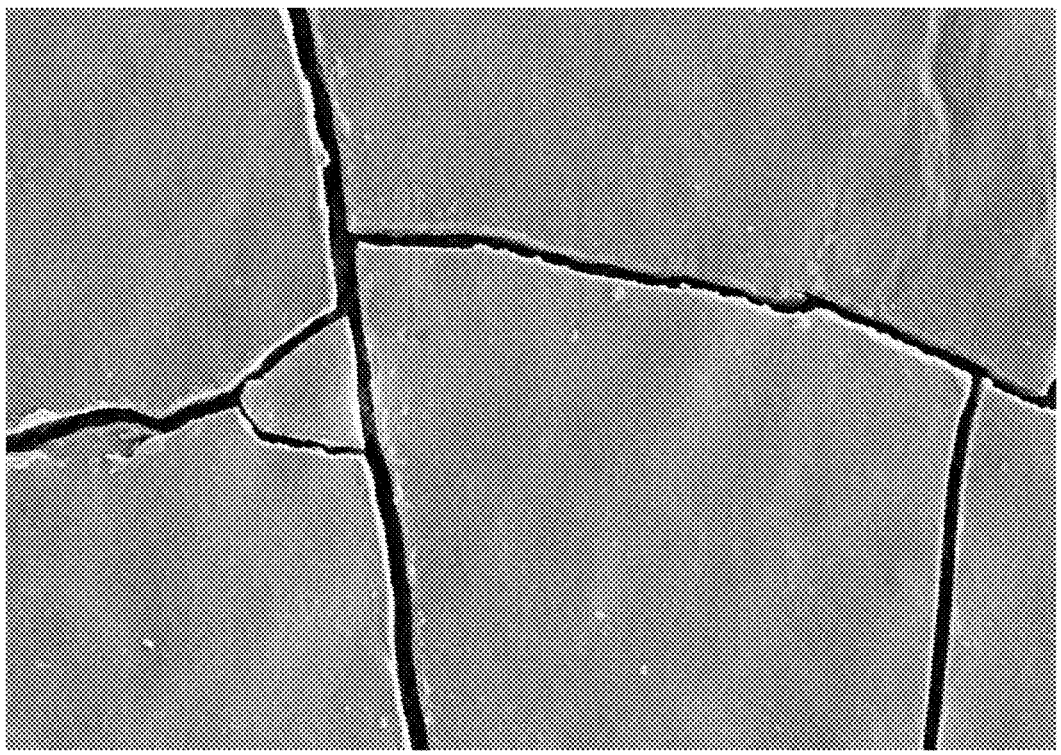
FIG. 4B is a scanning electron microscope image of the glove in FIG. 3A at 1000 times magnification.
Figure 5:
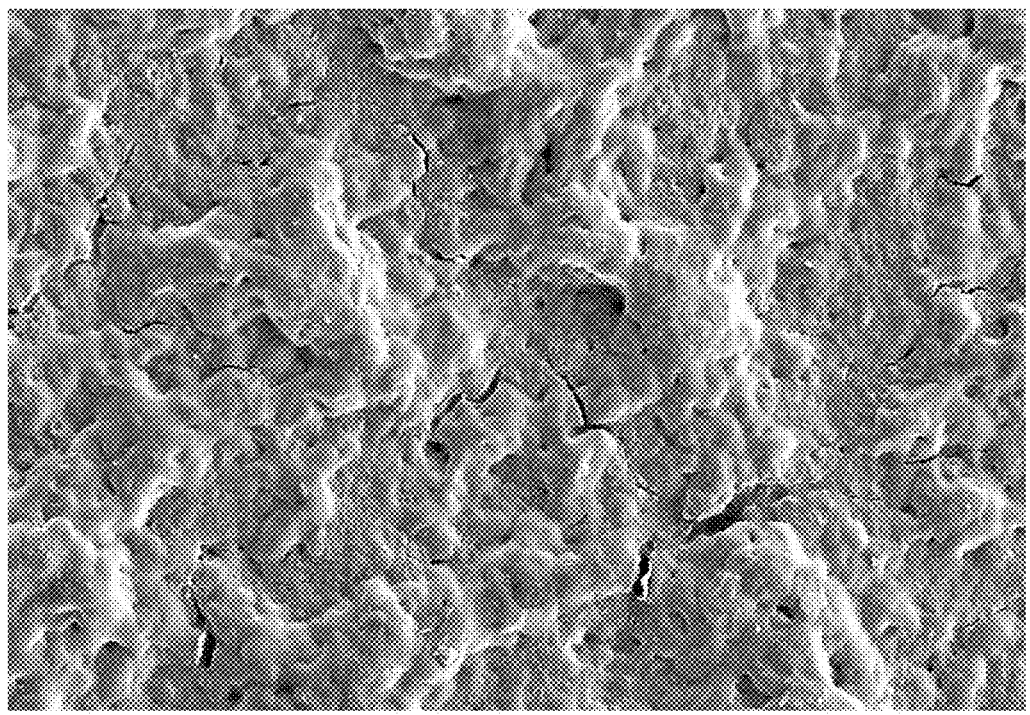
FIG. 5 is a scanning electron microscope image, at 1000 times magnification, of a second surgical glove coated with a comparative solvent-based coating and applied with a crosslinker.

As shown in the referenced images, the coating on films using an emulsion as disclosed herein exhibits little cracking and provides a relatively smooth application. In particular, those emulsion coatings show less cracking and a smoother application to the film than the samples employing water-based coatings shown in FIGS. 1A, 1B, 2A, and 2B. In addition, the emulsion coatings also advantageously exhibit less cracking and less severe cracking as compared with the film having a solvent-based coating shown in FIGS. 4A and 4B. The emulsion coatings also evidence a smoother application and less severe cracking as compared with the film having a solvent-based coating in FIG. 5. These results are also demonstrated by the emulsion coating shown in FIGS. 12A, 12B, and 12C, which are discussed in detail below.

Additional physical properties were also determined for certain testing samples. Also, a control solvent-based coating was used for comparison testing, wherein the control is known to be effective in glove coating applications. These physical properties are recorded in the following table, and any referenced crosslinker was added at 2% based upon the dry weight of the crosslinker to the dry weight of the copolymer. As indicated by those results, emulsions formed in accordance with the disclosure herein provide comparable or favorable stretch and strength characteristics when compared with solvent-based and water-based coatings. These emulsions also provide cost savings and reduced pollutants as compared with solvent-based coatings.

2. 3.5-4.0% of the crosslinker Cymel 373 was added to the Sample 19, 20, 21 and 22 emulsion based on dry weight of the crosslinker to the dry weight of the copolymer.
3. The polymer solution was chilled and maintained at about 34° C.
4. Prior to the application of the polymer coating, the glove sample was pretreated by dipping into an HCl

TABLE 24

| | Polymer base | | | | | | | |
|---|---|---|---|---|---|---|---|---|
| | Solvent | Water | | | Emulsion | | Solvent | |
| | | | Coating Type | | | | | |
| | Control | Sample 1 (soft) | Sample 3 (hard) | Sample 7 | Sample 12 | Sample 13 | Sample 8 | Sample 9 |
| Crosslinker | Not added | Not added | | XC113 | Not added | Polycup 173 | XC113 | XC113 |
| Formed level | | | | | | | | |
| Tensile Strength (kg/cm$^2$) | 271 | 215 | 216 | Not tested | 280 | 264 | Not tested | Not tested |
| Modulus @ 300% (kg/cm2) | 12 | 18 | 20 | Not tested | 19 | 18 | Not tested | Not tested |
| Modulus @ 500% (kg/cm2) | 31 | 51 | 62 | Not tested | 50 | 46 | Not tested | Not tested |
| Ultimate Elongation (%) | 904 | 845 | 766 | Not tested | 845 | 845 | Not tested | Not tested |
| Chlorinated level | | | | | | | | |
| Tensile Strength (kg/cm$^2$) | 317 | 288 | 282 | 256 | 328 | 290 | 255 | 267 |
| Modulus @ 300 % (kg/cm2) | 13 | 15 | 14 | 21 | 18 | 16 | 17 | 20 |
| Modulus @ 500 % (kg/cm2) | 36 | 40 | 37 | 51 | 42 | 38 | 43 | 45 |
| Ultimate Elongation (%) | 884 | 845 | 845 | 865 | 845 | 884 | 825 | 825 |

The nano-hardness and reduced modulus were also measured for some of the foregoing samples by nano-indention testing, which provided the following results, as shown in Table 25.

TABLE 25

| Polymer base | Hardness (GPa) | Reduced Modulus (GPa) |
|---|---|---|
| Emulsion Sample 13 (2% Polycup 172) | 0.072 | 1.969 |
| Emulsion Sample 17 (2% Polycup 172) | 0.069 | 1.861 |
| Emulsion Sample 18 (2% Polycup 172) | 0.055 | 1.977 |
| Solvent Sample 11 | 0.023 | 0.611 |

Testing, including flaking observation, was performed on latex films coated with Samples 19, 20, 21 and 22 and an acid priming step comprising an HCl solution of 1% using the following procedures:

1. The emulsion-based copolymer was diluted with deionized ("DI") water to 3.5-4.0% of the total solids content ("TSC").

acid priming solution and dried in the oven at 100° C. to 150° C. for 1 to 2 minutes.
5. The polymer solution was then coated onto the pretreated latex film, the latex film being heated up to a temperature of about 40-45° C. prior to the coating process.
6. After coating, the mold upon which the film was applied was rotated in the oven to ensure even coating on the film.
7. The coated film was then cured at 140° C. for 30 minutes.
8. The coated film was then chlorinated on the donning and/or patient side to remove any powder with chlorine strength of about 80 ppm.
9. The coated films were then tested as indicated in the table below. The aged samples were aged using a heat accelerated aging process, as specified in ASTM D-412 method, in which the aged gloves were placed in an oven for 7 days at about 70° C. The unaged samples were tested without performing such a heat treatment aging process.

Based upon the testing procedures above, the following results were obtained as shown in Table 26 below, wherein the degree of coating flaking was evaluated on a scale of 1 to 5 with 1 indicating the lowest flake and 5 indicating the highest flake. As can be seen, the degree of flaking and the characteristic performance of a coating can be controlled by the ratio of "hard" monomers to "soft" monomers.

TABLE 26

| | Coating | | | | | | | |
|---|---|---|---|---|---|---|---|---|
| | Sample 19 | | Sample 20 | | Sample 21 | | Sample 22 | |
| Coating TSC (%) | 3.5 | | 3.5 | | 3.5 | | 3.5 | |
| Cymel 373 (%) | 3.5 | | 3.5 | | 3.5 | | 3.5 | |
| Acid Priming (% HCl) | 1 | | 1 | | 1 | | 1 | |
| | Coefficient of Friction (COF) | | | | | | | |
| | Donning Palm | | Donning Finger | | Donning Palm | | Donning Finger | |
| | Donning Palm | | Donning Finger | | Donning Palm | | Donning Finger | |
| Sample | Static | Kinetic | Static | Kinetic | Static | Kinetic | Static | Kinetic |
| Average | 0.11 | 0.09 | 0.05 | 0.06 | 0.27 | 0.30 | 0.21 | 0.19 |
| Std Dev | 0.03 | 0.02 | 0.02 | 0.04 | 0.15 | 0.17 | 0.18 | 0.15 |
| Average (cont.) | 0.3 | 0.29 | 0.13 | 0.15 | 0.39 | 0.36 | 0.17 | 0.15 |
| Std Dev (cont.) | 0.18 | 0.20 | 0.03 | 0.03 | 0.33 | 0.31 | 0.03 | 0.05 |
| | Physical Properties of Sterile Gloves (Unaged) | | | | | | | |
| Tensile Strength (kg/cm$^2$) | 261 | | 256 | | 260 | | 252 | |
| Stress 300% (kg/cm$^2$) | 11 | | 11 | | 14 | | 12 | |
| Stress 500% (kg/cm$^2$) | 24 | | 27 | | 32 | | 30 | |
| Ultimate Elongation % | 884 | | 924 | | 924 | | 924 | |
| | Physical Properties of Sterile Gloves (Aged) | | | | | | | |
| Tensile Strength (kg/cm$^2$) | 198 | | 195 | | 220 | | 194 | |
| Stress 300% (kg/cm$^2$) | 10 | | 8 | | 11 | | 12 | |
| Stress 500% (kg/cm$^2$) | 21 | | 14 | | 30 | | 27 | |
| Ultimate Elongation % | 884 | | 884 | | 884 | | 884 | |
| | Observations | | | | | | | |
| Coating Sedimentation | Not Tested | | No | | No | | No | |
| Internal Tacky during Processing | Not Tested | | Slightly | | No | | Slightly | |
| Dry donning | Good | | Good | | Good with inconsistency | | Good with inconsistency | |
| *Degree of Coating Flaking | 1 | | 1 | | 2 | | 1 | |

Testing, including flaking observation, was performed on latex films coated with Sample 19, 23, 24 and 25 using the following procedures:

1. The emulsion-based copolymer was diluted with deionized ("DI") water to 3.5-4.0% of the total solids content ("TSC").
2. 3.5-4.0% of the crosslinker Cymel 373 was added to the Sample 19, 23, 24 and 25 emulsion based on dry weight of the crosslinker to the dry weight of the copolymer.
3. The polymer solution was chilled and maintained at about 34° C.
4. Prior to application of the polymer coating, the glove sample was pretreated by dipping in an Aluminium-Sulphate priming solution and dried in the oven at 100° C. to 150° C. for 1 to 2 minutes.
5. The polymer solution was coated on the pretreated latex film, the latex film being heated up to a temperature of about 40-45° C. prior to the coating process.
6. After coating, the mold upon which the film was applied was rotated in the oven to ensure even coating on the film.
7. The coated film was then cured at 140° C. for 30 minutes.
8. The coated film was then chlorinated on the donning and/or patient side to remove any powder with chlorine strength of about 80 ppm.

9. The coated films were then tested as indicated in the table below. The aged samples were aged using a heat accelerated aging process, as specified in ASTM D-412 method. In general, the aged gloves were placed in an oven for 7 days at about 70° C. The unaged samples were tested without performing such a heat treatment aging process.

Based upon the testing procedures above, the following results were obtained, as shown in Table 27 below, wherein the degree of coating flaking was evaluated on a scale of 1 to 5 with 1 indicating the lowest flake and 5 indicating the highest flake. As can be seen, the best dry donning performance was achieved at 1.5% (wt/wt) methacrylic acid level (MAA), as exhibited with Sample 23. Overall, the best physical properties exhibited for both aged and unaged, were observed with Sample 23.

TABLE 27

| | Coating | | | |
|---|---|---|---|---|
| | Sample 19 | Sample 23 | Sample 24 | Sample 25 |
| Coating TSC (%) | 3.5 | 3.5 | 3.5 | 3.5 |
| Cymel 373 (%) | 3.5 | 3.5 | 3.5 | 3.5 |
| Aluminum sulphate Priming | 1.5% | 1.5% | 1.5% | 1.5% |

| | Coefficient of Friction (COF) | | | | | | | |
|---|---|---|---|---|---|---|---|---|
| | Donning Palm | | Donning Finger | | Donning Palm | | Donning Finger | |
| Sample | Static | Kinetic | Static | Kinetic | Static | Kinetic | Static | Kinetic |
| Average | 0.16 | 0.17 | 0.34 | 0.33 | 0.13 | 0.14 | 0.03 | 0.04 |
| Std Dev | 0.04 | 0.04 | 0.33 | 0.33 | 0.00 | 0.00 | 0.00 | 0.00 |
| Sample | Static | Kinetic | Static | Kinetic | Static | Kinetic | Static | Kinetic |
| Average | 0.08 | 0.08 | 0.02 | 0.04 | 0.18 | 0.21 | 0.08 | 0.09 |
| Std Dev | 0.03 | 0.02 | 0.00 | 0.03 | 0.03 | 0.07 | 0.04 | 0.04 |

| Physical Properties of Sterile Gloves (Unaged) | | | | |
|---|---|---|---|---|
| Tensile Strength (kg/cm$^2$) | 289 | 274 | 280 | 268 |
| Stress 300% (kg/cm$^2$) | 11 | 12 | 11 | 12 |
| Stress 500% (kg/cm$^2$) | 25 | 24 | 24 | 29 |
| Ultimate Elongation % | 924 | 924 | 943 | 924 |

| Physical Properties of Sterile Gloves (Aged) | | | | |
|---|---|---|---|---|
| Tensile Strength (kg/cm$^2$) | 287 | 280 | 302 | 277 |
| Stress 300% (kg/cm$^2$) | 12 | 11 | 12 | 12 |
| Stress 500% (kg/cm$^2$) | 29 | 24 | 27 | 26 |
| Ultimate Elongation % | 943 | 943 | 924 | 884 |
| Powder content (mg/glove) | 1.82 | 1.46 | 1.42 | 1.40 |

| Observations | | | | |
|---|---|---|---|---|
| Coating sedimentation | No | No | Yes | Yes |
| Internal tacky during processing | Slightly | No | Yes | Yes |
| Dry donning | Fair | Best among samples | Fair | Fair |
| *Degree of Coating Flaking | 2 | 2 | 2 | 2 |

In some embodiments, the emulsion coatings may be applied to an article, such as latex or rubber gloves. The article may be formed by any methods known in the art, such as those described in U.S. Pat. Nos. 4,548,844, 6,673,404, 6,828,387, and 8,110,266, each of which is incorporated by reference in its entirety. In some embodiments wherein the article is a glove, the glove may be formed by dipping processes known in the art. During the manufacture of those gloves, a hand mold (also called a "glove mold" or mandrel) may be used for dipping. The mandrel may be a porcelain mold in the shape of a hand. As referenced above and in additional data herein, the "formed level" refers to the article production process in which the mold first has a release coating directly applied to the mold followed by dipping in latex to form the glove. Then a coating, such as the solvent-based, water-based, or emulsion copolymers discussed herein, may be applied on the latex, such as on the donning side of the glove.

In some embodiments wherein a glove is formed about a mold, the mold may first be cleaned with a material, such as citric acid. Then the mold may be dipped into a coagulant material, dried, and then further dipped into a liquid rubber material such as latex. The rubber coated mold may then be dried and then dipped into a leaching solution. The leaching solution may allow coagulant salts to dissolve and/or be washed away.

The glove may be molded with the patient side in contact with the mold and the donning side on the exterior. When the glove is removed from the mold, the glove is commonly inverted such that the donning side is then on the interior of the glove and the patient side is on the exterior.

In some embodiments, after the dipping of the rubber coated mold in a leaching solution, the rubber coated mold may be dried, for example, by air drying or by use of a dryer, and then subjected to an acid priming process. The acid priming process may comprise the application of acid to either side of the glove, preferably the side in which a coating is applied. The acid priming process may comprise dipping the rubber coated mold (i.e., the glove on the mold) into a liquid composition comprising an acid, such as sulfuric acid or hydrochloric acid. The acid may then be diluted, and in some embodiments, the liquid composition comprising an acid may comprise acid solutions up to 20%, more preferably up to about 5%, and still more preferably from 1% to about 4.5% (w/w). In other embodiments, it is preferable to provide an acid solution comprising 1% to about 3% by weight. In another embodiment, the glove may be dipped into a liquid composition comprising a solution of aluminum sulphate as the acid priming solution. The liquid composition in this embodiment can comprise aluminum sulphate in amounts of up to about 10% (w/w), more preferably up to about 7%, and still more preferably from 0.5% to about 3%. In other embodiments, it is preferable to provide amounts of aluminum sulphate from 0.5% to about 1.5%.

After the dipping of the rubber coated mold in the liquid composition, the rubber coated mold may be dipped or rinsed in a bath, such as an alkaline solution or preferably an aqueous solution. Unlike other processes in the art, the dipping or rinsing of the rubber coated mold into an alkaline solution, such as a solution comprising ammonia or ammonium hydroxide, is not required with the processes disclosed herein. This provides a benefit over other coating processes in the art. In processes utilizing an alkaline solution, an additional dipping tank is typically required to facilitate the alkaline dipping, and it requires additional efforts to control the required concentration pH of the alkaline solution during an actual continuous dipping process. The process disclosed herein, which can be accomplished with rinsing in an aqueous bath, is more cost efficient while providing an adequate rinsing of any excessive acid on a rubber coated mold.

The coating of the formed article, such as a glove, may comprise the application of a coating material, such as a formulation comprising the copolymer emulsion described above. In some embodiments, the temperature of the glove mold may be adjusted prior to the application of the coating material. In some embodiments, the glove mold is brought to a temperature of preferably about 20° C. to 60° C., more preferably about 30° C. to 50° C., and most preferably about 35° C. to 45° C. In some embodiments, the glove mold is brought to these temperatures immediately prior to the application of the coating material. In some embodiments, the coating material is applied to the glove on the glove mold by dipping the mold, with the glove on it, into the coating material. Alternatively, the coating material may be sprayed onto the glove on the glove mold. In some embodiments, the glove is dipped into the coating material for a time period. In some embodiments, the time period is preferably about 2 to 120 seconds, more preferably about 5 to 90 seconds, even more preferably about 10 seconds to 60 seconds, and most preferably about 15 to 25 seconds. In some embodiments, the coating material is maintained at a temperature range during the application, preferably between about 15° C. to 75° C., more preferably between about 20° C. to 60° C., even more preferably between about 25° C. to 50° C., and most preferably between about 30° C. to 40° C. Since the glove on the mold is heated prior to dipping or coating with the polymer emulsion, the glove temperature can become quite hot. This may cause the temperature of the coating composition to rise, thus, it may be necessary to chill the coating composition during dipping in order to prevent or minimize increasing the temperature of the coating composition.

After the application of the coating material, the emulsion coated glove may be cured, for example, by heating in an oven. In some embodiments, the curing occurs with preset heating parameters for a time period, preferably about 5 minutes to 120 minutes, more preferably about 10 minutes to 90 minutes, even more preferably about 15 to 60 minutes, and most preferably about 20 to 40 minutes. In some embodiments, the air flow in the oven is controlled, for example, to remove excessive moisture. Unlike known processes in the art, wherein the curing step is required to occur at lower temperatures, the process disclosed herein may comprise a curing step that occurs at higher temperatures. This provides an advantage, as the use of higher temperatures in the curing process may allow for the use of a shorter curing time. In addition, in some embodiments, the use of higher temperatures allows for improved and optimal cross-linking for both the article, such as a latex glove, and the coating material, which can provide desired physical properties and adhesion. In some embodiments, the curing process occurs at a temperature of between about 100° C. to 160° C., more preferably about 120° C. to 150° C., and most preferably about 135° C. to 145° C. In preferred embodiments, the curing process occurs at a temperature of about 135° C. to 145° C., and the curing time is about 20 to 40 minutes. This is an improvement over other processes in the art, wherein the curing time can be much longer, typically two or more times as long.

Following the curing step, the emulsion coated gloves may be further treated by any methods known in the art. For example, in some embodiments, the emulsion coated gloves may be subjected to a post-cure leaching process wherein the mold containing the emulsion coated glove is dipped in a leaching solution and rinsed. In some embodiments, the emulsion coated glove may then be dipped in a further liquid, such as a slurry comprising silicone and/or calcium carbonate. In some processes, chlorination may be performed in which the coated glove may be washed in chlorinated water. In order to chlorinate the donning side, which may typically be on the interior of the glove after it is removed from the mold, a glove turning process is required in which the glove is turned inside out such that the donning side is on the exterior and the patient side is on the interior. One or both of the donning side and the patient side may be chlorinated. The chlorination step may remove any dip release coating, such as calcium carbonate, that may have been applied prior to molding the latex in order to assist with removing the glove from the mold. In addition, the chlorination process may create a roughened surface on the glove and/or harden the latex in some instances. The glove may be subjected to further treatment, such as a lubricating agent. Examples of lubricating agents include silicone and ammonium salts of alkyl phosphate and cetylpyridium chloride (CPC).

In one exemplary embodiment, a glove may be prepared by performing the following steps, in which some embodiments the steps may be performed in the exemplary order provided:

Cleaning the glove mold with a suitable acid (followed by optional rinsing);
Coagulent dipping (e.g., calcium nitrate), at a temperature of about 52 to about 59° C.;
Oven drying (with hot air) at a temperature of about 133° C. to about 205° C.;
Latex dipping;
Oven drying (with hot air) at a temperature of about 139° C. to about 163° C.;
Hot pre-cure leaching at a temperature of about 55° C. to about 73° C.;
Air drying;
Acid priming;
Water rinsing;
Copolymer emulsion coating dipping;
Curing at 100° C. to 160° C.;
Post-cure leaching at 51° C. to 75° C. and rinse;
Slurry dipping with calcium carbonate or silicone (0.2 to 0.8%);
Final drying at about 108° C. to 118° C.;
Glove stripping (removing the glove from the mold);
Dry turning;
Chlorination (e.g., about 100 ppm chlorine strength);
Lubrication using a suitable lubricant, such as silicone ammonium salt of alkyl phosphate and cetylpyridium chloride (CPC);
First drying;
Wet turning; and
Final drying.

The foregoing method describes an exemplary embodiment, and one of ordinary skill in the art would appreciate that some steps may be omitted and/or additional and/or alternative steps may be employed in alternative embodiments. By way of example, and without limitation, after cleaning the glove mold with acid and rinsing, the mold also may be dipped into an alkaline bath to neutralize the acid and then rinsed with water. In some embodiments, the glove mold may be brushed to ensure a smooth surface on the glove mold. In addition, quality testing may be performed on a manufactured glove to detect potential defects, such as air testing (in which the glove is inflated with air) and/or water testing (in which the glove is filled with water).

The amount of the coating applied to a substrate, such as a glove, may be varied depending upon the characteristics of the substrate, the characteristics desired to be imparted to the substrate, and the particular coating employed. In some embodiments, it may be desired to apply the least amount of coating necessary to obtain the desired result. In some embodiments, the applied coating weights may, depending on the coating and the intended use, range from about 0.1 to about 100 g/m². For some pressure sensitive embodiments, the amount may be in the range of about 15 g/m² to about 45 g/m² in some embodiments. Other amounts of coating may be appropriate depending upon the particular process and desired characteristics of the article being manufactured.

As set forth in the following table, additional data was collected for certain samples as applied during a glove manufacturing process. As with the previous data, this data also shows that emulsions as disclosed herein generally provide improved characteristics as compared with water-based coatings. These emulsion coatings also provide environmental advantages over solvent-based coatings.

TABLE 28

| Sample | Polymer Base | Monomer Components | Cymel 373 (%) | Carbodilite (%) | Gloves Coating Condition Formed level | Gloves Coating Condition Chlorinated level | COF (Dry) Chlo/Lub on donning side Static | Kinetic | Chlo/Lub on patient side Static | Kinetic |
|---|---|---|---|---|---|---|---|---|---|---|
| Sample 19 (Plate Dipping) (without acid priming) | Emulsion | 75 HEMA 11 EHA 11 MMA 3 MAA | 2 | — | Not tacky, easy to strip | Coating not flake off | 0.22 | 0.11 | 0.32 | 0.18 |
| | | | 5 | — | Not tacky, easy to strip | Coating not flake off | 0.17 | 0.06 | 0.20 | 0.09 |
| | | | 8 | — | Not tacky, easy to strip, | Minor coating flake off | 0.13 | 0.06 | 0.17 | 0.04 |
| | | | — | 2 | Not tacky, easy to strip | Tacky. Coating not flake off | 0.64 | 0.29 | 0.52 | 0.13 |
| | | | — | 5 | Not tacky, easy to strip | Tacky. Coating not flake off | 1.13 | 0.61 | 0.91 | 0.37 |
| | | | — | 8 | Not tacky, easy to strip | Tacky. Coating not flake off | 0.73 | 0.28 | 1.15 | 0.44 |
| Sample 19 (Mold Dipping) | Emulsion | 75 HEMA 11 EHA 11 MMA 3 MAA | 5 (w/o acid) | — | Not tacky, easy to strip | Coating flake off | 0.33 | 0.16 | 0.17 | 0.16 |
| | | | 5 (with acid) | — | Not tacky, easy to strip | Coating flake off | 0.23 | 0.08 | 0.04 | 0.05 |

TABLE 28-continued

| Sample | Polymer Base | Monomer Components | Cymel 373 (%) | Carbodilite (%) | Gloves Coating Condition Formed level | Gloves Coating Condition Chlorinated level | COF (Dry) Chlo/Lub on donning side Static | Kinetic | Chlo/Lub on patient side Static | Kinetic |
|---|---|---|---|---|---|---|---|---|---|---|
| Sample 5 (Mold Dipping) | Water | 97 HEMA 3 MA | 2 5 | — | Tacky Not tacky, difficult to strip | Not able to proceed with chlorination Coating not flake off | 0.83 | 0.37 | Badly tacky after chlorination | |
| Sample 17 (Molding Dipping) | Emulsion | 75 HEMA 22 LM 3 MAA | 2 5 8 (w/o acid) 8 (with acid) | — — — — | Tacky Not tacky, difficult to strip Not tacky, OK to strip Not tacky, OK to strip | Not able to proceed with chlorination Coating not flake off Coating not flake off Coating not flake off | 0.29 0.31 — | 0.20 0.22 — | 0.32 0.12 0.11 | 0.32 0.08 0.12 |

Physical properties were also obtained for Sample 19 as applied to a film using mold dipping and using 5% Cymel 373 (which is a water-soluble melamine-formaldehyde resin crosslinker that is available from Cytec Industries of Woodland Park, N.J.), as shown below in Tables 29 and 30.

TABLE 29

| | Chlo/Lub on Donning Side | | Chlo/Lub on Patient Side | |
|---|---|---|---|---|
| Process | Without Acid | With Acid | Without Acid | With Acid |
| Unaged | | | | |
| Tensile Strength (kg/cm$^2$) | 283 | 250 | 252 | 280 |
| Modulus 300% (kg/cm$^2$) | 17 | 14 | 15 | 16 |
| Modulus 500% (kg/cm$^2$) | 47 | 31 | 31 | 36 |
| U. Elongation (%) | 845 | 924 | 806 | 845 |
| Aged 70 C. @ 7 days | | | | |
| Tensile Strength (kg/cm$^2$) | 227 | 131 | 275 | 212 |
| Modulus 300% (kg/cm$^2$) | 10 | 7 | 12 | 8 |
| Modulus 500% (kg/cm$^2$) | 18 | 13 | 24 | 17 |
| U. Elongation (%) | 1022 | 1002 | 924 | 1042 |

TABLE 30

Sample 19

| Crosslinker | Hardness (GPa) | Reduced Modulus (GPa) |
|---|---|---|
| Polycup—2% | 0.099 | 2.712 |
| Carbodilite E02—2% | 0.077 | 2.097 |
| Carbodilite E02—5% | 0.064 | 1.932 |
| Carbodilite E02—8% | 0.081 | 2.954 |
| Cymel 373—2% | 0.074 | 2.133 |
| Cymel 373—5% | 0.080 | 2.349 |
| Cymel 373—8% | 0.075 | 2.199 |

Figure 8A:
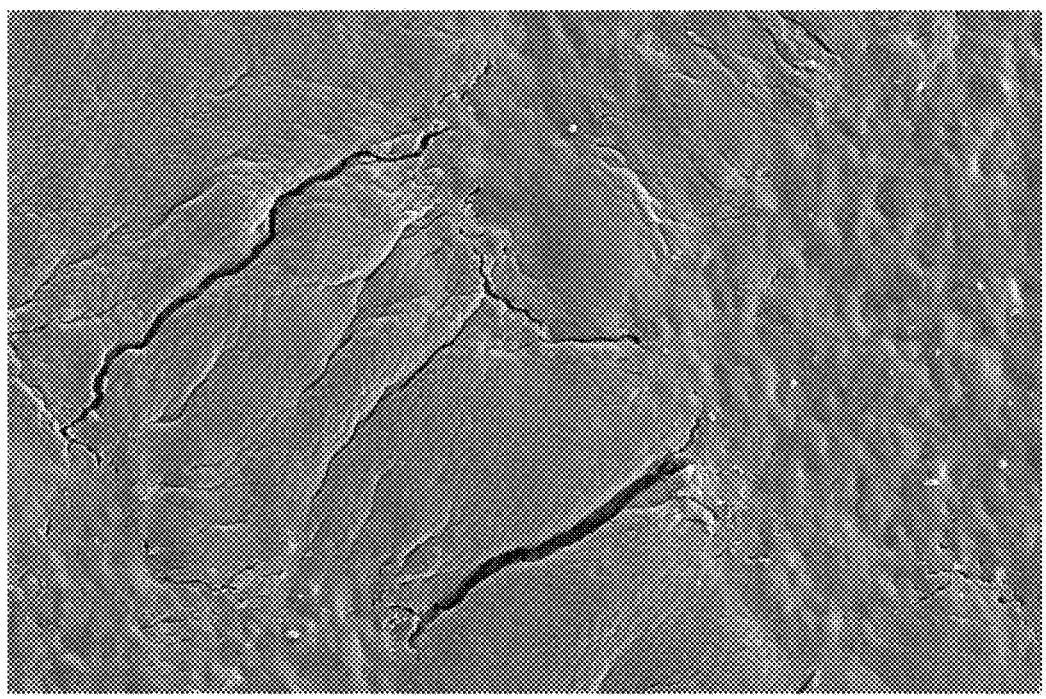
FIG. 8A is a scanning electron microscope image, at 1000 times magnification, of the patient-side (i.e., the exterior side of the glove when worn) of a fourth surgical glove coated with another embodiment of an emulsion coating as disclosed herein and applied with a crosslinker and without acid priming.
Figure 8B:
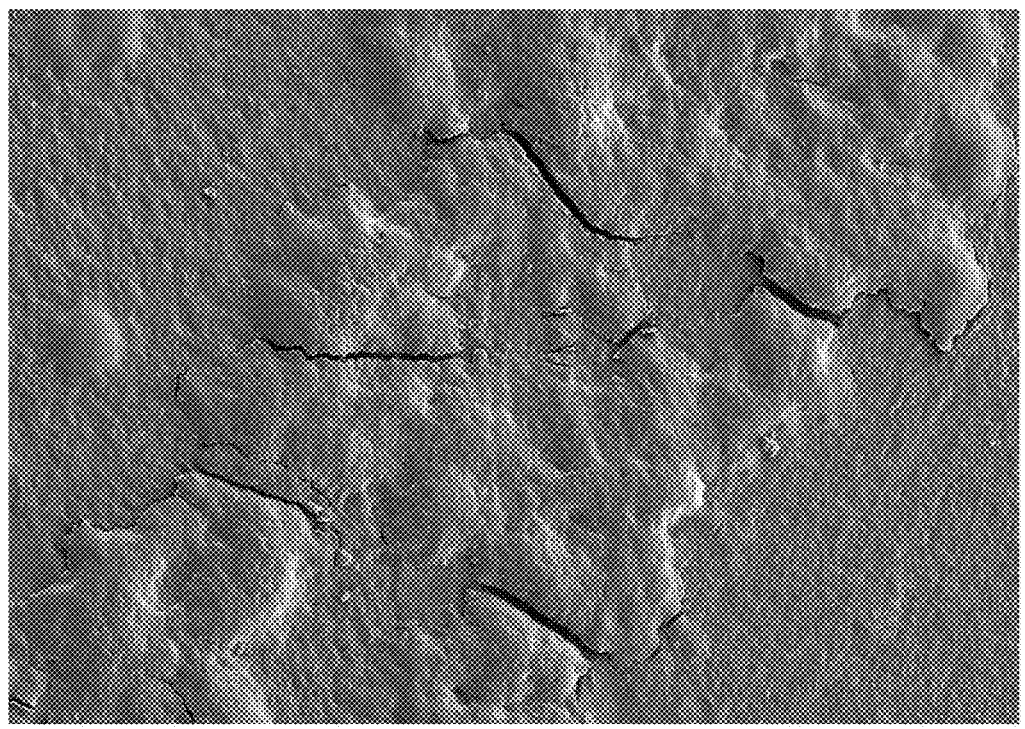
FIG. 8B is a scanning electron microscope image, at 1000 times magnification, of the patient-side of a fifth surgical glove coated with another embodiment of an emulsion coating as disclosed herein and applied with a crosslinker and with acid priming.
Figure 9A:
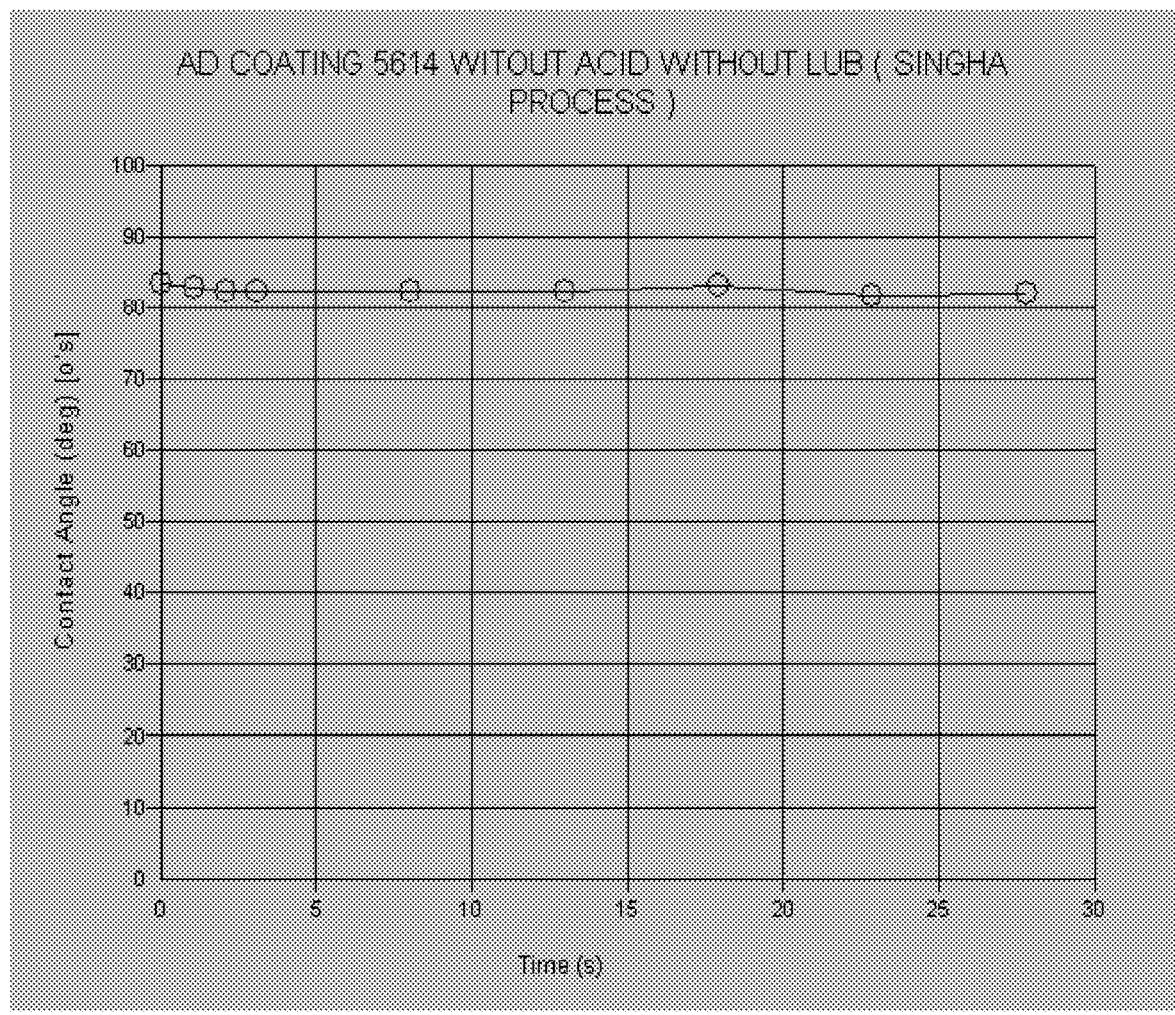
FIG. 9A is a graph of contact angle data glove for the glove of FIG. 8A.
Figure 9B:
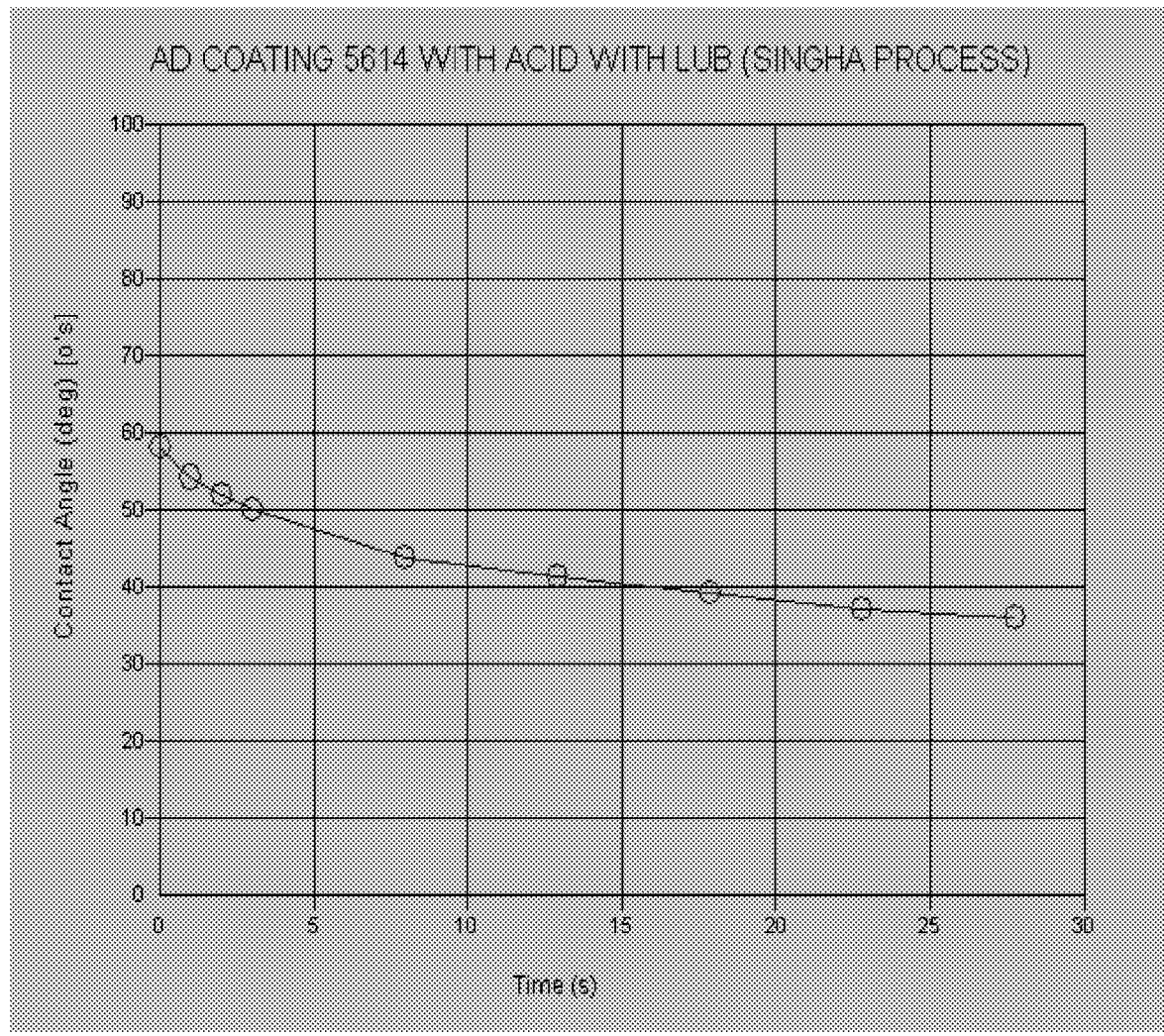
FIG. 9B is a graph of contact angle data glove for the glove of FIG. 8B.
Figure 10A:
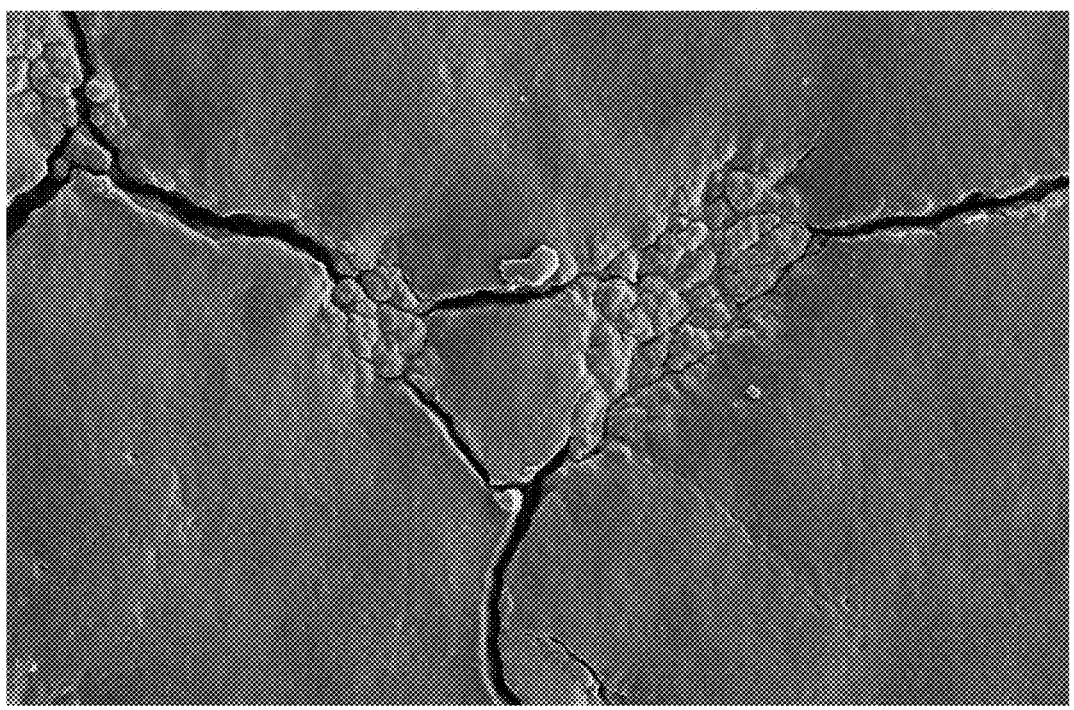
FIG. 10A is a scanning electron microscope image, at 1000 times magnification, of the donning-side (i.e., the side that would contact a user's skin when worn) of the glove of FIG. 8B with high chorine and using a glove turning process.
Figure 10B:
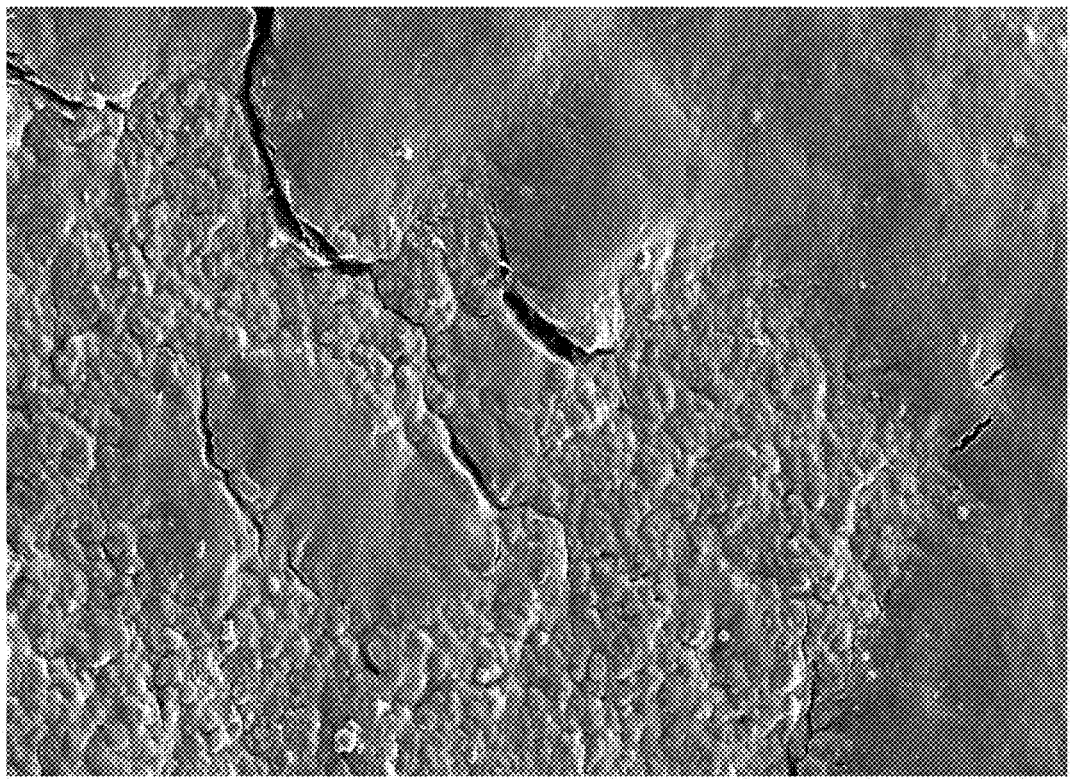
FIG. 10B a scanning electron microscope image, at 1000 times magnification, of the donning-side of the glove of FIG. 8A with high chorine and using a glove turning process.
Figure 11A:
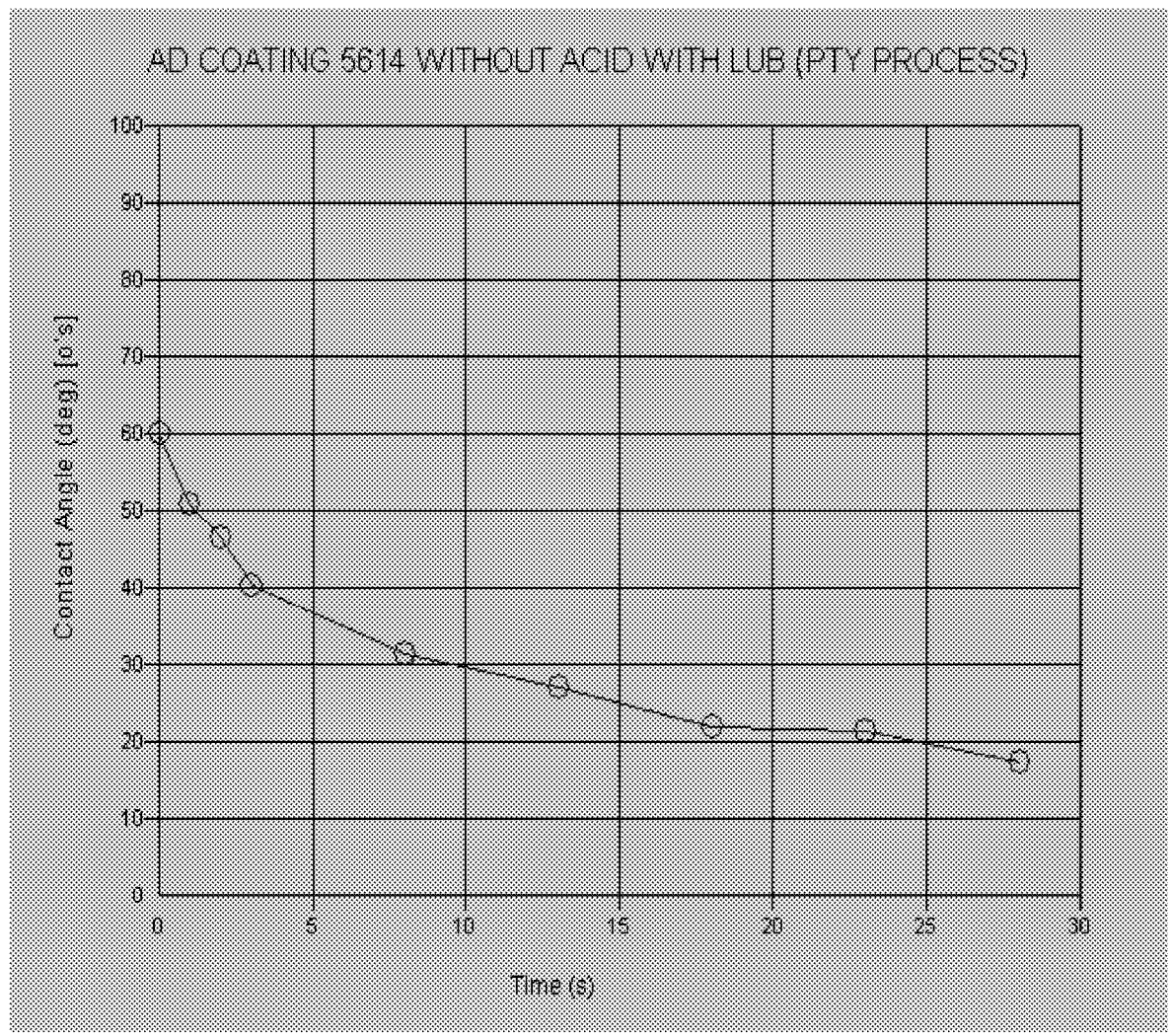
FIG. 11A is a graph of contact angle data glove for the glove of FIG. 10A.
Figure 11B:
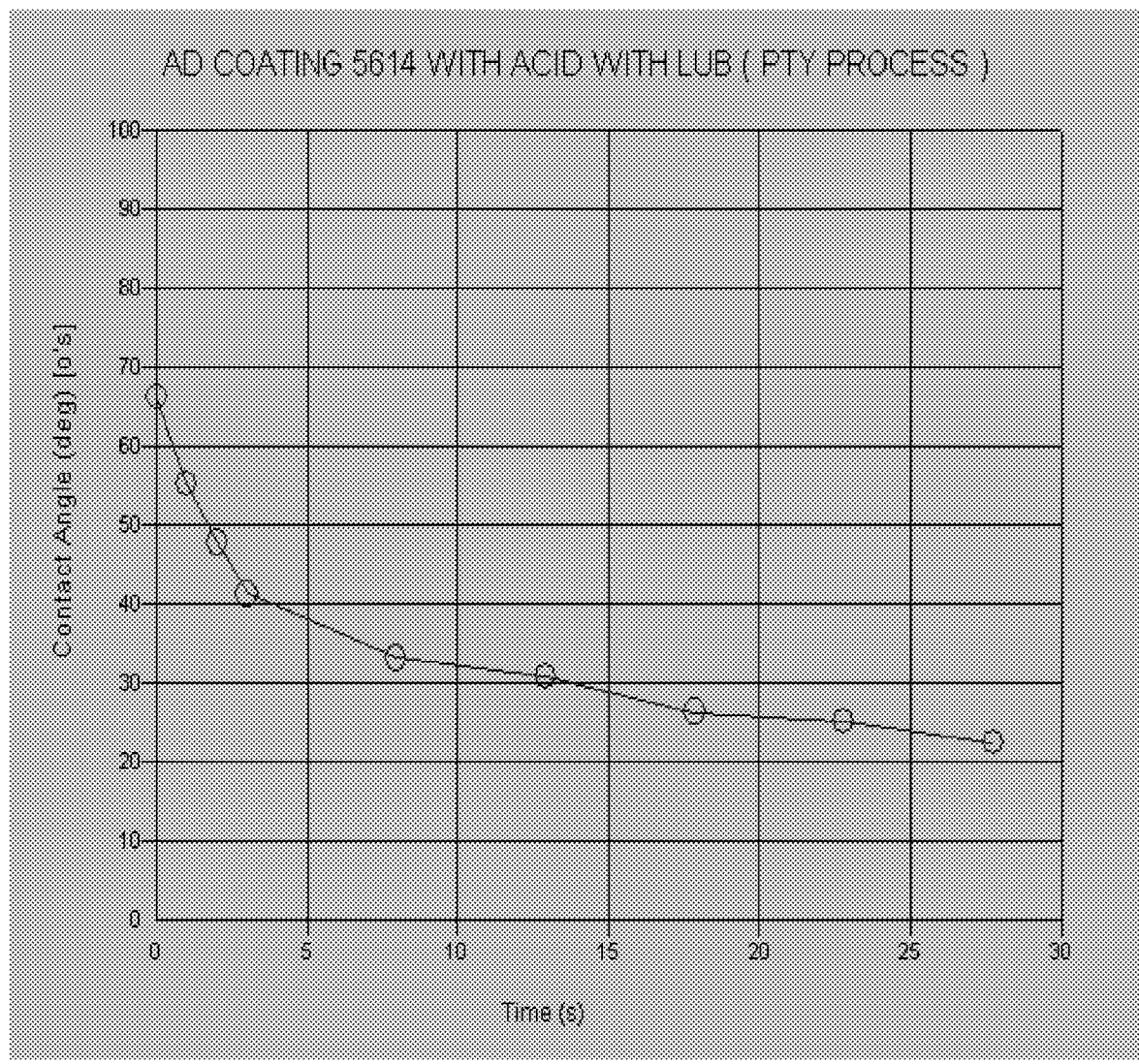
FIG. 11B is a graph of contact angle data glove for the glove of FIG. 10B.

Scanning electron microscope images and contact angle data were also obtained for Sample 19 (emulsion) applied to a glove on the donning side only by using mold dipping with 5% Cymel 373 as a crosslinker. In particular, FIG. 8A shows an image of the patient side of a glove without lubrication, without acid priming, and with low chlorine applied during chlorination, and FIG. 9A provides a graph of contact angle data glove. FIG. 8B provides an image of a glove with the same parameters except using acid priming, and FIG. 9B shows provides contact angle data for the glove of FIG. 8B. FIGS. 10A and 11A provide an image and contact angle data, respectively, of the donning side of the glove of FIGS. 8A and 9A after turning the glove but with high chorine applied to the donning side during chlorination. Similarly, FIGS. 10B and 11B provide, respectively an image and contact angle data, respectively, for the donning side of the glove of FIGS. 8B and 9B after turning the glove and applying high chorine to the donning side.

The foregoing contact angle data was collected by casting the film on a hard, nonporous surface and then placing a drop of water on the cast film. The water droplet's contact angle was then measured, which is the interior arc from the surface of the film to exterior surface of the droplet. Generally, a lower contact angle represents a greater wet-ability of the film.

Figure 12A:
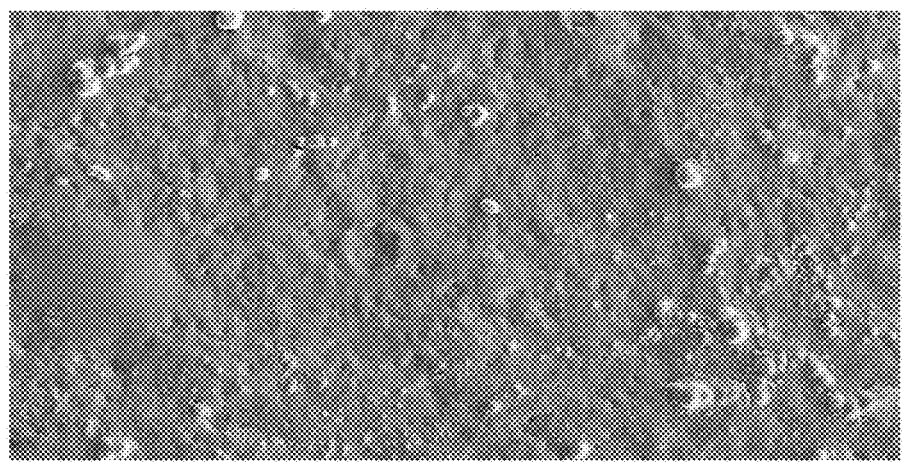
FIG. 12A is a scanning electron microscope image, at 1000 times magnification, of the patient-side of a sixth glove coated with another embodiment of an emulsion coating as disclosed herein and applied with a crosslinker and without acid priming.
Figure 12B:
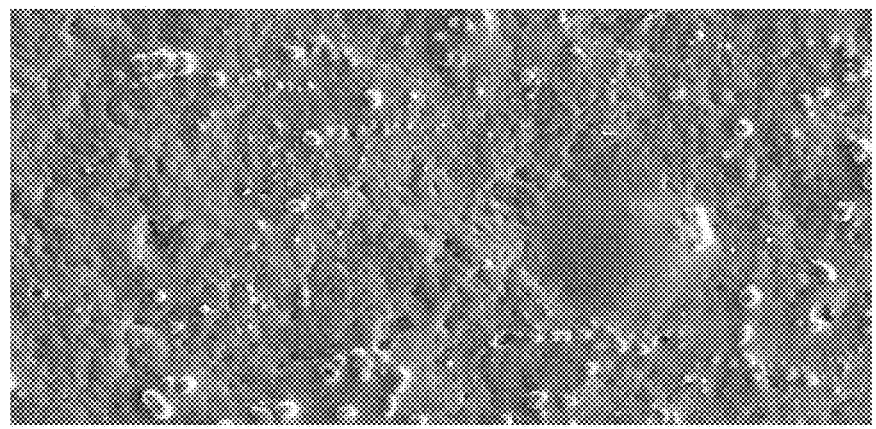
FIG. 12B is a scanning electron microscope image, at 1000 times magnification, of the patient-side of a seventh glove coated with an emulsion coating as disclosed herein and applied with a crosslinker and with acid priming.
Figure 12C:
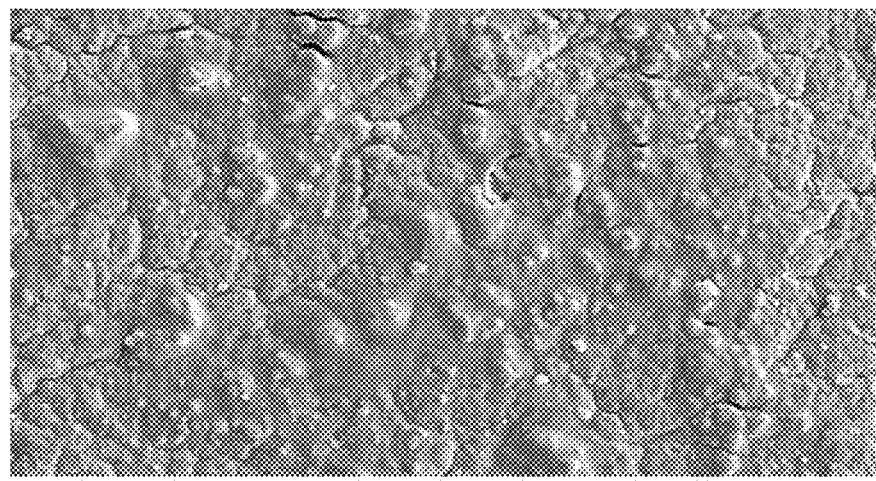
FIG. 12C is a scanning electron microscope image, at 1000 times magnification, of the donning-side of the glove of FIG. 12A coated without acid priming.
Figure 13A:
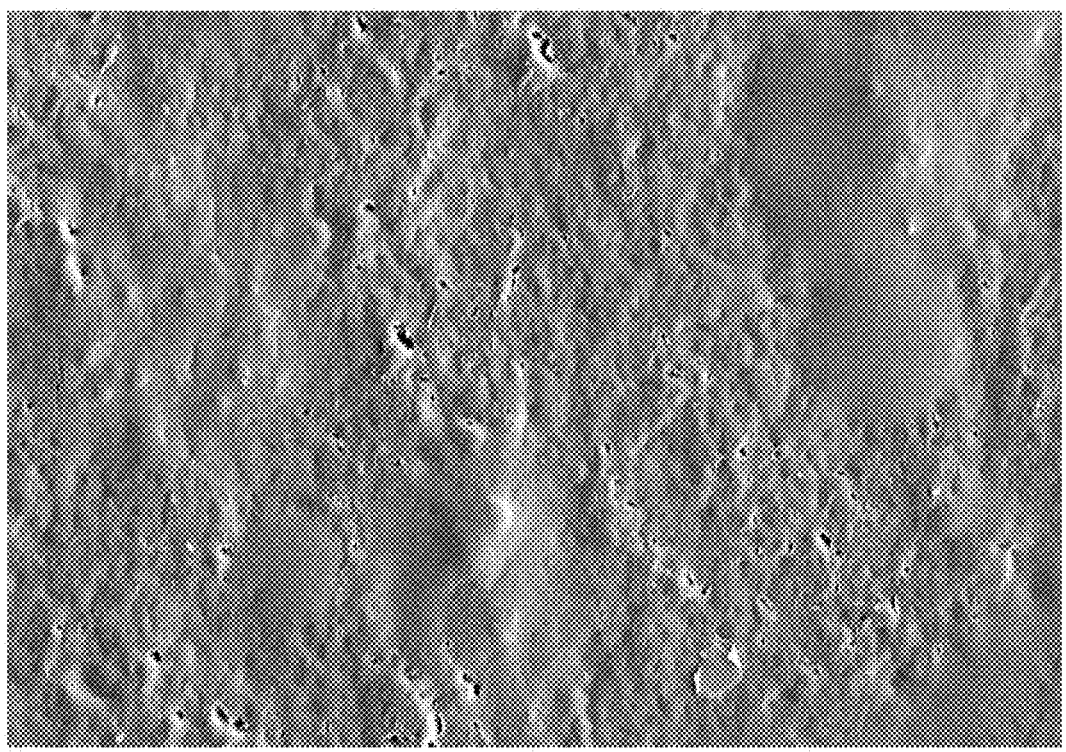
FIG. 13A is a scanning electron microscope image, at 1000 times magnification, of the patient-side of an eighth glove coated with an emulsion coating as disclosed herein and applied with a crosslinker and without acid priming.
Figure 13B:
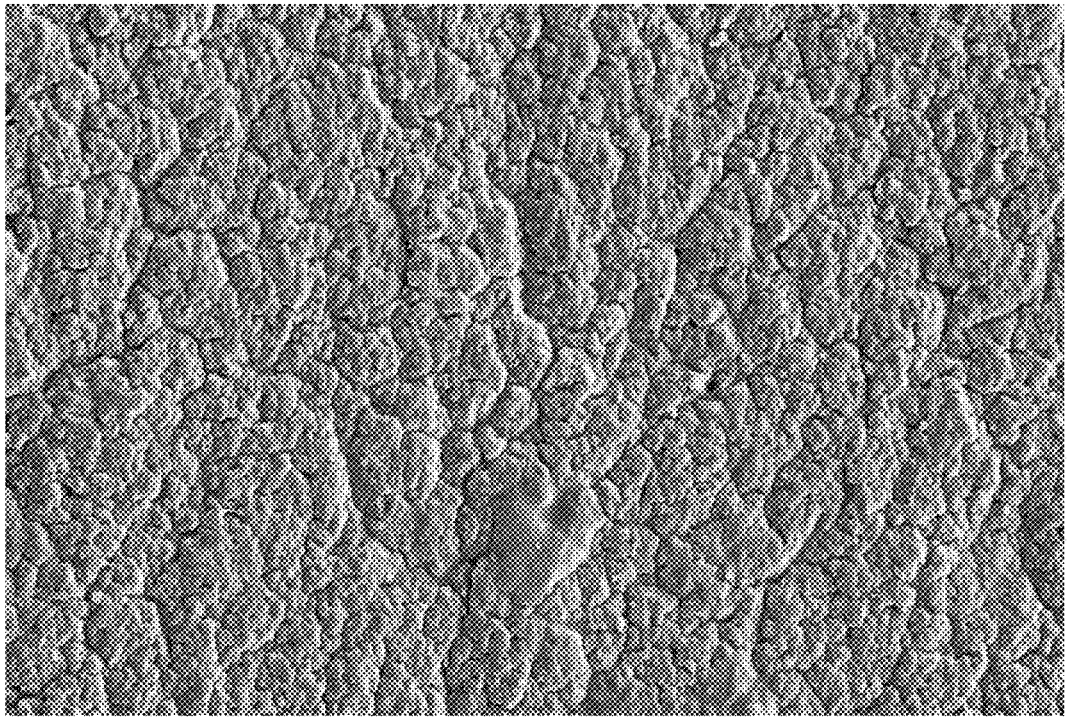
FIG. 13B is a scanning electron microscope image, at 1000 times magnification, of the patient-side of a glove of FIG. 13A coated with an emulsion coating as disclosed herein and applied with a crosslinker and without acid priming.
Figure 14:
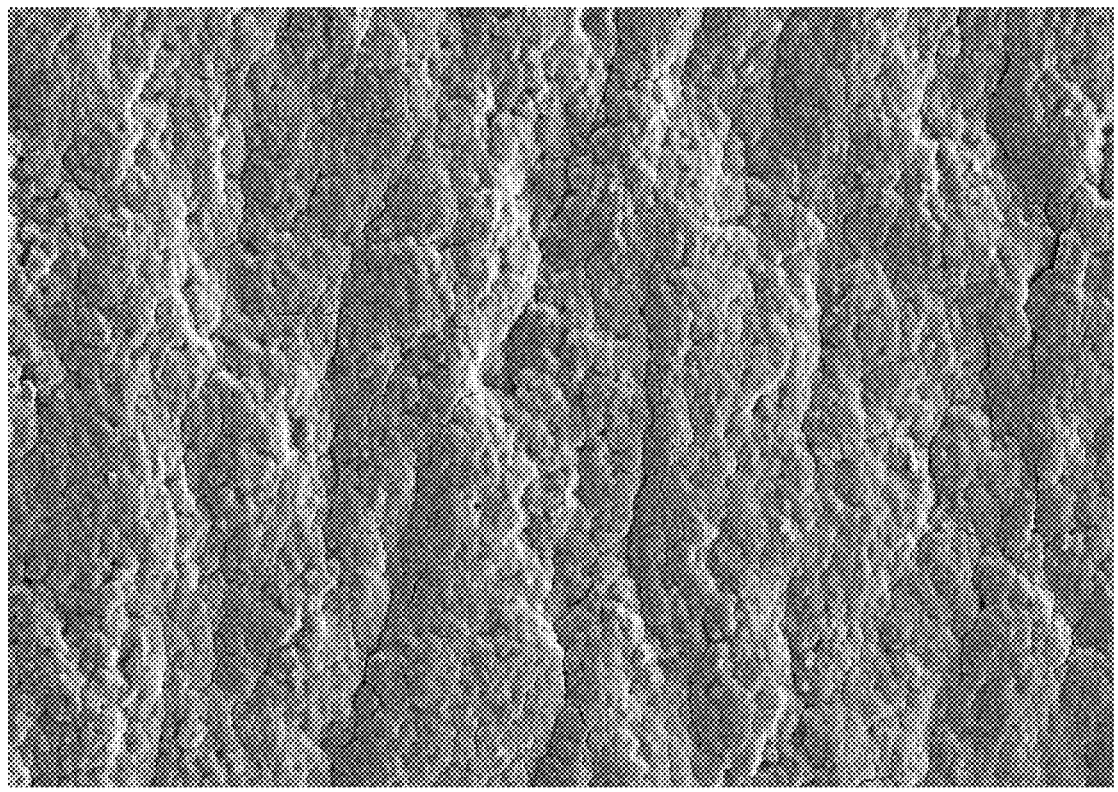
FIG. 14 is a scanning electron microscope image, at 1000 times magnification, of the patient-side of a glove coated with a comparative solvent-based coating and applied with a crosslinker and without acid priming.

Scanning electron microscope images for Sample 17 (emulsion) applied to a glove using 8% Cymel 373 and a mold dipping process are shown in FIGS. 12A (showing the patient side using low chlorine, no lubrication, no glove turning, and without acid priming) and 12B (showing the patient side using low chlorine, no lubrication, without glove turning, and with acid priming), and FIG. 12C (showing the donning side using high chlorine, no lubrication, without glove turning, and without acid priming). Furthermore, images for Sample 17 applied to a glove using 5% Cymel 373 and a mold dipping process are shown in FIG. 13A (showing the patient side using low chlorine, no lubrication, no glove turning, and without acid priming) and FIG. 13B (showing the donning side using high chlorine, no lubrication, with glove turning, and without acid priming). Finally, images for Sample 5 (water-based) applied to a glove using 5% Cymel 373 and a mold dipping process are shown in FIG. 14 (showing the patient side using low chlorine, no lubrication, no glove turning, and without acid priming). These figures again show comparable, if not improved, performance of the emulsions disclosed herein, which provide a generally smooth application with minimal cracking, as compared with water-based coatings.

In some applications of coatings to articles, undesirable flaking of the coating may occur. In some embodiments, flaking may be decreased by including a "softer" monomer in the monomer feed and/or the pre-emulsion feed, wherein the softer monomer has a relatively lower glass transition temperature ("Tg") than at least one other monomer present in the feed. For instance, a monomer feed may include one or more monomers having a relatively higher glass transition temperature ("Tg") and one or more other monomers having a relatively lower Tg. By way of example, a monomer feed in some embodiments may comprise 2-hydroxyethyl methacrylate, which has a Tg in the range of about 50° C. to about 80° C., and the "softer" 4-hydroxybutyl acrylate, which has a Tg of about −30°. The inclusion of the "softer" monomer, such as 4-hydroxybutyl acrylate, may help reduce flaking in some coatings. In addition or alternatively, a pre-emulsion feed may include a monomer having a lower Tg than one or more other monomers in an effort to "soften" the coating and potentially reducing flaking. For instance, a pre-emulsion feed may include one or more monomers having a relatively higher glass transition temperature ("Tg") and one or more other monomers having a relatively lower Tg. By way of example, a pre-emulsion feed in some embodiments may comprise 2-ethylhexyl acrylate, which has a Tg in the range of about −50° C. The inclusion of a "softer" monomer, such as 2-ethylhexyl acrylate, may help reduce flaking in some coatings. By way of further example, a pre-emulsion feed may include methyl methacrylate, which has a Tg in the range of about 100° C., and the "softer" monomer of 2-ethylhexylacrylate, which has a Tg in the range of about −50° C. to about −70° C. The ratios of such monomers can be adjusted to obtain a desired characteristic in a coating.

Additional testing, including flaking observation, was performed on latex films coated with Sample 19. The comparative testing was done using the aforementioned control, which is a solvent-based coating known to have suitable characteristics for glove coating applications. The additional testing was performed using the following procedures:

1. The Sample 19 emulsion-based copolymer was diluted with deionized ("DI") water to 3.5-4.0% of the total solids content ("TSC").
2. 3.5-4.0% of the crosslinker Cymel 373 was added to the Sample 19 emulsion based on dry weight of the crosslinker to the dry weight of the copolymer.
3. The polymer solution was brought to a temperature of about 34° C.
4. The polymer solution was coated on a latex film, the latex film being heated up to a temperature of about 40-45° C. prior to the coating process and after leaching.
5. After coating, the mold upon which the film was applied was rotated in the oven to ensure even coating on the film.
6. The coated film was then cured at 140° C. for 30 minutes.
7. The coated film was then chlorinated on the donning and/or patient side to remove any powder with a chlorine strength of about 80 ppm.

Based upon the testing procedures above, the following results were obtained, wherein the degree of coating flaking was evaluated on a scale of 1 to 5 with 1 indicating the lowest flake and 5 indicating the highest flake:

TABLE 31

| | Sample | | | | | | | | | | | | | | | |
|---|---|---|---|---|---|---|---|---|---|---|---|---|---|---|---|---|
| | Sample 19 | | | | Sample 19 | | | | Sample 19 | | | | Control | | | |
| Coating TSC (%) | 4.0 | | | | 4.0 | | | | 3.5 | | | | 4.0 | | | |
| Cymel 373 (%) | 4.0 | | | | 3.5 | | | | 3.5 | | | | NA | | | |
| | Coefficient of Friction (COF) | | | | | | | | | | | | | | | |
| | Donning Palm | | Donning Finger | | Donning Palm | | Donning Finger | | Donning Palm | | Donning Finger | | Donning Palm | | Donning Finger | |
| Sample | Static | Kinetic | Static | Kinetic | Static | Kinetic | Static | Kinetic | Static | Kinetic | Static | Kinetic | Static | Kinetic | Static | Kinetic |
| Average | 0.04 | 0.04 | 0.08 | 0.09 | 0.04 | 0.06 | 0.08 | 0.09 | 0.08 | 0.08 | 0.04 | 0.05 | 0.02 | 0.03 | 0.03 | 0.07 |
| Std Dev | 0.01 | 0.01 | 0.07 | 0.09 | 0.01 | 0.01 | 0.00 | 0.01 | 0.08 | 0.07 | 0.04 | 0.04 | 0.01 | 0.02 | 0.00 | 0.01 |
| | Physical Properties of Chlorinated Gloves (Unaged) | | | | | | | | | | | | | | | |
| Tensile Strength (kg/cm$^2$) | 280 | | | | 281 | | | | 273 | | | | 267 | | | |
| Stress 300% (kg/cm$^2$) | 17 | | | | 15 | | | | 15 | | | | 17 | | | |
| Stress 500% (kg/cm$^2$) | 49 | | | | 38 | | | | 37 | | | | 46 | | | |
| Ultimate Elongation % | 845 | | | | 885 | | | | 845 | | | | 845 | | | |
| | Powder Content | | | | | | | | | | | | | | | |
| Powder Content (mg/film) | Not tested | | | | 1.22 | | | | 1.56 | | | | 0.60 | | | |
| | Observations | | | | | | | | | | | | | | | |
| Coating Evenness | Fair | | | | Fair | | | | Good | | | | Excellent | | | |

TABLE 31-continued

| | Sample | | | |
|---|---|---|---|---|
| | Sample 19 | Sample 19 | Sample 19 | Control |
| *Degree of Coating Flaking | 4 | 4 | 3 | 1 |

Figure 15A:
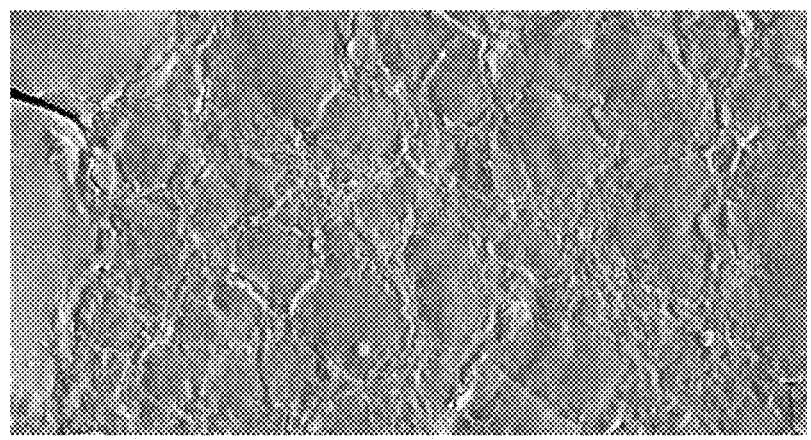
FIG. 15A is a scanning electron microscope image of a patient-side of a film coated with an emulsion coating as disclosed herein and applied with a crosslinker.
Figure 15B:
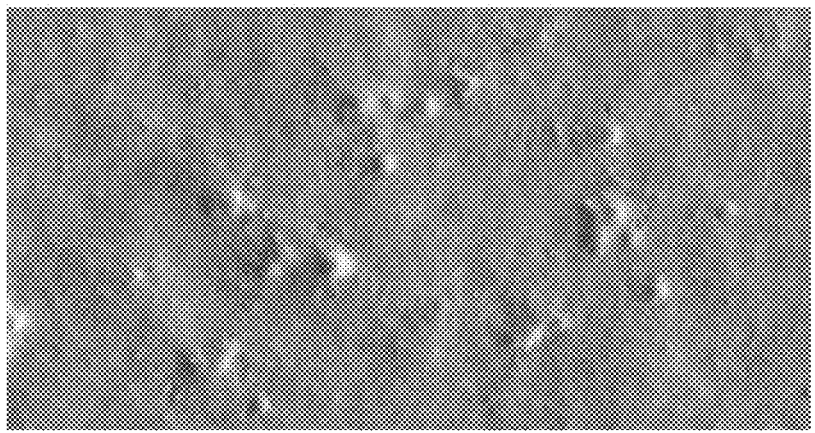
FIG. 15B is a scanning electron microscope image of a patient-side of a film coated with an emulsion coating as disclosed herein and applied with a crosslinker.
Figure 15C:
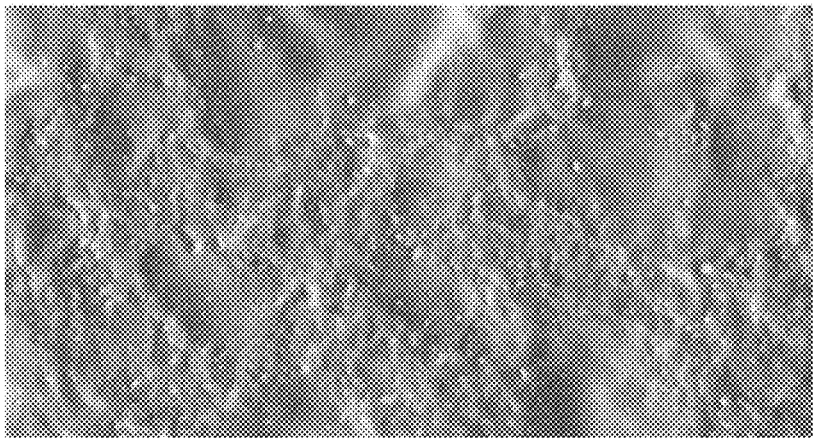
FIG. 15C is a scanning electron microscope image of a patient-side of a film coated with a comparative solvent-based coating and applied without a crosslinker.

Upon review of the samples tested above, reduced flaking and an improved coating evenness were observed with a coating having a lower total solids content/concentration and decreased Cymel content. In addition, increasing the temperatures of the coating and the film and rotating the mold under a constant temperature were also observed to improve coating evenness and to reduce flaking. FIG. 15A shows a scanning electron microscope image of a film coated with Sample 19 having a total solids content of 3.5% and 3.5% Cymel, and FIG. 15B shows a scanning electron microscope image of a film coated with Sample 19 having a total solids content of 4% and 3.5% Cymel. FIG. 15C shows a scanning electron microscope image of a film coated with the control sample. Each of these images is of the patient side of the film, and the testing employed low chlorination, no lubrication, and no turning process during the coating process.

The following Table shows the results of additional experiments performed on polymeric emulsions containing HEMA/EHA/MMA/MAA (75/11/11/3), for Samples H-J, but using a glove that is pretreated prior to coating with the emulsion. In these examples, the pretreatment comprised an acid priming step comprising either an HCl priming step or an aluminum sulphate priming step where the glove was dipped into the respective solution prior to coating with the polymer emulsion and dried. The additional testing was performed using the following procedures:

1. The Sample 19 emulsion-based copolymer was diluted with deionized ("DI") water to 3.5-4.0% of the total solids content ("TSC").
2. About 3.5% of the crosslinker Cymel 373 was added to the Sample 19 emulsion based on dry weight of the crosslinker to the dry weight of the copolymer.
3. The polymer solution was chilled and maintained at about 34° C.
4. Prior to the application of the polymer coating, the latex film, i.e., glove sample, was either dipped in an HCl acid priming solution or in an AluminiumSulphate solution or none at all, as indicated in the Table below, and dried in the oven at 100° C. to 150° C. for 1 to 2 minutes. Sample H was pretreated with aluminum sulphate, Sample I was pretreated with an HCl priming solution and Sample J was not pretreated.
5. The polymer solution was then coated onto the latex film using a dipping process, the latex film being heated up to a temperature of about 40° C.-45° C. prior to the coating process.
6. After coating, the mold upon which the film was applied was rotated in the oven to ensure even coating on the film.
7. The coated film was then cured at 140° C. for 30 minutes.
8. The coated film was then chlorinated on the donning and/or patient side to remove any powder with a chlorine strength of about 80 ppm.
9. The gloves were then tested as indicated in the table below. The aged samples were aged using a heat accelerated aging process, as specified in ASTM D-412 method, in which the aged gloves were placed in an oven for 7 days at about 70° C. The unaged samples were tested without performing such a heat treatment aging process.

The following test results were obtained, as indicated below in Table 32.

TABLE 32

| Coating Type | H | I | J |
|---|---|---|---|
| Type of Pretreatment | Aluminum Sulphate | HCl | None |
| Concentration of Pretreatment (%) | 3 | 4.5 | N/A |
| Physical Properties of Sterile Gloves (Unaged) | | | |
| Tensile Strength (kg/cm²) | 289 | 250 | 283 |
| Stress 300% (kg/cm²) | 11 | 14 | 17 |
| Stress 500% (kg/cm²) | 25 | 31 | 47 |
| Ultimate Elongation % | 924 | 924 | 845 |
| Physical Properties of Sterile Gloves (Aged) | | | |
| Tensile Strength (kg/cm²) | 287 | 131 | 227 |
| Stress 300% (kg/cm²) | 12 | 7 | 10 |
| Stress 500% (kg/cm²) | 29 | 13 | 18 |
| Ultimate Elongation % | 943 | 1002 | 1022 |

From the above results in Table 32, both Samples H and I exhibited satisfactory results for unaged gloves, with Sample H (aluminum sulphate pretreated glove) exhibiting slightly better tensile strength results. However, the gloves treated with aluminum sulphate, Sample H, maintained better tensile strength values upon aging than the acid priming treated gloves (Sample I) and than the sample that was not pretreated (Sample J). According to the ASTM D-412 standard, the aged tensile strength requirement for a glove is at least 185 kg/cm². Thus, the aged gloves pretreated with HCl were below this value. The aged glove pretreated with aluminum sulphate (Sample H) generally exhibited better values overall having higher tensile strength values and stress values.

In Table 33 below, additional experiments were performed on Sample 19, with the gloves pretreated prior to coating with the emulsion in an aluminum sulphate priming step. These samples are designated as Samples K-L. The additional testing was performed using the following procedures:

1. The emulsion-based copolymer samples were diluted with deionized ("DI") water to about 3.5% of the total solids content ("TSC"). Both Samples K and L contain a HEMA/EHA/MMA/MAA concentration of 75/11/11/

3, however, the difference between these two samples is how the emulsion-based copolymer coatings were stabilized. Sample K utilized KOH to stabilize the coating, while Sample 0 utilized ammonium hydroxide to stabilize the coating.
2. About 3.5% of the crosslinker Cymel 373 was added to each of Samples K-L based on dry weight of the crosslinker to the dry weight of the copolymer.
3. The polymer solution was chilled and maintained at about 34° C.
4. Prior to the application of the polymer coating, the latex film, i.e., glove sample, was dipped in an Aluminium-Sulphate solution, as indicated in the Table below, and dried in the oven at 100° C. to 150° C. for 1 to 2 minutes.
5. The polymer solution was then coated onto the latex film, the latex film being heated up to a temperature of about 40° C.-45° C. prior to the coating process.
6. After coating, the mold upon which the film was applied was rotated in the oven to ensure even coating on the film.
7. The coated film was then cured at 140° C. for 30 minutes.
8. The coated film was then chlorinated on the donning and/or patient side to remove any powder with a chlorine strength of about 80 ppm.

TABLE 33

| Coating | Sample K | Sample L |
|---|---|---|
| HEMA | 75 | 75 |
| EHA | 11 | 11 |
| MMA | 11 | 11 |
| MAA | 3 | 3 |
| Coating TSC (%) | 3.5 | 3.5 |
| Cymel 373 (%) | 3.5 | 3.5 |
| Priming Agent | AluminiumSulphate | AluminiumSulphate |
| Primer conc (%) | 1.5 | 1.5 |
| Physical Properties of Sterile Gloves(Unaged) | | |
| Tensile Strength (kg/cm2) | 289 | 296 |
| Stress 300 % ( $kg/cm^2$) | 11 | 11 |
| Stress 500 % ( $kg/cm^2$) | 25 | 30 |
| Ultimate Elongation % | 924 | 884 |
| Physical Properties of Sterile Gloves(Aged) | | |
| Tensile Strength ($kg/cm^2$) | 287 | 290 |
| Stress 300% ( $kg/cm^2$) | 12 | 13 |
| Stress 500% ( $kg/cm^2$) | 29 | 25 |
| Ultimate Elongation % | 943 | 924 |
| Powder content (mg/glove) | 1.82 | 1.90 |
| Observations | | |
| Coating sedimentation | No | No |
| Internal tacky during processing | Slightly | Yes |
| Dry donning | Fair | Fair |

Overall, both Samples K and L had similar results, both having favorable results for both the aged and unaged gloves, but with fair donnability. The one difference being observed during processing, where Sample K had slight tackiness observed whereas Sample L had a greater amount of tackiness observed.

The composition and process disclosed herein can further include articles that have been coated with a polymeric emulsion of the type described herein and methods for making such articles. In some instances, such articles include natural rubber, synthetic rubber, or latex, such as, without limitation, surgical gloves, physician examining gloves, industrial gloves, prophylactics, catheters, balloons, tubing, sheeting, other elastomeric articles, and similar articles. As indicated above, rubber or latex gloves may require the ability of donning, i.e., the ability to slide a glove on and off the surface of the skin, with minimal friction. As such, a flexible, non-tacky glove coating applied to the interior of a glove may be useful to allow donning, wet or dry, of the glove with minimal blocking and without undue friction or clinging. The foregoing examples indicate the suitability of the emulsions disclosed herein for these purposes.

In addition, as demonstrated by the test results presented herein, certain emulsions disclosed herein provide reduced static and kinetic dry coefficients of friction as compared with water soluble coatings. Such reduced coefficients of friction are desirable in many applications, such as for surgical and examination gloves that require donning capabilities. In addition, the emulsion examples shown herein provide reduced tackiness and/or stickiness, particularly as compared with water-based coatings. Reduced tackiness and stickiness are also desirable features for glove applications. For reference, tackiness may be used to reference the adherence of an article to itself or an identical article, whereas stickiness may be used to reference the adherence of an article to other material. These features offered by embodiments disclosed herein may beneficially alleviate the need for using powder or other lubricating materials with the gloves.

By way of further examples, and without limitation, the emulsion coating prepared in accordance with the methods disclosed herein may be suitable for the preparation of, and use, as elastomeric films, pressure sensitive adhesives, coatings, hydrogels, and compositions for topical applications to the skin such as, creams, lotions, ointments, gels, aerosols, sprays, cosmetic compositions, deodorants, and insect repellants. Such uses may include medical elastomeric films, bandages, tapes, wound care dressings, surgical drapes, ostomy site dressings, as a carrier for transdermal drug delivery systems, and as a carrier for mucus membrane drug delivery systems.

One of ordinary skill in the art will readily appreciate that the emulsion coatings disclosed herein can be applied to articles by any conventional method or process. These application methods may include, for example, dipping, die coating, roll coating, reverse roll coating, gravure coating, reverse gravure coating, offset gravure coating, Mayer rod or wire wound rod coating, spraying, brushing, and the like. The polymers and copolymers disclosed herein may be heated or cooled to facilitate the coating process and to alter the depth or penetration into the substrate.

These and other modifications and variations may be practiced by those of ordinary skill in the art without departing from the spirit and scope of the composition and process disclosed herein, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the disclosure herein as further described in such appended claims. Therefore, the spirit and scope of the appended claims should not be limited to the exemplary description of the versions contained herein.

What is claimed is:

1. A method for the preparation of a copolymer emulsion for coating elastomeric articles, the method comprising:
   combining a water soluble monomer mixture and a water insoluble monomer mixture to form a monomer mixture;
   the water soluble monomer mixture comprising at least one first water soluble monomer;
   the water insoluble monomer mixture comprising at least one water insoluble monomer and a second water soluble monomer,
   wherein the monomer mixture comprises, as measured as the weight percentage of the total monomer mixture weight, at least 50% water soluble monomer and at least 10% water insoluble monomer, and copolymerizing the monomer mixture to form a copolymer emulsion
   wherein the first water soluble monomer is selected from the group consisting of 2-hydroxyethyl methacrylate and 4-hydroxybutyl acrylate;
   wherein the second water soluble monomer is methacrylic acid;
   wherein the water insoluble monomer mixture comprises at least two or more insoluble monomers selected from the group consisting of methyl acrylate, ethyl acrylate, butyl acrylate, propyl acrylate, 2-ethylhexyl acrylate, methyl methacrylate, lauryl methacrylate, 2-ethylhexyl methacrylate, trifluoroethyl methacrylate, isooctyl acrylate, isodecyl acrylate, dimethylaminoethyl methacrylate; and
   wherein the water soluble monomers comprise from 50% to about 97% of the total monomer weight used in the method.

2. The method of claim 1 wherein the water soluble monomers comprises at least 60% of the total monomer weight used in the method.

3. The method of claim 1 wherein the water soluble monomers comprises at least 75% of the total monomer weight used in the method.

4. The method of claim 1 wherein the water insoluble monomer comprises at least 15% of the total monomer weight used in the method.

5. The method of claim 1 wherein the water insoluble monomer comprises at least 25% of the total monomer weight used in the method.

6. The method of claim 1 wherein the first water soluble monomer comprises 2-hydroxyethyl methacrylate.

7. The method of claim 6 wherein the first water soluble monomer comprises 2-hydroxyethyl methacrylate having a purity level of about 97%.

8. The method of claim 7 wherein the water insoluble monomer comprises 2-ethylhexyl acrylate.

9. The method of claim 6 wherein the water insoluble monomer comprises 2-ethylhexyl acrylate.

10. The method of claim 7 wherein the water insoluble monomer mixtures comprises 2-ethylhexyl acrylate and 2-ethylhexyl methacrylate.

11. The method of claim 7 wherein the water insoluble monomer mixture comprises 2-ethylhexyl acrylate and lauryl methacrylate.

12. The method of claim 7 wherein the water insoluble monomer mixture comprises 2-ethylhexyl acrylate and methyl methacrylate.

13. The method of claim 7 wherein the water insoluble monomer consists of 2-ethylhexyl acrylate.

14. The method of claim 13 wherein the methacrylic acid is about 1% to 5% of the total monomer mixture weight.

15. The method of claim 1 wherein the methacrylic acid is about 3% of the total monomer mixture weight.

16. The method of claim 1 wherein the method further comprises introducing a crosslinker into the copolymer emulsion.

17. The method of claim 16 wherein the crosslinker is selected from the group consisting of formaldehydes, melamine formaldehydes, metal salts, aziridines, isocyanates, dichromates.

18. The method of claim 16 wherein the crosslinker comprises a polyfunctional aziridine liquid.

19. The method of claim 16 wherein the crosslinker comprises a carbodiimide compound.

20. The method of claim 16 wherein the crosslinker comprises a melamine formaldehyde.

21. The method of claim 16 wherein the crosslinker comprises a polyamideepichlorohydrin resin.

22. The method of claim 1 wherein the method further comprises introducing an activator to the monomer mixture.

23. The method of claim 1 further comprising introducing a surfactant to the monomer mixture.

24. The method of claim 23 wherein the surfactant is sodium lauryl ether sulfate.

25. The method of claim 1 further comprising introducing an initiator to the monomer mixture.

26. The method of claim 25 wherein the initiator is selected from the group consisting of ammonium persulfate, potassium persulfate, sodium persulfate, hydrogen peroxide, tertbutyl hydroperoxide, azo compounds, sodium persulfate with sodium metabisulfite, hydrogen peroxide with ferrous ion, sulfite ion, bisulfite ion or ascorbic acid, hydroperoxides with sulfoxylates, and tertbutyl hydroperoxide with sodium formaldehyde sulfoxylate.

27. The method of claim 26 wherein the initiator is tert-butyl hydroperoxide.

28. The method of claim 1 wherein the method further comprises introducing a stabilizer during to the monomer mixture.

29. The method of claim 28 wherein the stabilizer is polyvinyl alcohol.

30. The method of claim 1 further comprising introducing a surfactant, an initiator, and a stabilizer to the monomer mixture.

31. The method of claim 30 wherein the surfactant, initiator, and stabilizer are introduced into the monomer mixture by first combining the surfactant, initiator, and stabilizer with a second mixture of the water insoluble monomer.

32. The method of claim 1 wherein the monomer mixture is maintained at a temperature between about 50° C. and about 60° C.

33. The method of claim 1 wherein the temperature of the monomer mixture is maintained at a temperature of about 55° C.

34. The method of claim 1 wherein the monomer mixture is maintained at a pH at or above about 6.0.

35. The method of claim 1 wherein the monomer mixture is maintained at a pH between about 6.0 and about 7.0.

36. The method of claim 1 wherein the method is conducted by concurrently combining the soluble monomer and the insoluble monomer.

37. A method for the preparation of a copolymer emulsion comprising:
   concurrently combining a monomer feed and a pre-emulsion feed to form an emulsion, wherein the monomer feed comprises at least 50% by weight first water soluble monomer based on the total monomer weight of the monomer feed and the pre-emulsion feed, and the pre-emulsion feed comprises at least 10% by weight water insoluble monomer based on the total monomer weight of the monomer feed and the pre-emulsion feed and the pre-emulsion feed further comprises a second water soluble monomer added to the pre-emulsion feed;

wherein the first water soluble monomer comprises 2-hydroxyethyl methacrylate;

wherein the second water soluble monomer is methacrylic acid;

wherein the pre-emulsion feed comprises at least two or more insoluble monomers selected from the group consisting of methyl acrylate, ethyl acrylate, butyl acrylate, propyl acrylate, 2-ethylhexyl acrylate, methyl methacrylate, lauryl methacrylate, 2-ethylhexyl methacrylate, trifluoroethyl methacrylate, isooctyl acrylate, isodecyl acrylate, dimethylaminoethyl methacrylate; and wherein the water soluble monomers comprise from 50% to 90% of the total monomer weight used in the method.

38. The method of claim 37 wherein the monomer feed further comprises deionized water and the pre-emulsion feed further comprises deionized water, a surfactant, and a stabilizer.

39. The method of claim 38 wherein the surfactant is sodium lauryl ether sulfate and the stabilizer is polyvinyl alcohol.

40. The method of claim 37 wherein the water insoluble monomer of the pre-emulsion feed comprises methyl acrylate, ethyl acrylate, butyl acrylate, propyl acrylate, 2-ethylhexyl acrylate, methyl methacrylate, lauryl methacrylate, 2-ethylhexyl methacrylate, trifluoroethyl methacrylate, isooctyl acrylate, isodecyl acrylate, or dimethylaminoethyl methacrylate.

41. The method of claim 37 wherein the water insoluble monomer of the pre-emulsion feed comprises 2-ethylhexyl acrylate.

42. The method of claim 37 wherein the water insoluble monomer of the pre-emulsion feed comprises 2-ethylhexyl acrylate.

43. The method of claim 37 wherein the methacrylic acid is about 3% of the total weight of monomers used in the method.

44. The method of claim 37 wherein the method comprises the further steps of:
introducing into a reactor and agitating an initial charge comprising a stabilizer, a surfactant, an initiator, and deionized water;
maintaining contents in the reactor at a temperature of about 55° C. and a pH above about 6.0;
introducing about 6% of the monomer feed and about 6% of the pre-emulsion feed into the reactor and maintaining the temperature and pH in the reactor for about ten minutes;
introducing an activator feed into the reactor at a rate such that the contents of the activator feed will be exhausted concurrently with or after the exhaustion of the monomer feed and the pre-emulsion feed, wherein the activator feed comprises deionzied water and sodium hydroxymethanesulfinate;
introducing the monomer feed and the pre-emulsion feed into the reactor at a constant rate over a span of about 4.5 hours; and
after the monomer feed, pre-emulsion feed, and activator feed have been fully introduced into the reactor, introducing a feed into the reactor comprising a second initiator and maintaining the temperature and pH in the reactor for about one hour to form complete polymerization.

45. The method of claim 44 wherein the surfactant is sodium lauryl ether sulfate, the stabilizer is polyvinyl alcohol, and the initiator is tert-butyl hydroxide.

46. The method of claim 45 wherein the initiator further comprises biocide.

47. The method of claim 45 wherein the pre-emulsion feed comprises 2-ethylhexyl acrylate.

48. The method of claim 45 wherein the pre-emulsion feed comprises 2-ethylhexyl methacrylate.

49. The method of claim 45 wherein the pre-emulsion feed comprises 2-ethylhexyl acrylate, methacrylic acid, and methyl methacrylate.

50. The method of claim 45 further comprising the step of adding a crosslinker to the emulsion.

51. The method of claim 50 wherein the crosslinker is selected from the group consisting of a polyfunctional aziridine liquid, a carbodiimide compound, a titanium acetylacetonate, a polyamide-epichlorohydrin-type resin, and a melamine-formaldehyde resin.

52. A method for the preparation of a copolymer emulsion comprising:
concurrently combining a monomer feed and a pre-emulsion feed to form an emulsion, wherein the monomer feed comprises at least 50% by weight of a first water soluble monomer based on the total monomer weight of the monomer feed and the pre-emulsion feed, and the pre-emulsion feed comprises at least 10% by weight water insoluble monomer based on the total monomer weight of the monomer feed and the pre-emulsion feed, the pre-emulsion feed further comprising a second water soluble monomer added to the pre-emulsion feed,
wherein the first water soluble monomer is selected from the group consisting of 2-hydroxyethyl methacrylate and 4-hydroxybutyl acrylate;
wherein the second water soluble monomer is methacrylic acid;
wherein the pre-emulsion feed comprises at least two or more insoluble monomers selected from the group consisting of methyl acrylate, ethyl acrylate, butyl acrylate, propyl acrylate, 2-ethylhexyl acrylate, methyl methacrylate, lauryl methacrylate, 2-ethylhexyl methacrylate, trifluoroethyl methacrylate, isooctyl acrylate, isodecyl acrylate, dimethylaminoethyl methacrylate; and
wherein the water soluble monomers comprise from 50% to 90% of the total monomer weight used in the method;
wherein the method further comprises the following steps:
introducing into a reactor and agitating an initial charge comprising a stabilizer, a surfactant, an initiator, and deionized water;
maintaining the reactor contents at a temperature of about 55° C. and a pH above about 6.0;
introducing about 6% of the monomer feed and about 6% of the pre-emulsion feed into the reactor and maintaining the temperature and pH in the reactor for about ten minutes;
introducing an activator feed into the reactor at a rate such that the contents of the activator feed will be exhausted concurrently with or after the exhaustion of the monomer feed and the pre-emulsion feed, wherein the activator feed comprises deionized water and sodium hydroxymethanesulfinate;

introducing the monomer feed and the pre-emulsion feed into the reactor at a constant rate over a span of about 4.5 hours;

after the monomer feed, pre-emulsion feed, and activator feed have been fully introduced into the reactor, introducing a feed into the reactor comprising a second initiator and maintaining the temperature and pH in the reactor for about one hour to complete polymerization.

53. The method of claim 52 wherein the monomer feed comprises 2-hyroxyexthyl methacrylate, the surfactant is sodium lauryl ether sulfate, the stabilizer is polyvinyl alcohol, and the initiator is tert-butyl hydroxide, and the pre-emulsion feed further comprises 2-ethylhexyl acrylate.

54. The method of claim 52 wherein the monomer feed comprises 2-hyroxyexthyl methacrylate, the surfactant is sodium lauryl ether sulfate, the stabilizer is polyvinyl alcohol, the initiator is tert-butyl hydroxide, and the pre-emulsion feed further comprises 2-ethylhexyl acrylate, and methyl methacrylate.

55. The method of claim 53 or 54 further comprising the step of adding a crosslinker to the emulsion, wherein the crosslinker is selected from the group consisting of a polyfunctional aziridine liquid, a carbodiimide compound, and a polyamide-epichlorohydrin-type resin.

56. The method of claim 52 further comprising the step of adding a crosslinker to the emulsion, wherein the crosslinker comprises a melamine-formaldehyde resin.

57. A method for the preparation of a copolymer emulsion comprising:
concurrently combining a monomer feed and a pre-emulsion feed to form an emulsion, wherein the monomer feed comprises about 75% by weight a first water soluble monomer based on the total monomer weight of the monomer feed and the pre-emulsion feed, and the pre-emulsion feed comprises at least about 3% by weight water insoluble monomer based on the total monomer weight of the monomer feed and the pre-emulsion feed, the pre-emulsion feed further comprising a second water soluble monomer added to the pre-emulsion feed prior to combining with the monomer feed;
wherein the first water soluble monomer is selected from the group consisting of 2-hydroxyethyl methacrylate and 4-hydroxybutyl acrylate;
wherein the second water soluble monomer is methacrylic acid;
wherein the pre-emulsion feed comprises at least two or more insoluble monomers selected from the group consisting of methyl acrylate, ethyl acrylate, butyl acrylate, propyl acrylate, 2-ethylhexyl acrylate, methyl methacrylate, lauryl methacrylate, 2-ethylhexyl methacrylate, trifluoroethyl methacrylate, isooctyl acrylate, isodecyl acrylate, dimethylaminoethyl methacrylate; and
wherein the water soluble monomers comprise from 50% to 90% of the total monomer weight used in the method.

58. The method of claim 57 wherein the first water soluble monomer is 2-hydroxyethyl methacrylate.

59. The method of claim 58 wherein the pre-emulsion feed further comprises 2-ethylhexyl acrylate, and methyl methacrylate.

60. The method of claim 59 wherein the pre-emulsion feed comprises between about 9% to about 19% by weight 2-ethylhexyl acrylate, between about 1.5% to about 6% by weight methacrylic acid, and between about 3% to about 12% by weight methyl methacrylate, wherein said percentages are based on the total monomer weight of the monomer feed and the pre-emulsion feed.

61. The method of claim 57 wherein 2-hydroxyethyl methacrylate comprises about 75% of the total monomer weight, 2-ethylhexyl acrylate comprises about 14% of the total monomer weight, methyl methacrylate comprises about 8% of the total monomer weight, and
methacrylic acid comprises about 3% of the total monomer weight, wherein the total monomer weight indicates the total monomer weight of the monomer feed and the pre-emulsion feed.

62. The method of claim 57 wherein 2-hydroxyethyl methacrylate comprises about 75% of the total monomer weight, 2-ethylhexyl acrylate comprises about 19% of the total monomer weight, methyl methacrylate comprises about 3% of the total monomer weight, and
methacrylic acid comprises about 3% of the total monomer weight, wherein the total monomer weight indicates the total monomer weight of the monomer feed and the pre-emulsion feed.

63. The method of claim 57 wherein 2-hydroxyethyl methacrylate comprises about 75% of the total monomer weight, 2-ethylhexyl acrylate comprises about 11.75% of the total monomer weight, methyl methacrylate comprises about 11.75% of the total monomer weight, and methacrylic acid comprises about 1.5% of the total monomer weight, wherein the total monomer weight indicates the total monomer weight of the monomer feed and the pre-emulsion feed.

64. The method of claim 57 wherein 2-hydroxyethyl methacrylate comprises about 75% of the total monomer weight, 2-ethylhexyl acrylate comprises about 10.3% of the total monomer weight, methyl methacrylate comprises about 10.3% of the total monomer weight, and
methacrylic acid comprises about 4.5% of the total monomer weight, wherein the total monomer weight indicates the total monomer weight of the monomer feed and the pre-emulsion feed.

65. The method of claim 35 wherein 2-hydroxyethyl methacrylate comprises about 75% of the total monomer weight, 2-ethylhexyl acrylate comprises about 9.5% of the total monomer weight, methyl methacrylate comprises about 9.5% of the total monomer weight, and
methacrylic acid comprises about 6% of the total monomer weight, wherein the total monomer weight indicates the total monomer weight of the monomer feed and the pre-emulsion feed.

66. The method of any one of claims 57-65 wherein the method comprises the further steps of:
introducing into a reactor and agitating an initial charge comprising a stabilizer, a surfactant, an initiator, and deionized water and heating to a temperature of about 55° C.;
introducing a portion of the monomer feed and a portion of the pre-emulsion feed into the reactor allowing the temperature to equilibrate to about 55° C.;
introducing an activator feed into the reactor at a gradual rate such that the contents of the activator feed will be exhausted approximately concurrently with or after the exhaustion of the monomer feed and the pre-emulsion feed, wherein the activator feed comprises deionized water and sodium hydroxymethanesulfinate;
introducing the monomer feed and the pre-emulsion feed into the reactor at a constant rate over a span of about 4.5 hours; and
upon introduction of the activator feed, heating for about 30 minutes;

after the monomer feed, pre-emulsion feed, and activator feed have been fully introduced into the reactor, introducing a feed into the reactor comprising a second initiator and maintaining the temperature and for about one hour to form complete polymerization;

cooling the temperature and adding one or more biocides.

67. The method for the preparation of a copolymer emulsion of claim 1, wherein the insoluble monomers consist of 2-ethylhexyl acrylate and methyl methacrylate.

68. The method according to claim 1, wherein the monomer mixture further comprises at least one multifunctional acrylate monomer selected from the group consisting of polyethylene glycol diacrylate, hexanedioldiacrylate, trimethylolpropanetriacrylate, pentaerythritoltriacrylate, propylene glycol diacrylate, and combinations thereof.

* * * * *